(12) United States Patent
Park

(10) Patent No.: US 12,368,150 B2
(45) Date of Patent: Jul. 22, 2025

(54) STRUCTURAL BATTERY ELECTRODE, METHOD FOR MANUFACTURING SAME, AND STRUCTURAL BATTERY USING SAME STRUCTURAL BATTERY ELECTRODE

(71) Applicant: SASUNG Power Co., Ltd., Hwaseong-si (KR)

(72) Inventor: Mi Young Park, Sejong-si (KR)

(73) Assignee: SASUNG Power Co., Ltd., Hwaseong-si (KR)

( * ) Notice: Subject to any disclaimer, the term of this patent is extended or adjusted under 35 U.S.C. 154(b) by 777 days.

(21) Appl. No.: 17/256,255

(22) PCT Filed: Jun. 28, 2019

(86) PCT No.: PCT/KR2019/007921
§ 371 (c)(1),
(2) Date: Dec. 28, 2020

(87) PCT Pub. No.: WO2020/005029
PCT Pub. Date: Jan. 2, 2020

(65) Prior Publication Data
US 2021/0226190 A1    Jul. 22, 2021

(30) Foreign Application Priority Data
Jun. 28, 2018    (KR) .......... 10-2018-0074555

(51) Int. Cl.
*H01M 4/04* (2006.01)
*H01M 4/133* (2010.01)
(Continued)

(52) U.S. Cl.
CPC ......... *H01M 4/0402* (2013.01); *H01M 4/133* (2013.01); *H01M 4/74* (2013.01); *H01M 50/409* (2021.01); *H01M 50/44* (2021.01)

(58) Field of Classification Search
CPC ..... H01M 4/0407–0438; H01M 4/133; H01M 4/74; H01M 50/44; H01M 50/409
See application file for complete search history.

(56) References Cited

U.S. PATENT DOCUMENTS

| | | | |
|---|---|---|---|
| 8,492,029 | B2 | 7/2013 | Liu et al. |
| 8,911,905 | B2 | 12/2014 | Feng et al. |

(Continued)

FOREIGN PATENT DOCUMENTS

| | | |
|---|---|---|
| CN | 101409337 B | 7/2011 |
| KR | 10-2015-0114424 A | 10/2015 |

(Continued)

OTHER PUBLICATIONS

KR20170080159A English machine translation (Year: 2023).*
(Continued)

*Primary Examiner* — Armindo Carvalho, Jr.
(74) *Attorney, Agent, or Firm* — Finch & Maloney PLLC

(57) ABSTRACT

Provided is a manufacturing method of a structural battery electrode. The structural battery electrode manufacturing method includes preparing a fiber fabric substrate; forming a metal nanoparticle layer by providing metal nanoparticles on the fiber fabric substrate; and forming a carbon nanotube layer by providing a carbon source on the metal nanoparticle layer.

8 Claims, 44 Drawing Sheets

(51) Int. Cl.
*H01M 4/74* (2006.01)
*H01M 50/409* (2021.01)
*H01M 50/44* (2021.01)

(56) References Cited

U.S. PATENT DOCUMENTS

| | | | |
|---|---|---|---|
| 2009/0098453 A1 | 4/2009 | Liu et al. | |
| 2010/0261058 A1* | 10/2010 | Lopatin | H01M 4/133 118/500 |
| 2012/0028123 A1* | 2/2012 | Asari | H01M 4/133 29/25.03 |
| 2016/0036059 A1* | 2/2016 | Tokune | H01M 4/663 429/235 |

FOREIGN PATENT DOCUMENTS

| | | | | |
|---|---|---|---|---|
| KR | 20150114424 A | * | 10/2015 | Y02E 60/10 |
| KR | 10-2017-0080159 A | | 7/2017 | |
| KR | 20170080159 A | * | 7/2017 | H01M 4/131 |
| KR | 10-2018-0066615 A | | 6/2018 | |
| WO | WO-2016203083 A1 | * | 12/2016 | B82Y 30/00 |
| WO | 2017/188650 A1 | | 11/2017 | |

OTHER PUBLICATIONS

KR20150114424A English machine translation (Year: 2023).*
WO-2016203083-A1 English machine translation (Year: 2024).*
Zhang et al., "Carbon nanotube synthesis, characteristics, and microbattery applications", Feb. 15, 2005, Materials Science and Engineering B, vol. 116, Issue 3, 363-368 (Year: 2005).*
Written Opinion dated Oct. 11, 2019 for International Patent Application No. PCT/KR2019/007921, 7 pages.
International Search Report dated Oct. 11, 2019 for International Patent Application No. PCT/KR2019/007921, 2 pages.

* cited by examiner

[Fig. 1]
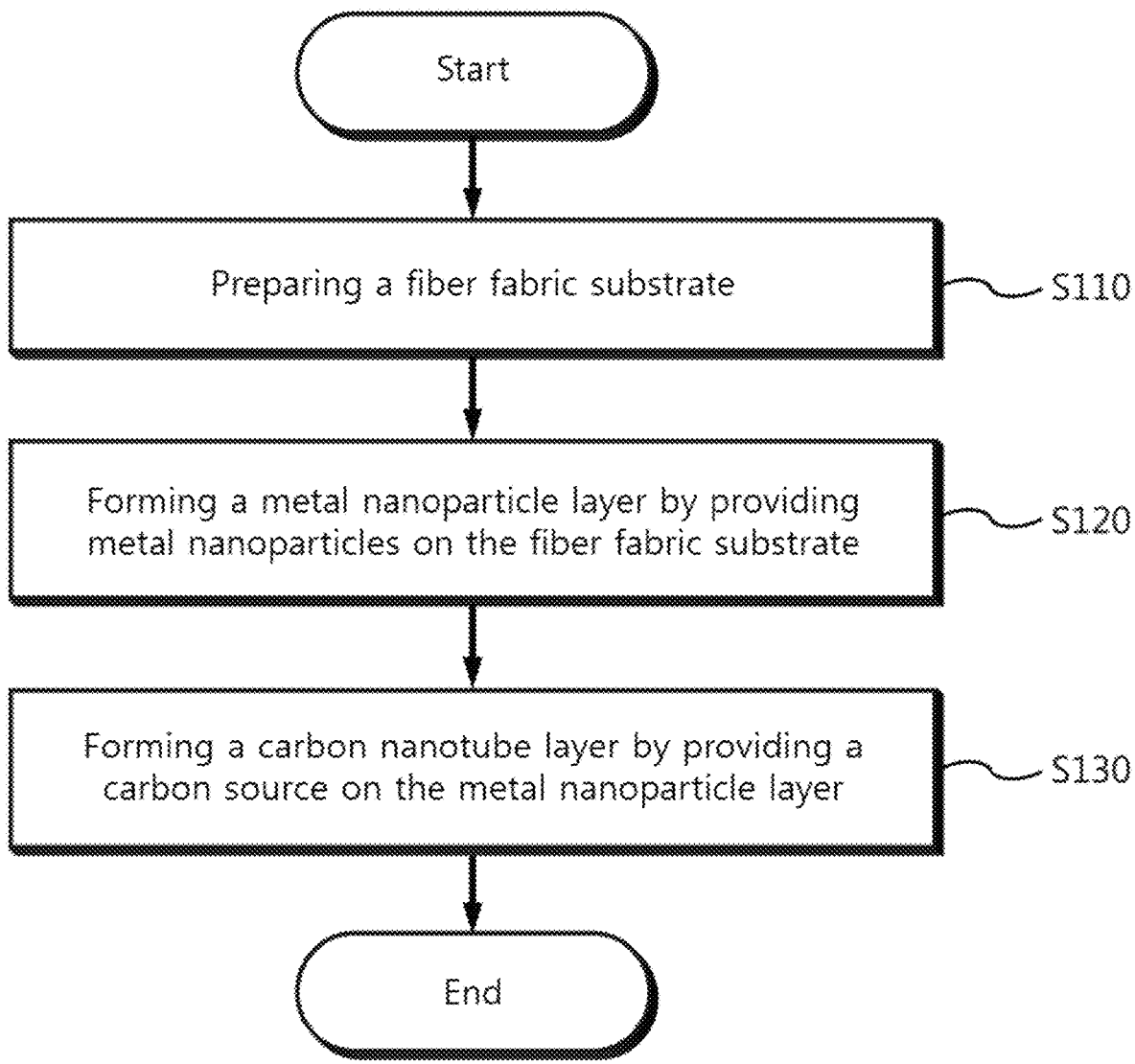
[Fig. 2]
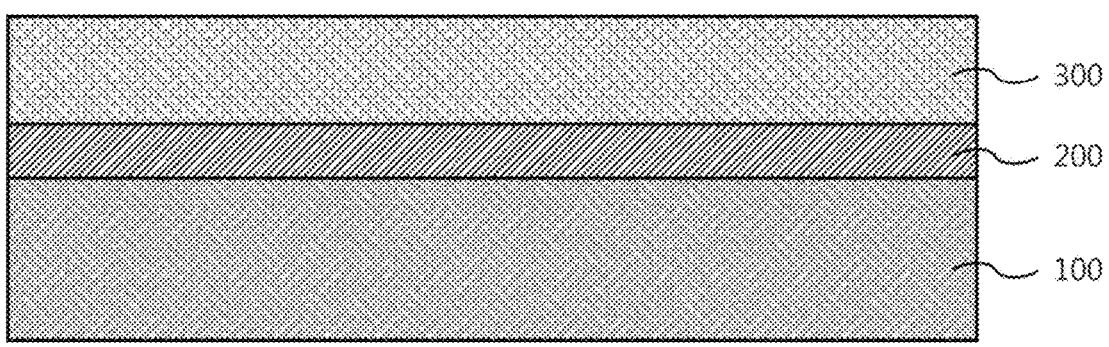

[Fig. 3]
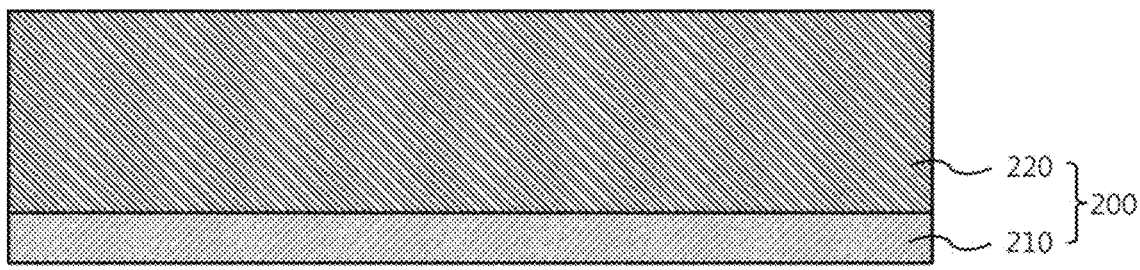
[Fig. 4]
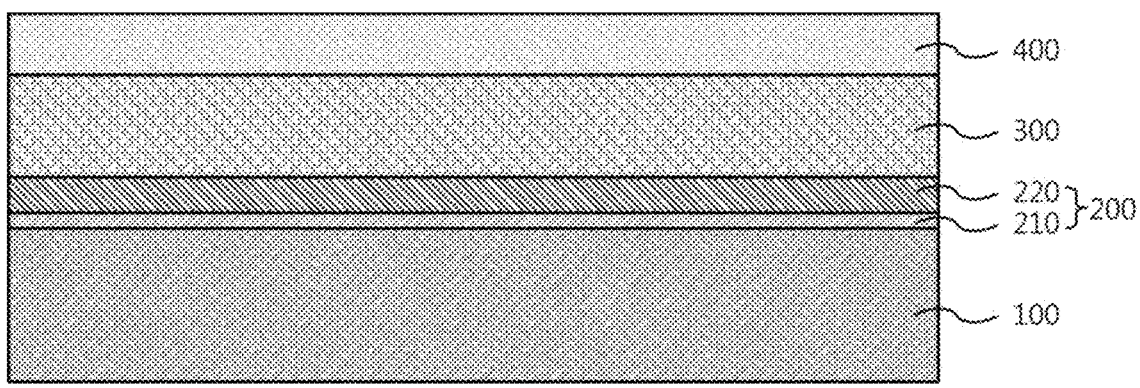
[Fig. 5]
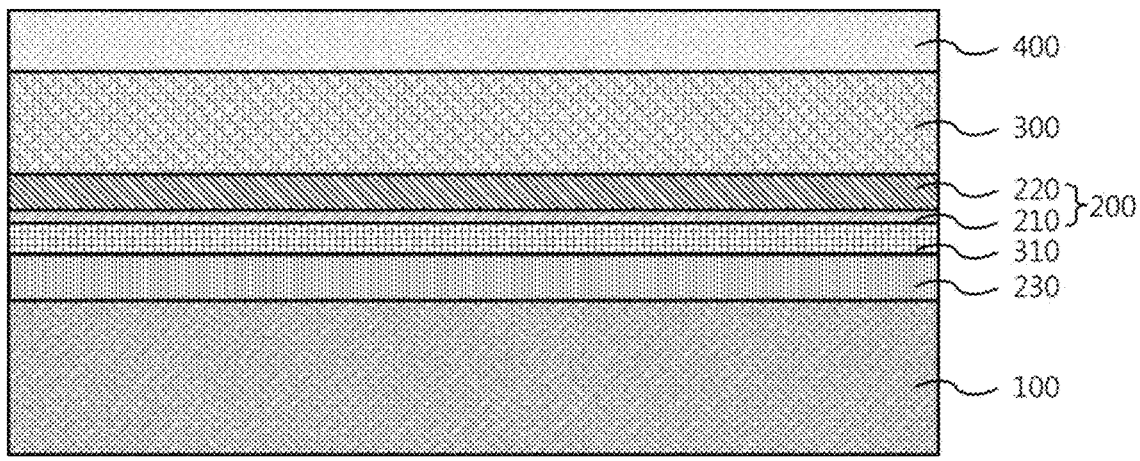

[Fig. 6]
|  | Woven Fabric Materials | | |
|---|---|---|---|
|  | CF (Carbon Fiber) | QF (Silica Fiber) | GF (Glass Fiber) |
| Weave Type | Plain Weave | 8-harness Satin | 8-harness Satin |
| Commercial Grade | TR30 | Astroquartz 581 | Fiberglass 1581 |
| Fiber Strength, GPa | 4.4 | 3.1 | 3.0 |
| Use in this study | Electrode Substrate | Substrate/Separator | Separator |
[Fig. 7]
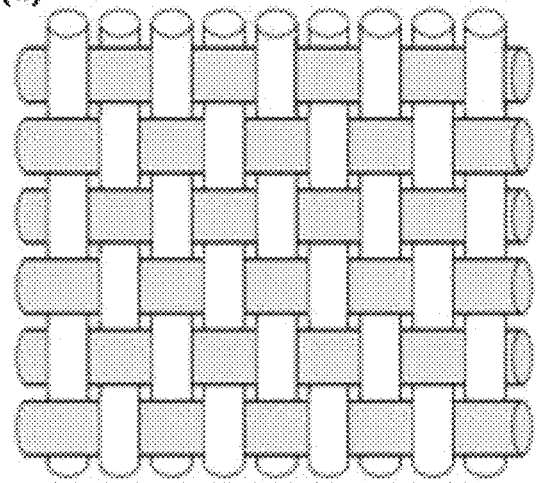
Plain Weave
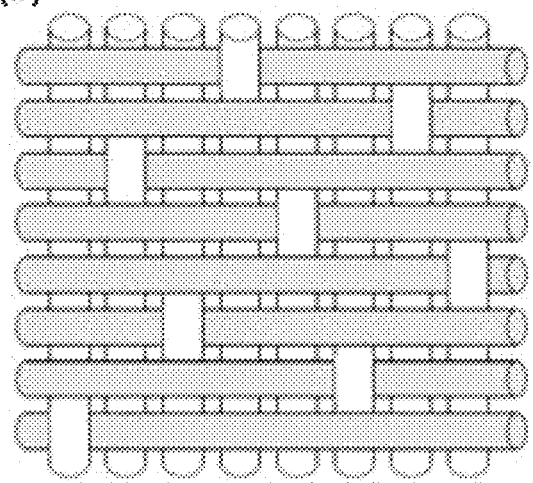
8-Harness Satin

[Fig. 8]
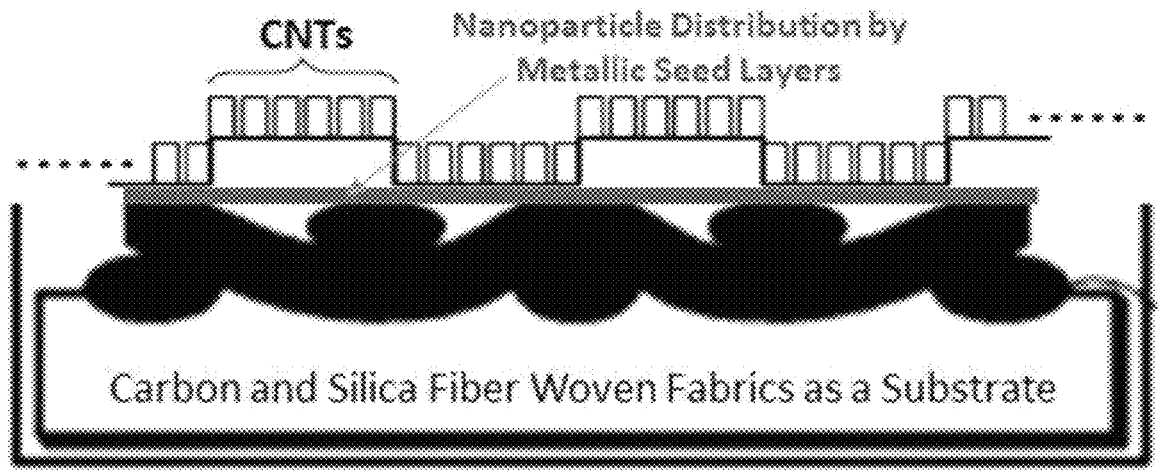
[Fig. 9]
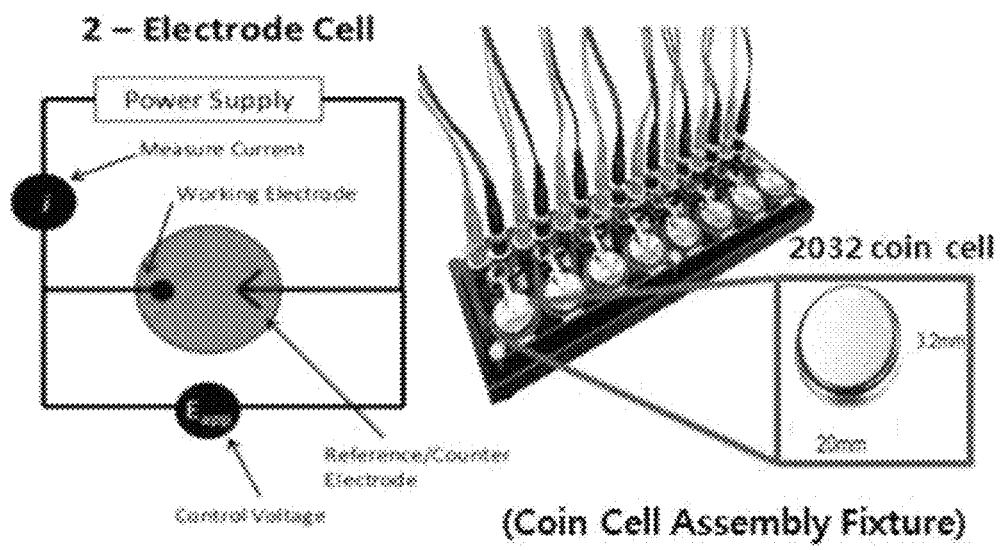

[Fig. 10]

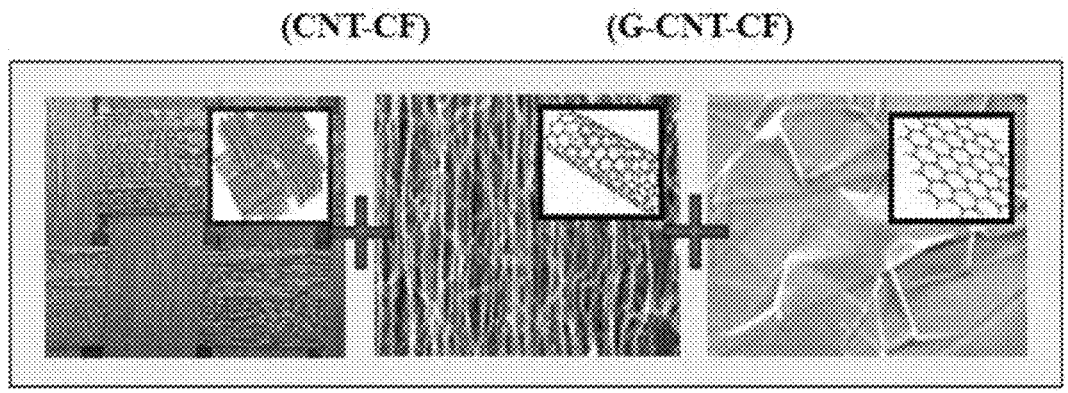

[Fig. 11]

| Nanostructured Process | Growth Condition | ① Graphene-Growth | ② CNT-Growth |
|---|---|---|---|
| Pre-process by e-beam | e-beam evaporator | Nanoparticle deposition by Metallic Seed Layer | |
| | | (Ni 600nm) | (Fe 1~2nm + Al 8~10nm) |
| PECVD Process | Carbon Source | CH$_4$ | CH$_4$ |
| | Flow Rate | 1sccm | 100sccm |
| | Growth Time | 5min | 5~10min (Max. 20min.) |
| | Temperature | 960→940→900℃ | 600~700℃ (Mean temp. 650℃) |
| | Carrier Gas | H$_2$ | H$_2$ (13.75MHz Plasma Assistance) |
| | Power | 50W | 220W at 800mTorr |
| | Annealing Time | 5min. | 10min. |

[Fig. 12]
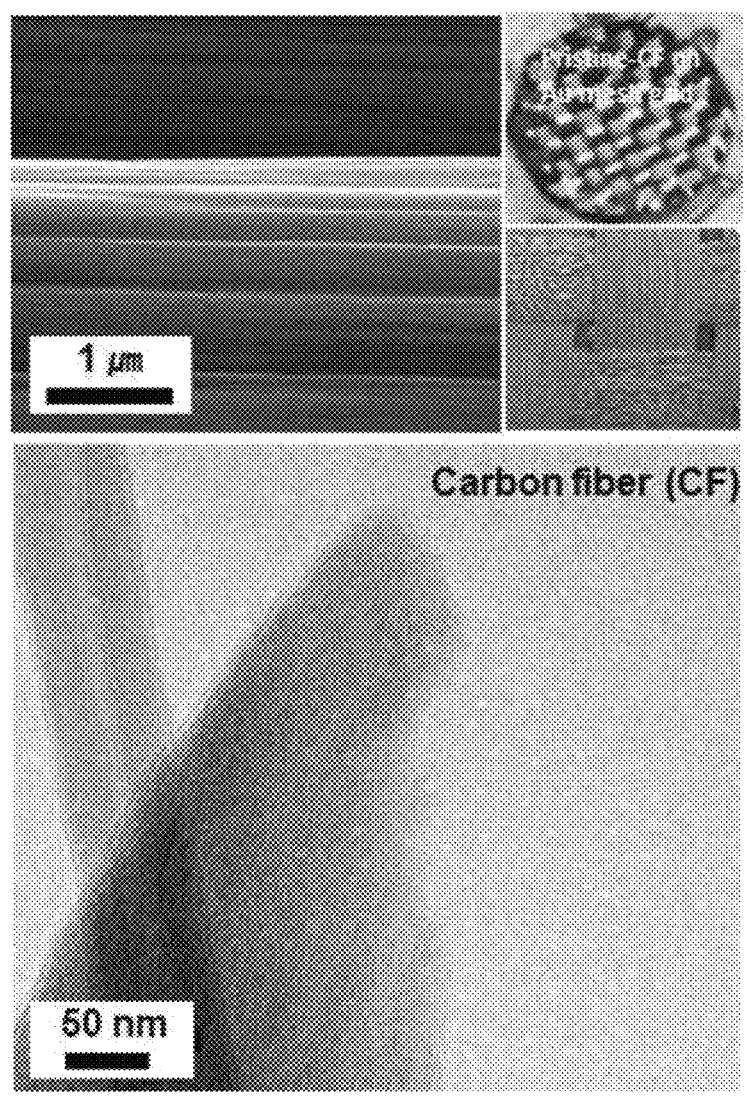

[Fig. 13]
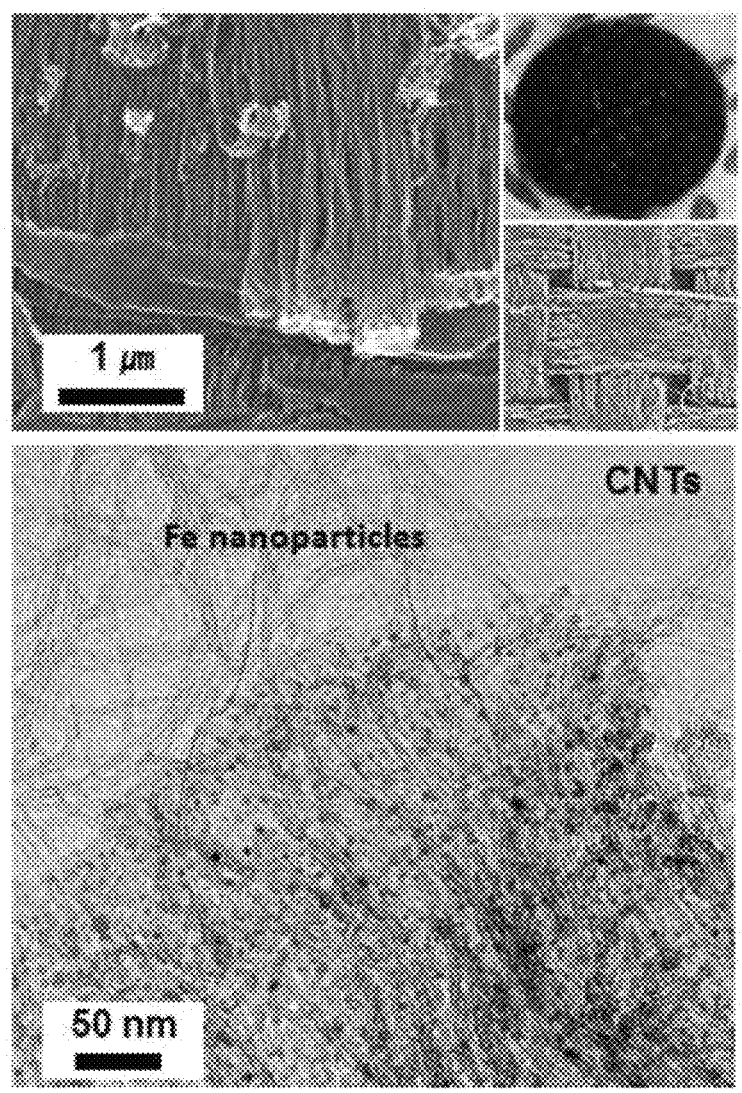

[Fig. 14]
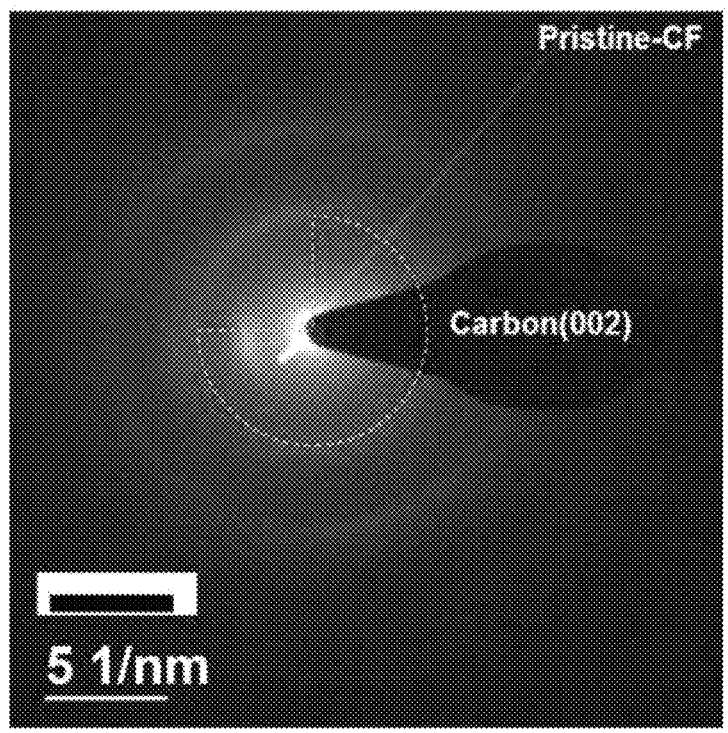
[Fig. 15]
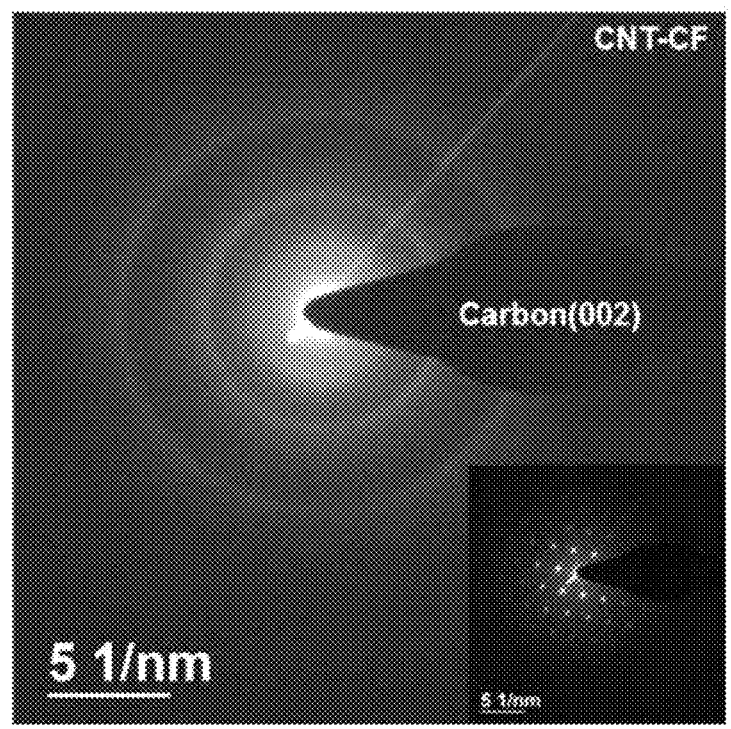

[Fig. 16]
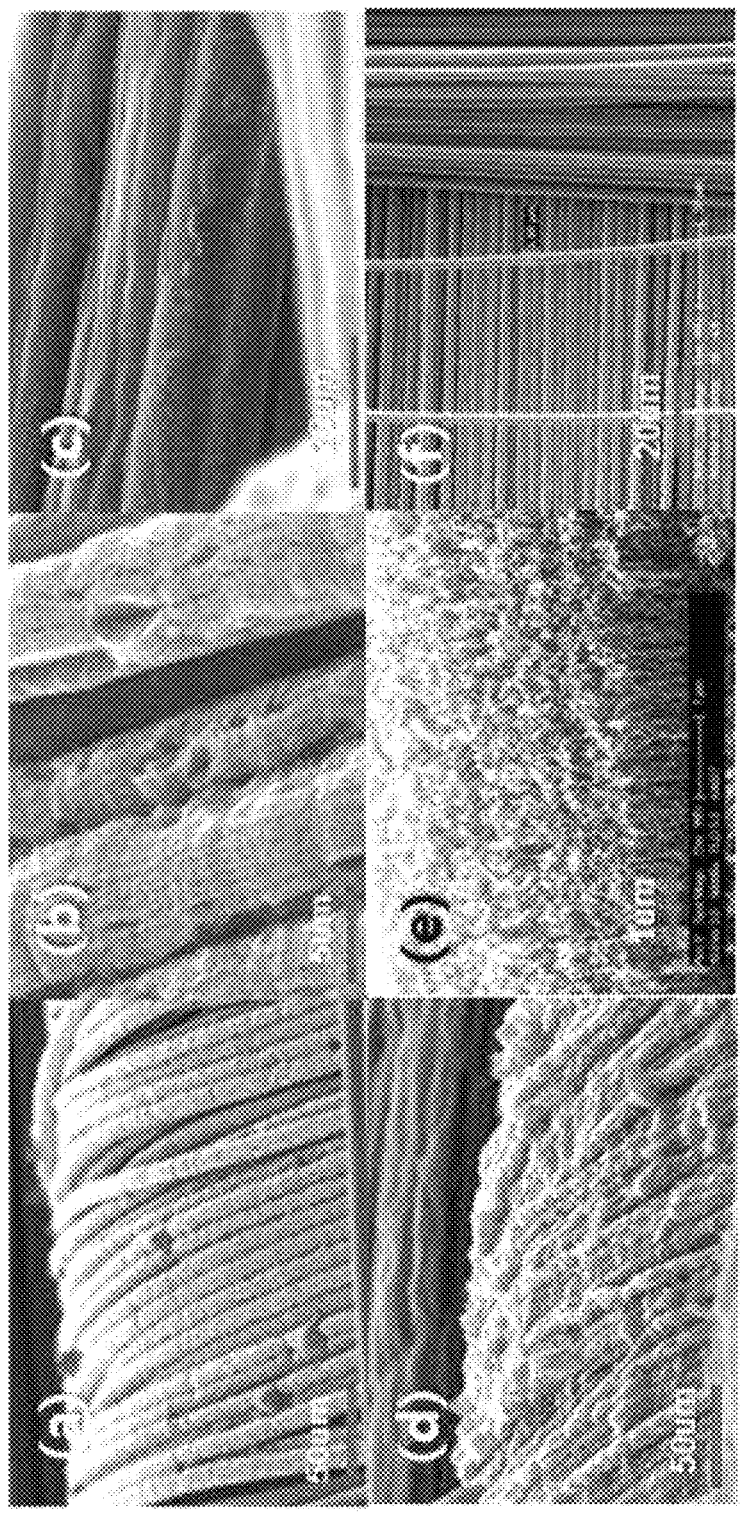

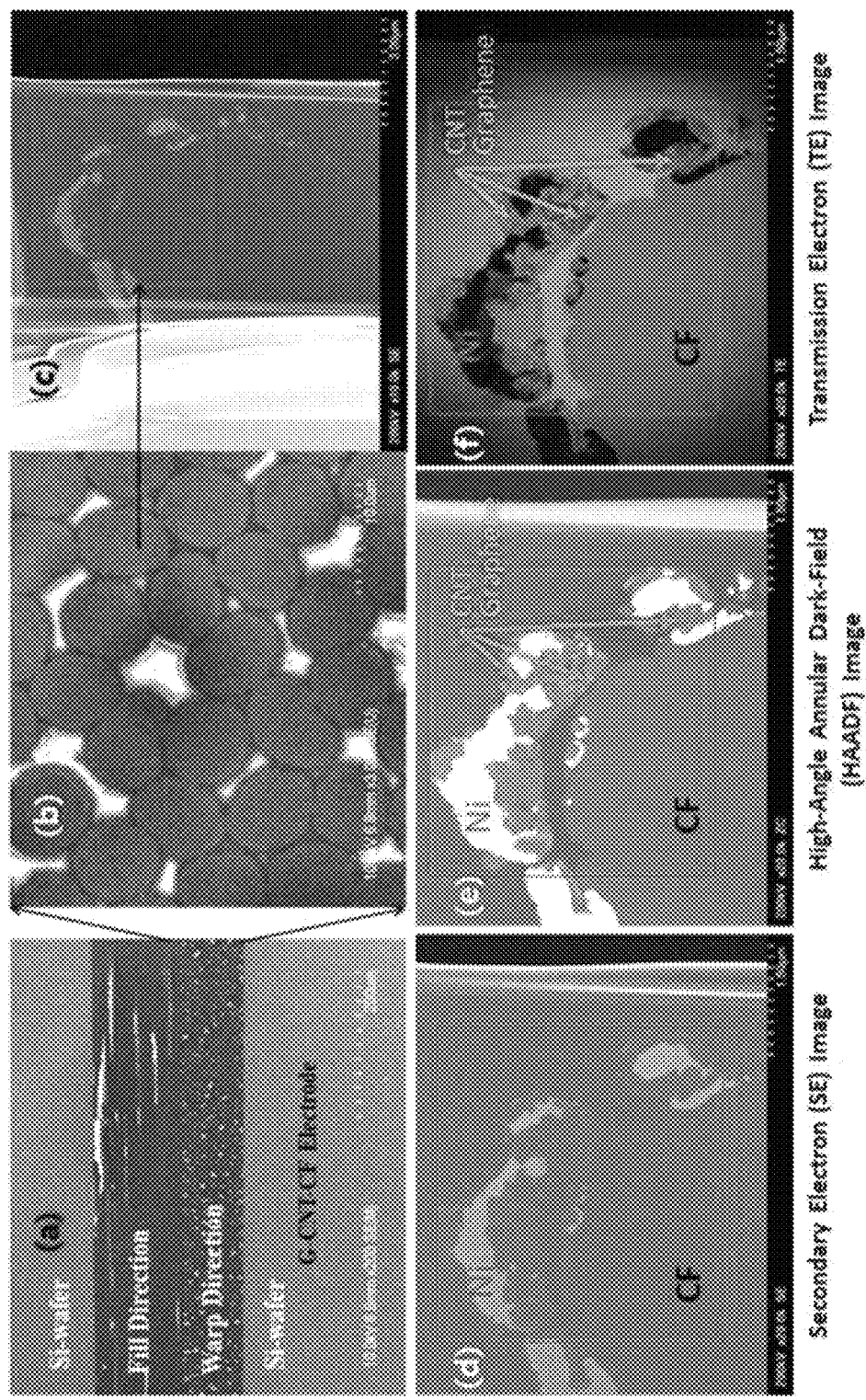
[Fig. 17]

[Fig. 18]

| No. | Experimental Condition | Carbon Fiber Woven Fabric | CNT Grown Carbon Fiber Woven Fabric | Graphene-CNT Grown Carbon Fiber Woven Fabric |
|---|---|---|---|---|
| 1 | Working Electrode (WE) | Pristine-CF | CNT-CF | G-CNT-CF |
| 2 | Counter Electrode (CE) | Li metal | | |
| 3 | Electrolyte | 1M $LiPF_6$ organic electrolyte in DC/EMC=1:1 vol. 1M $LiPF_6$ organic electrolyte in DC/DEC=1:1 vol. | | |
| 4 | Separator | Glass Fiber Woven Fabric (Ø19mm x Thick0.26mm) | | |
| 5 | Test Cell Standard | CR2032 coin cell | | |
| 6 | Charge/Discharge Condition | 250μA CC-CV in 0.01~2V, 100~200 cycles at 0.05C-rate, RT (the rate capability test at 0.05C up to 10C-rate at RT) | | |

[Fig. 19]

| Sample | Elemental Analysis (EA) | Inductively Coupled Plasma (ICP) | | |
|---|---|---|---|---|
| | C (%) | Al (mg/kg) | Fe (mg/kg) | Ni (mg/kg) |
| Pristine-CF | 94.621 | 192 | 301 | 31.5 |
| CNT-CF | 97.265 | $2.05 \times 10^3$ | $1.54 \times 10^5$ | 76.4 |
| G-CNT-CF | 73.494 | 407 | 634 | $3.33 \times 10^4$ |

[Fig. 20]
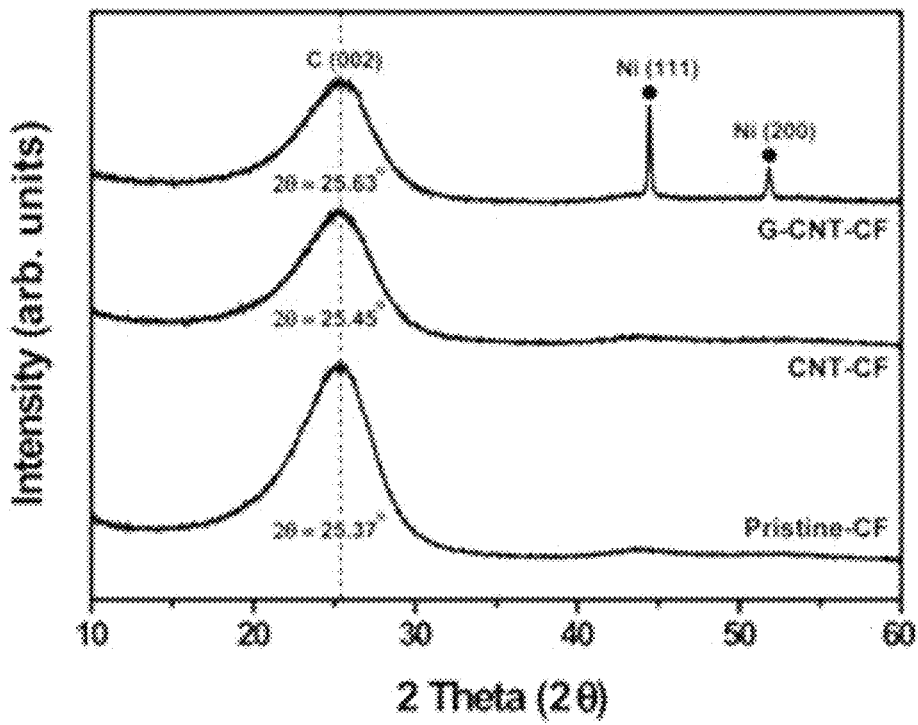
[Fig. 21]
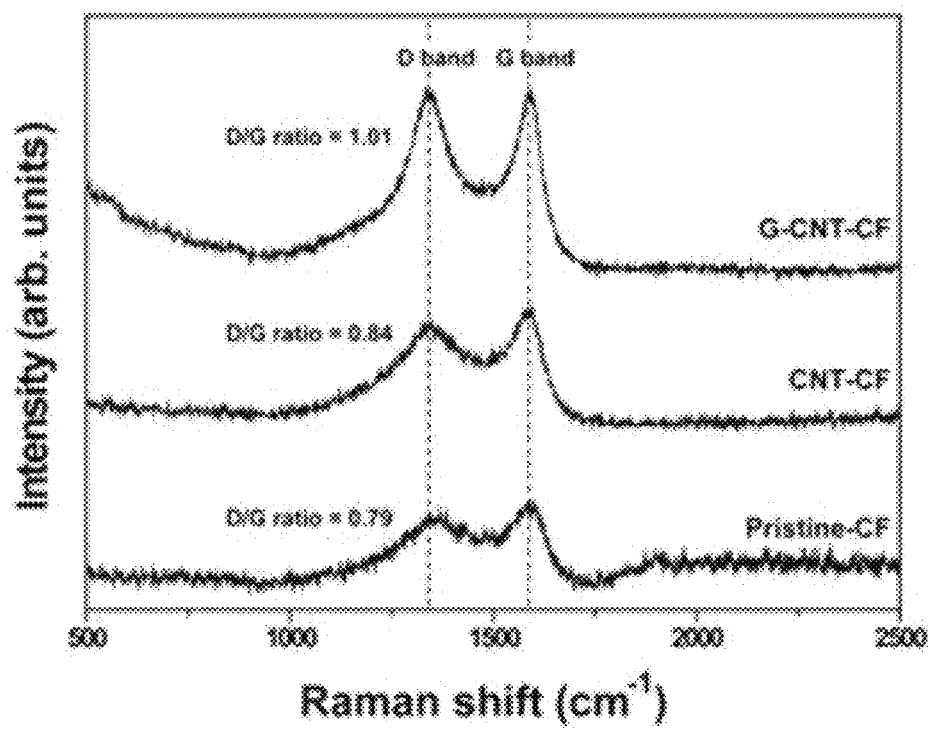

[Fig. 22]
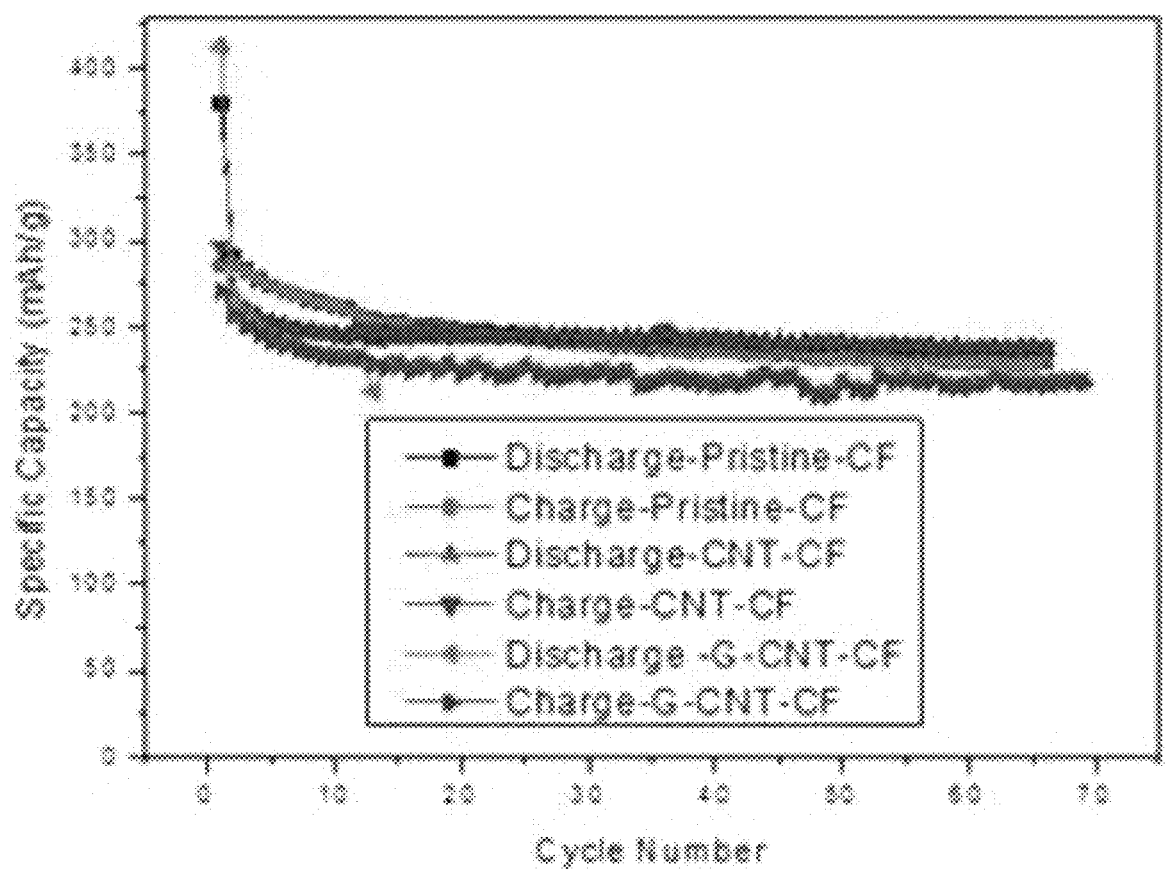

[Fig. 23]
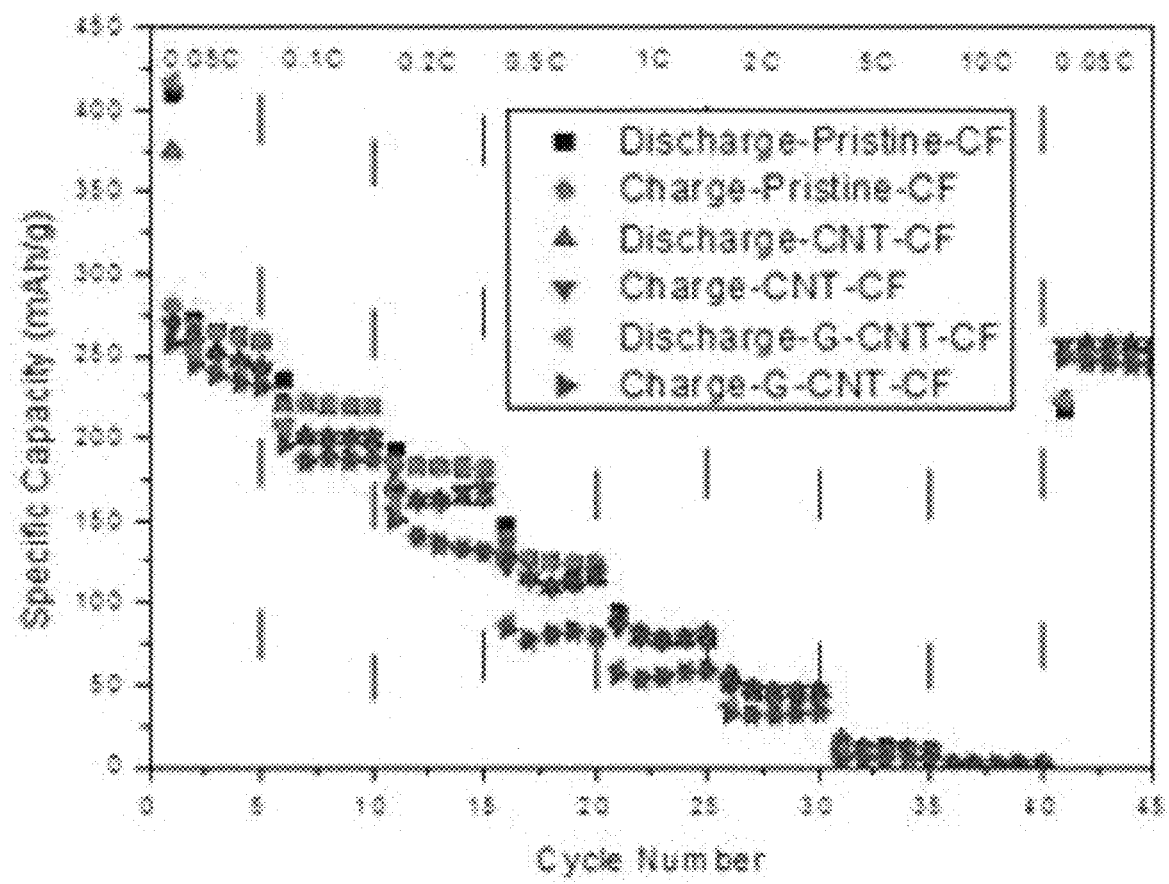

[Fig. 24]
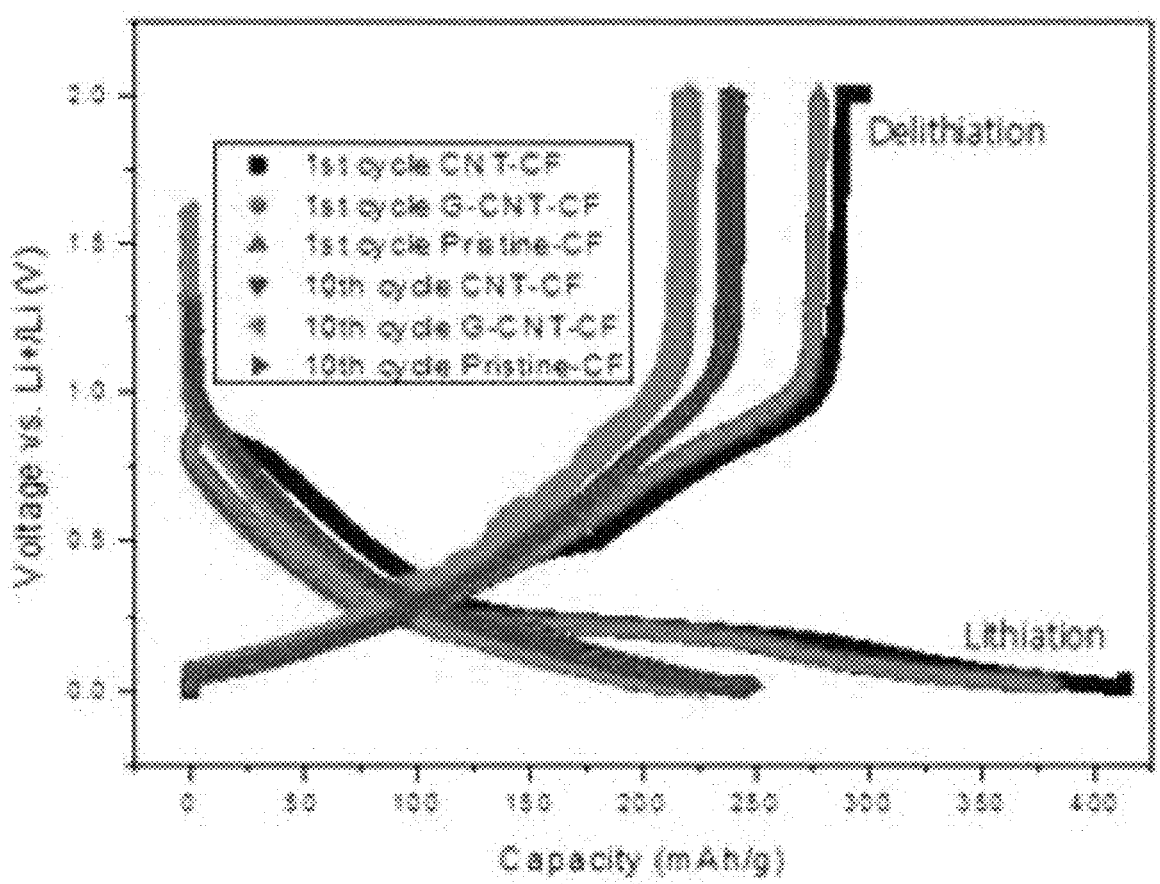

[Fig. 25]
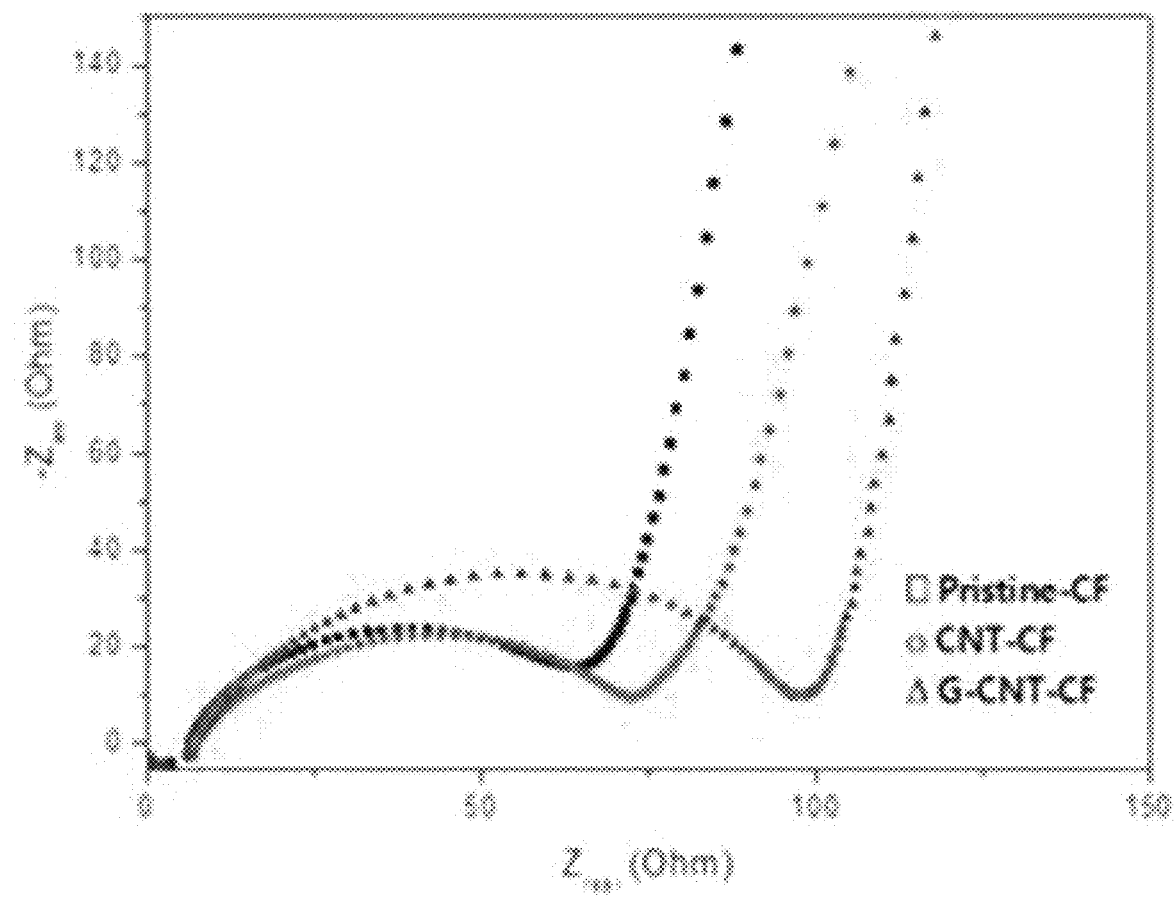

[Fig. 26]
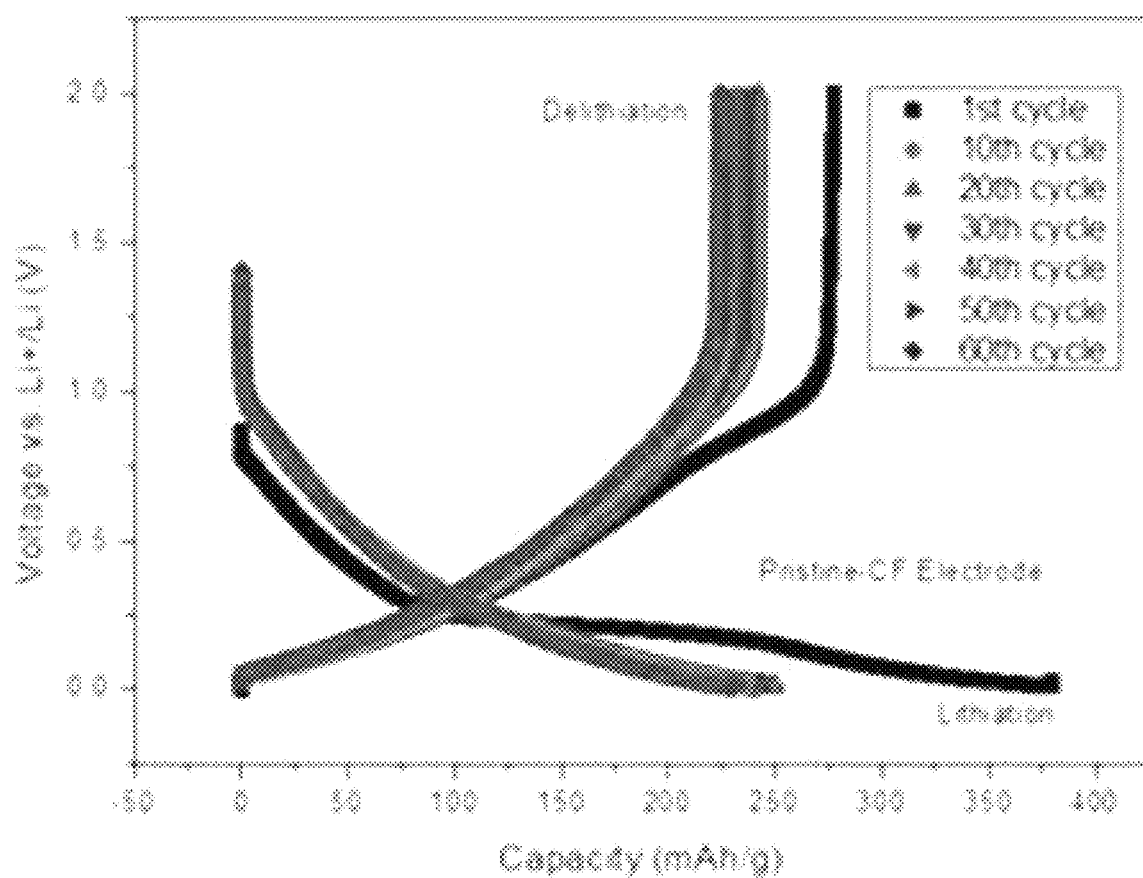

[Fig. 27]
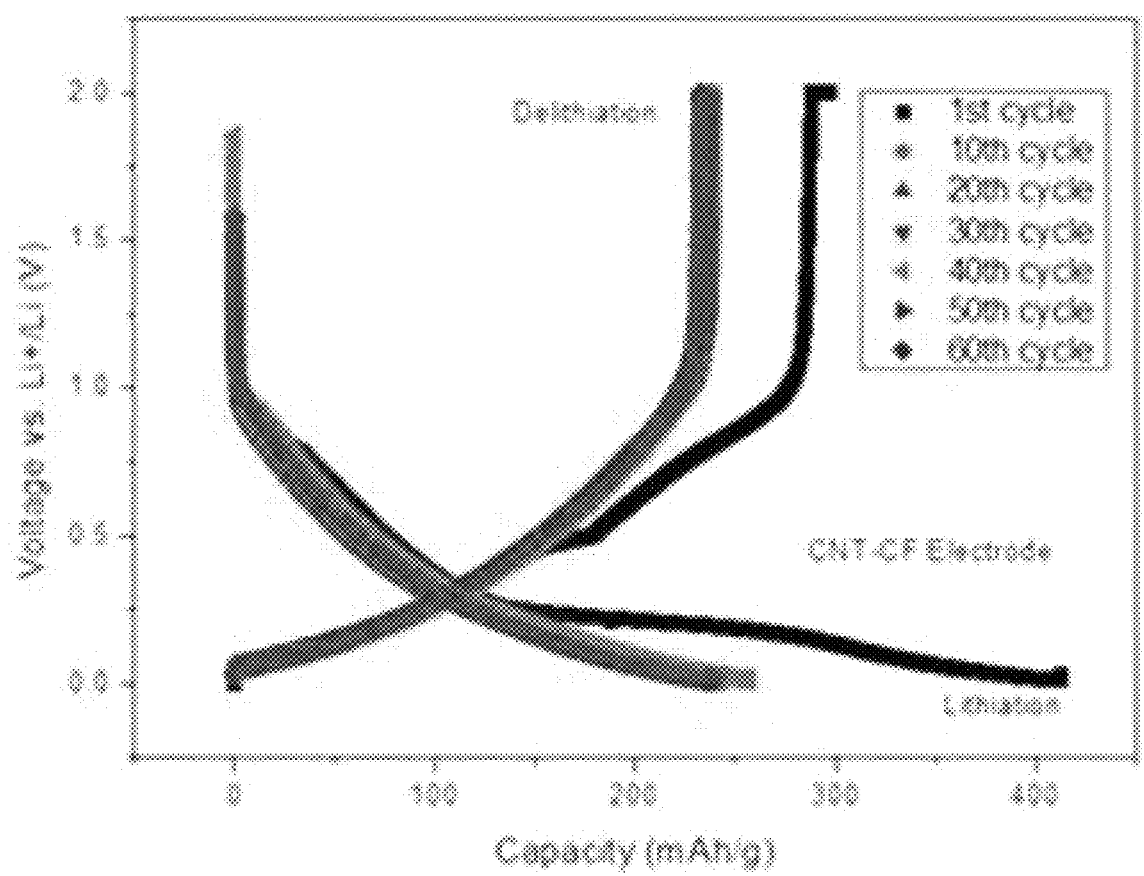

[Fig. 28]
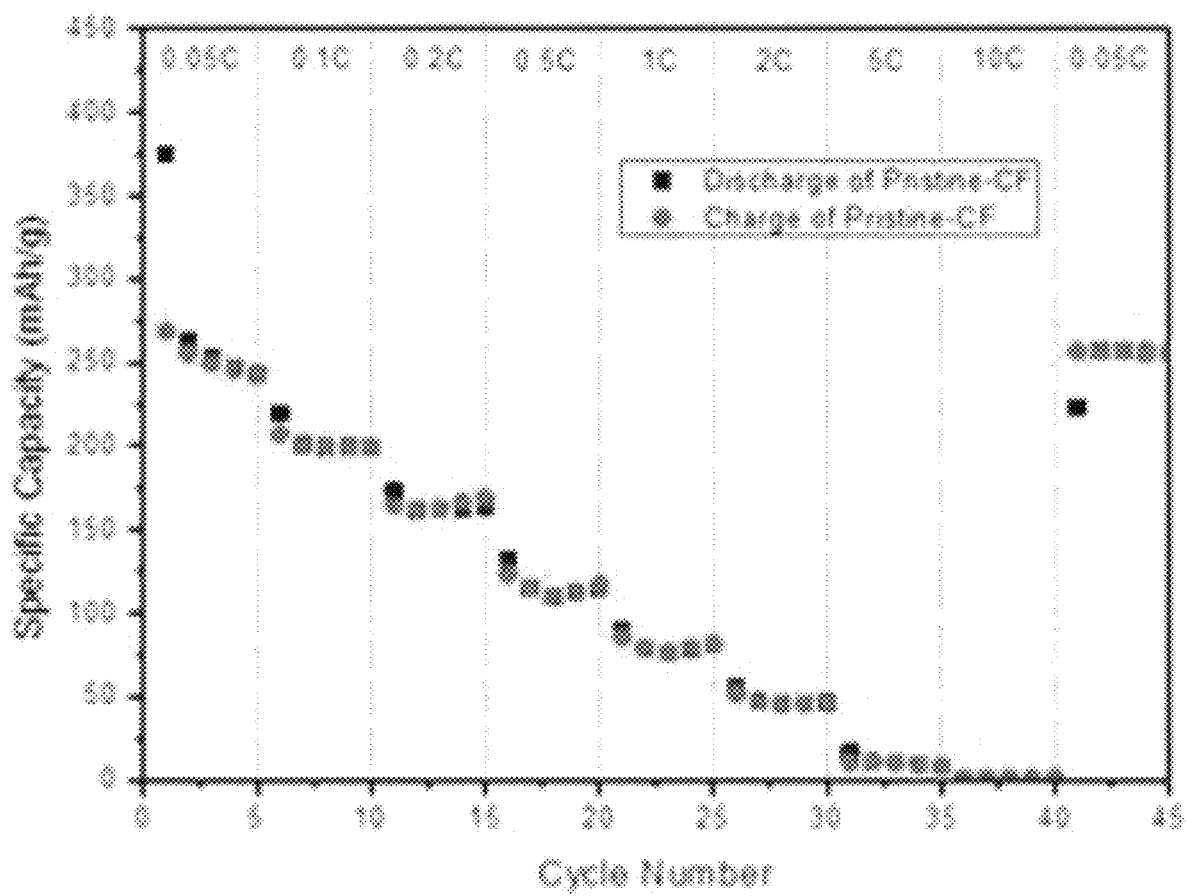

[Fig. 29]
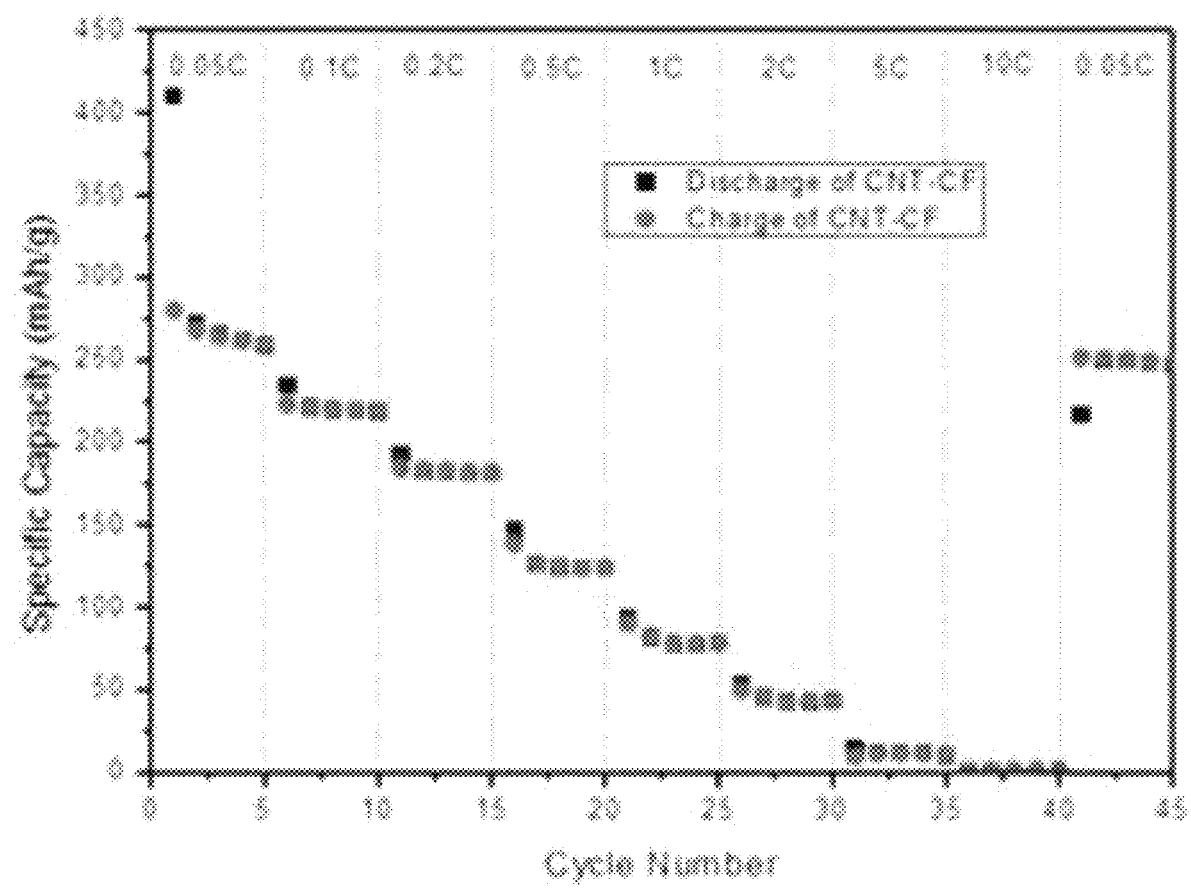

[Fig. 30]
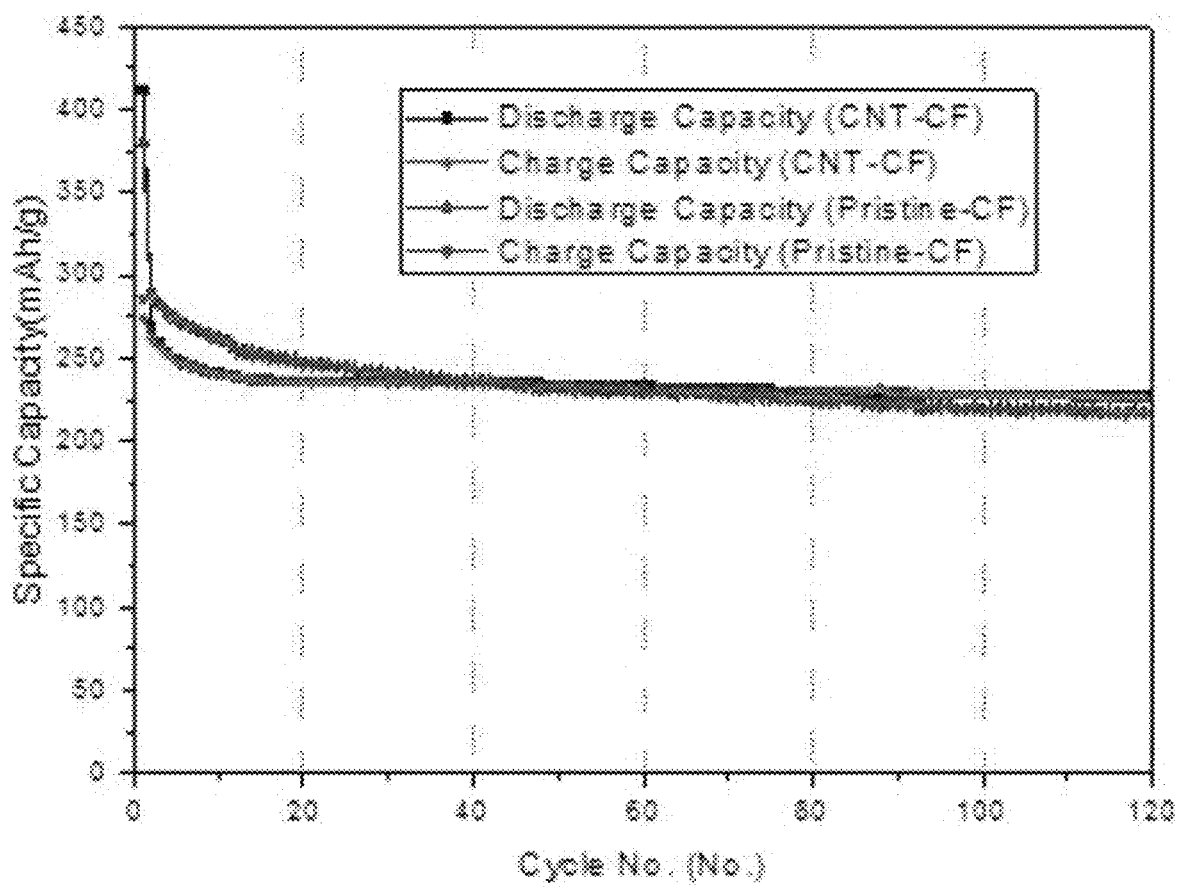
[Fig. 31]
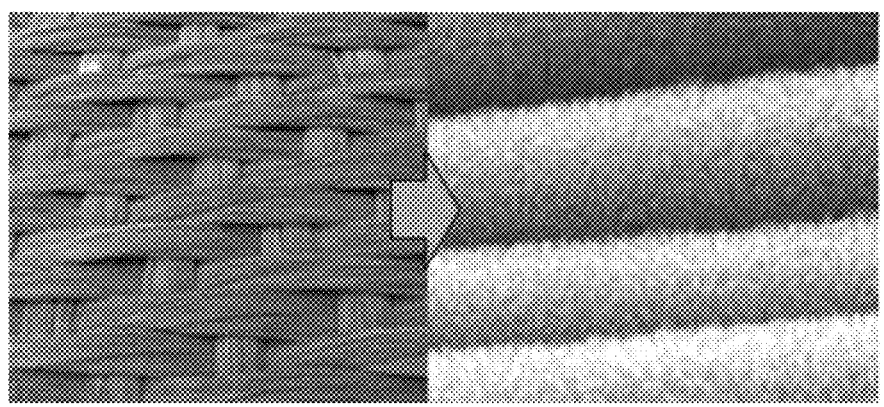

[Fig. 32]

| Mechanical Properties | |
|---|---|
| Filament Diameter, Yarn, and Fabric, μm | 9.0 |
| Specific Gravity (Density), g/cc | 2.2 |
| Hardness (Mohs Scale) | 5-6 |
| Pristine Filament Strength, GPa, RT | 6.0 |
| Yarn Strand Tensile Strength, GPa, RT | 3.4 |
| Yarn Tensile Modulus, GPa, RT | 69 |
| Physical Properties | |
| Liquidus Temperature, °C | 1670 |
| Temperature at Max. Crystallization, °C | 1630 |
| Coefficient of Thermal Expansion, 0-1000°C, °C | $5.4 \times 10^{-7}$ |
| Thermal Stability (Short Term), to °C | 2000 |
| Thermal Stability (Long Term), to °C | 1200 |
| Thermal Conductivity at 20°C, CGS | 0.0033 |
| Dielectric Constant at 20°C, 1MHz | 3.78 |
| Refractive Index at 15°C, $n_D$ | 1.4585 |

[Fig. 33]
| Nanostructured Process | Growth Condition | CNT-Growth |
|---|---|---|
| Pre-process by e-beam | Nanoparticle deposition by Metallic Seed Layer by e-beam evaporator | (Fe 1~2nm + Al 3~10nm) |
| PECVD Process | Carbon Source | CH₄ |
| | Flow Rate | 100sccm |
| | Growth Time | 20~30min (Max. 40min.) |
| | Temperature | 600~700℃ (Mean temp. 650℃) |
| | Carrier Gas | H₂ (13.75MHz Plasma Assistance) |
| | Power | 320W at 300mTorr |
| | Annealing Time | 10min. |
[Fig. 34]
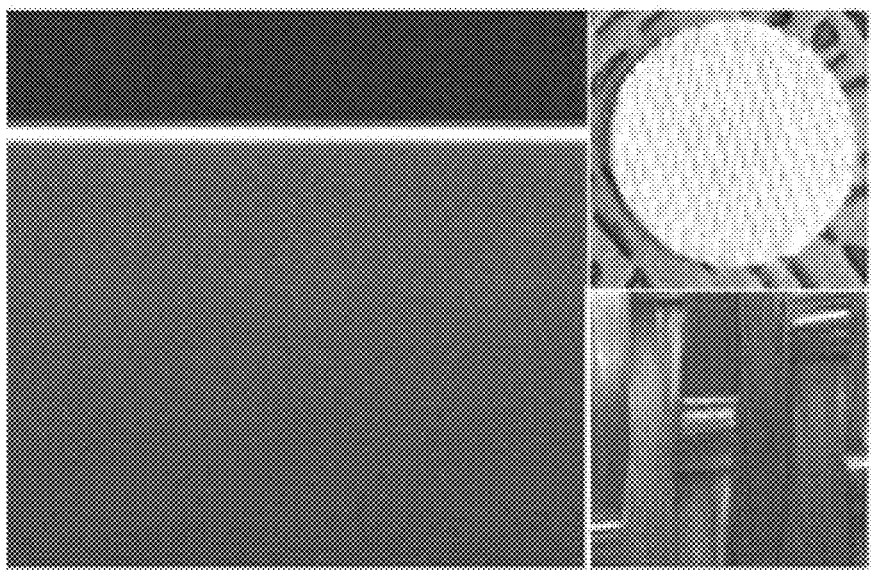

[Fig. 35]
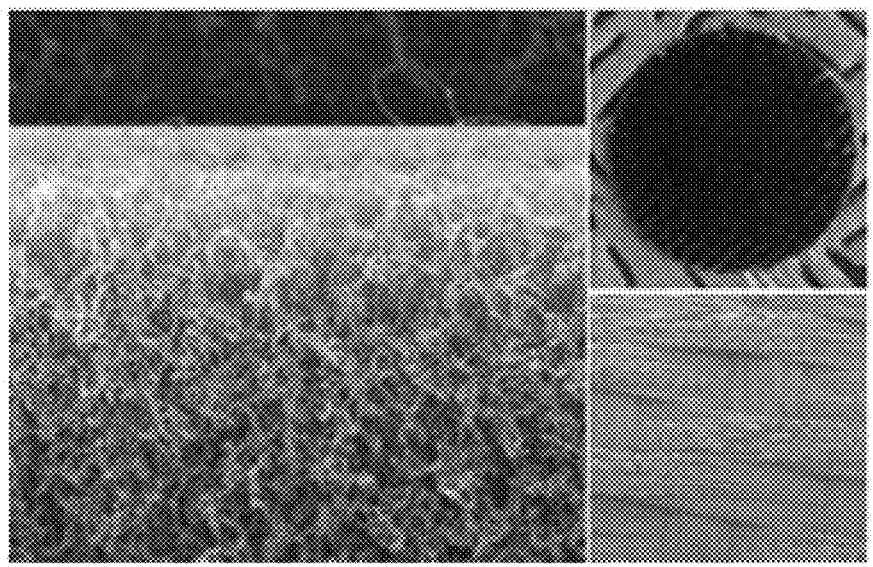

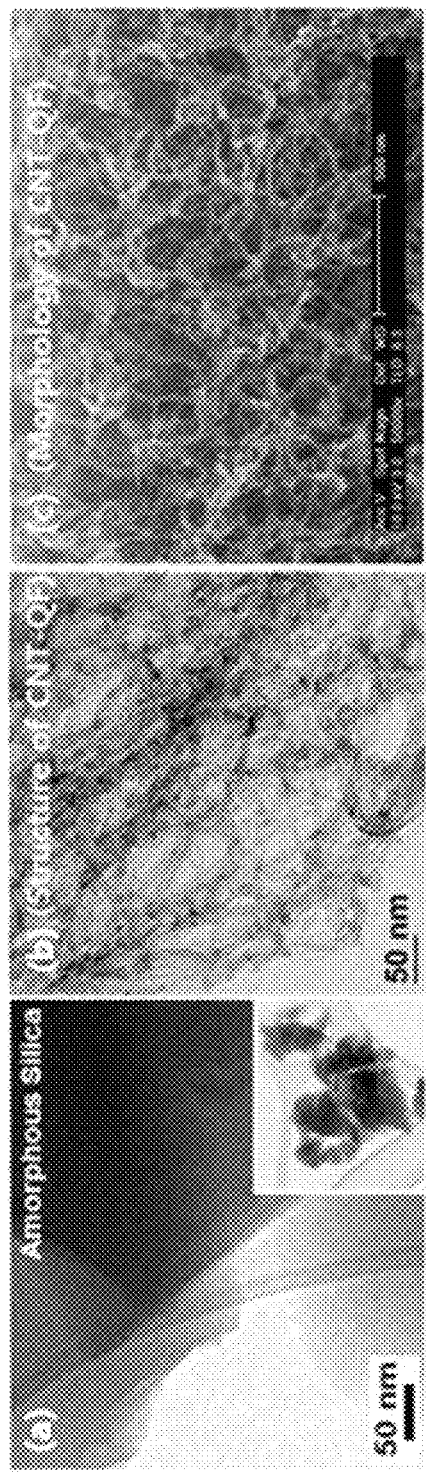
[Fig. 36]

[Fig. 37]
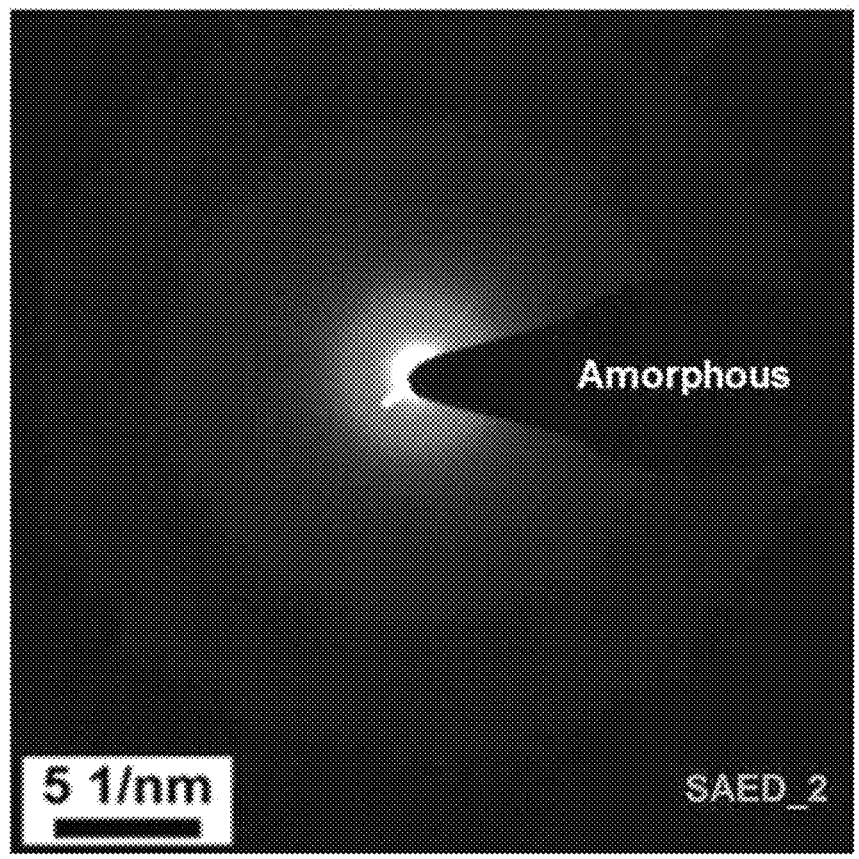

[Fig. 38]
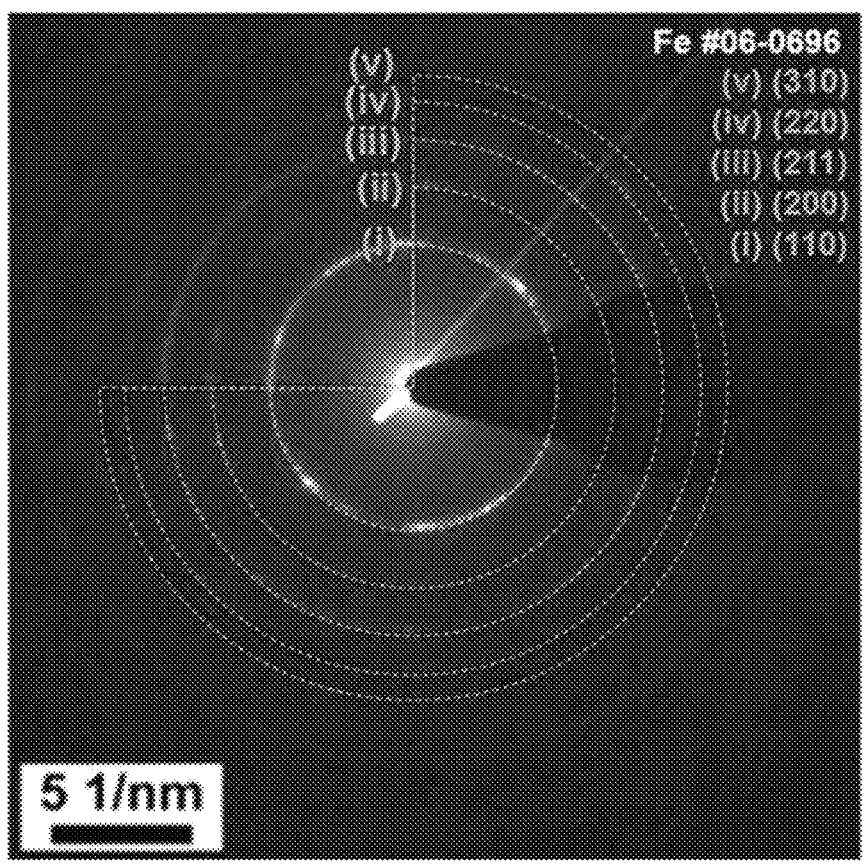

[Fig. 39]

| No. | Experimental Condition | Silica Fiber Woven Fabric | CNT Grown Silica Fiber Woven Fabric |
|---|---|---|---|
| 1 | Working Electrode (WE) | Pristine-QF | CNT-QF |
| 2 | Counter Electrode (CE) | Li metal ||
| 3 | Electrolyte | 1M LiPF6 organic electrolyte in DC/DEC=1:1 vol. ||
| 4 | Separator | Glass Fiber Woven Fabric (Ø18mm x Thick0.26mm) ||
| 5 | Test Cell Standard | CR2032 coin cell ||
| 6 | Charge/Discharge Condition | 250μA CC-CV in 0.01~2V, 30~120 cycles at 0.05C-rate, RT ||

[Fig. 40]

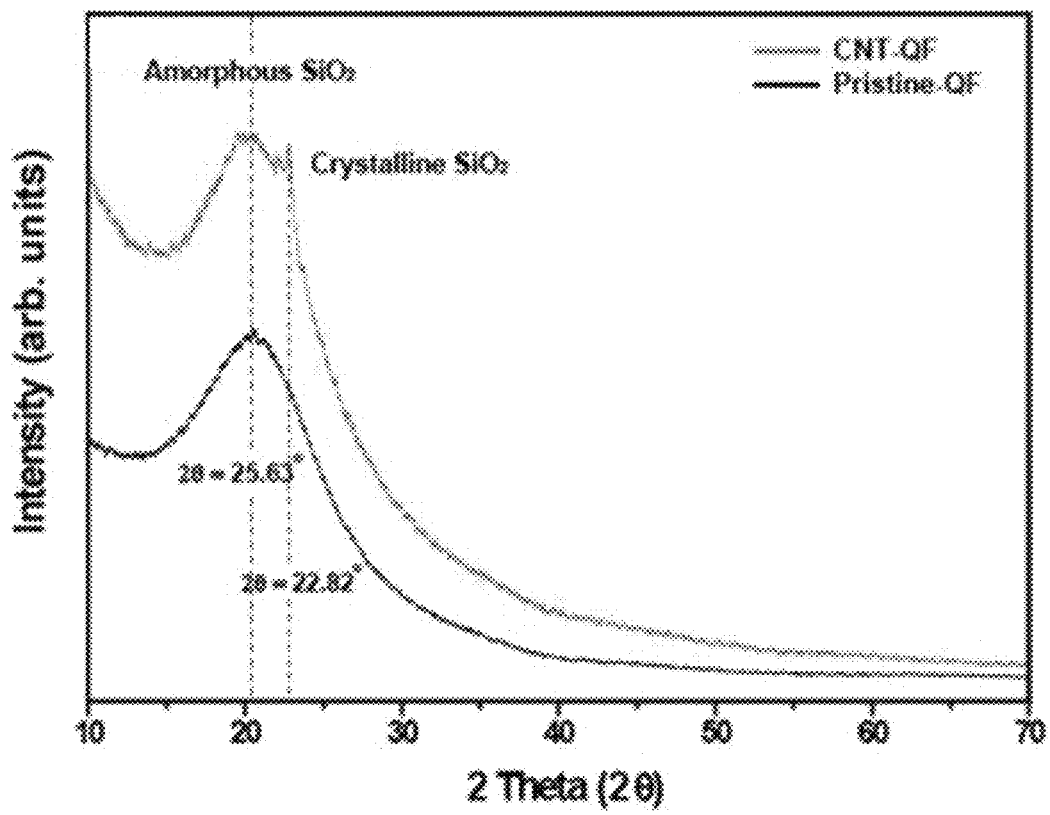

[Fig. 41]
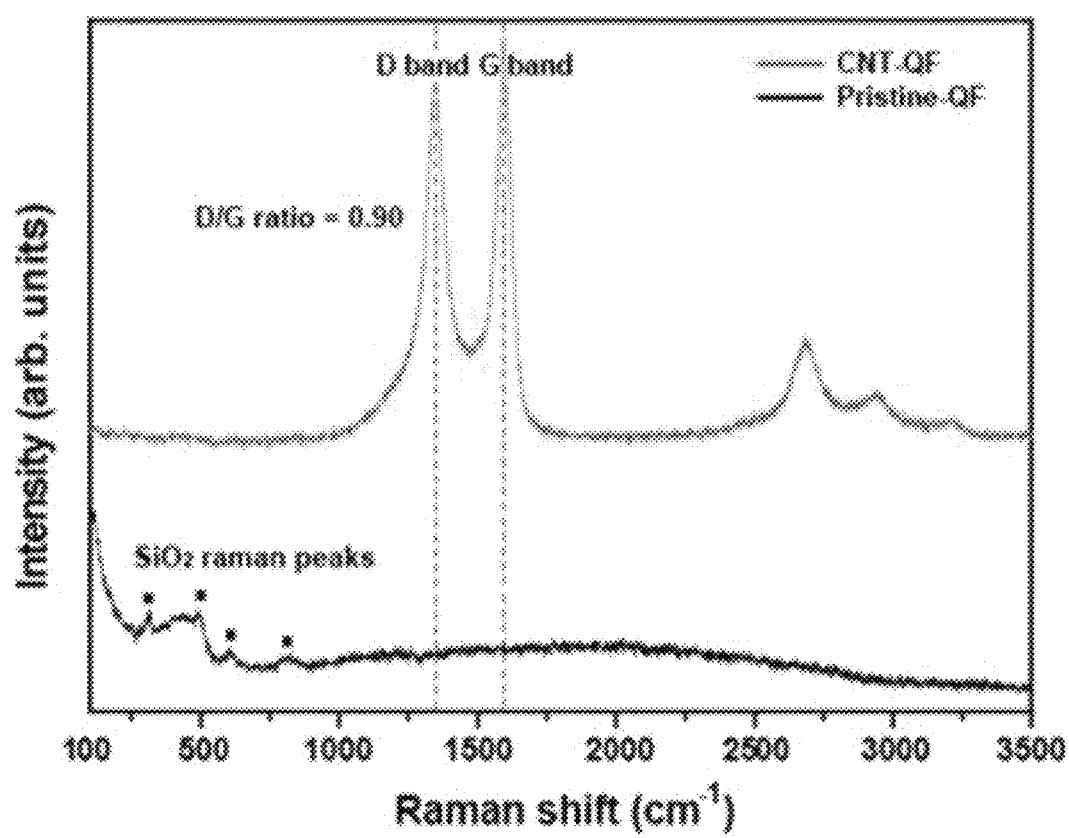
[Fig. 42]
| Sample | Elemental Analysis (EA) | Inductively Coupled Plasma (ICP) | | |
|---|---|---|---|---|
| | C (%) | Al (mg/kg) | Fe (mg/kg) | Si (mg/kg) |
| Pristine-QF | 0.161 | 48.2 | 56.9 | $4.85 \times 10^5$ |
| CNT-QF | 0.226 | 115 | 83.3 | $4.96 \times 10^5$ |

[Fig. 43]

| | Half Cell Fabrication | Half Cell Component's Lay-up Sequence |
|---|---|---|
| 1 | Major Cell Components | WE/Electrolyte/Separator/CE |
| 2 | Cell Fabrication | CNT-QF/LiPF$_6$+DC+DEC/GF1581/Li-metal<br>Pristine-QF/LiPF$_6$+DC+DEC/GF1581/Li-metal |
| 3 | Coin Cell Component's Fabrication Order | WE Cap/WE/Electrolyte Wetting/GWF Separator/Electrolyte Wetting/Gasket/CE/Spacer/Spring/CE Cap |

[Fig. 44]

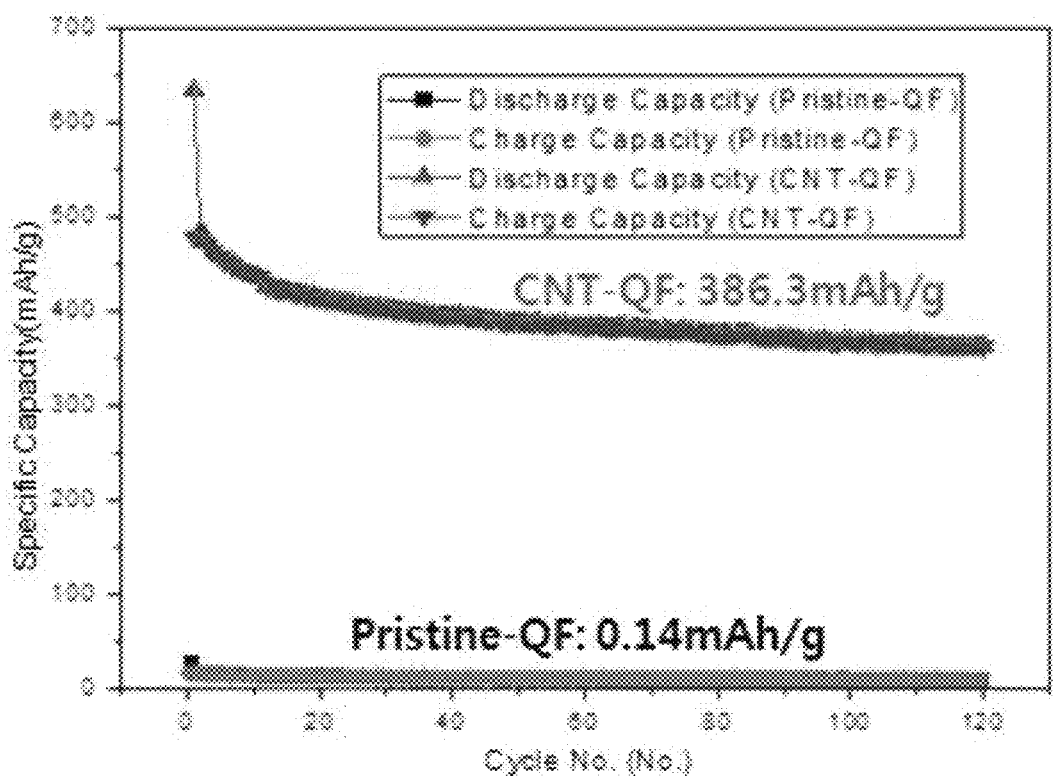

[Fig. 45]

| Contents | Cathode | |
| --- | --- | --- |
| | LFP(LiFePO$_4$) | LCO(LiCoO$_2$) |
| Areal Capacity | 0.233mAh/cm² | 3.3mAh/cm² |
| Electrode Thickness | 20μm | 90μm |
| | (include. Al foil 11μm) | |
| Active Material Formulation | LFP(Active):Carbon Black(Super P):Binder (PVDF) = 75:17:8 | Unknown |
| Active Material Ratio | 75% | 95.6% |
| Place of Manufacturing | Lab-scale Fabrication | Commercial Grade (Thick Lamination) |

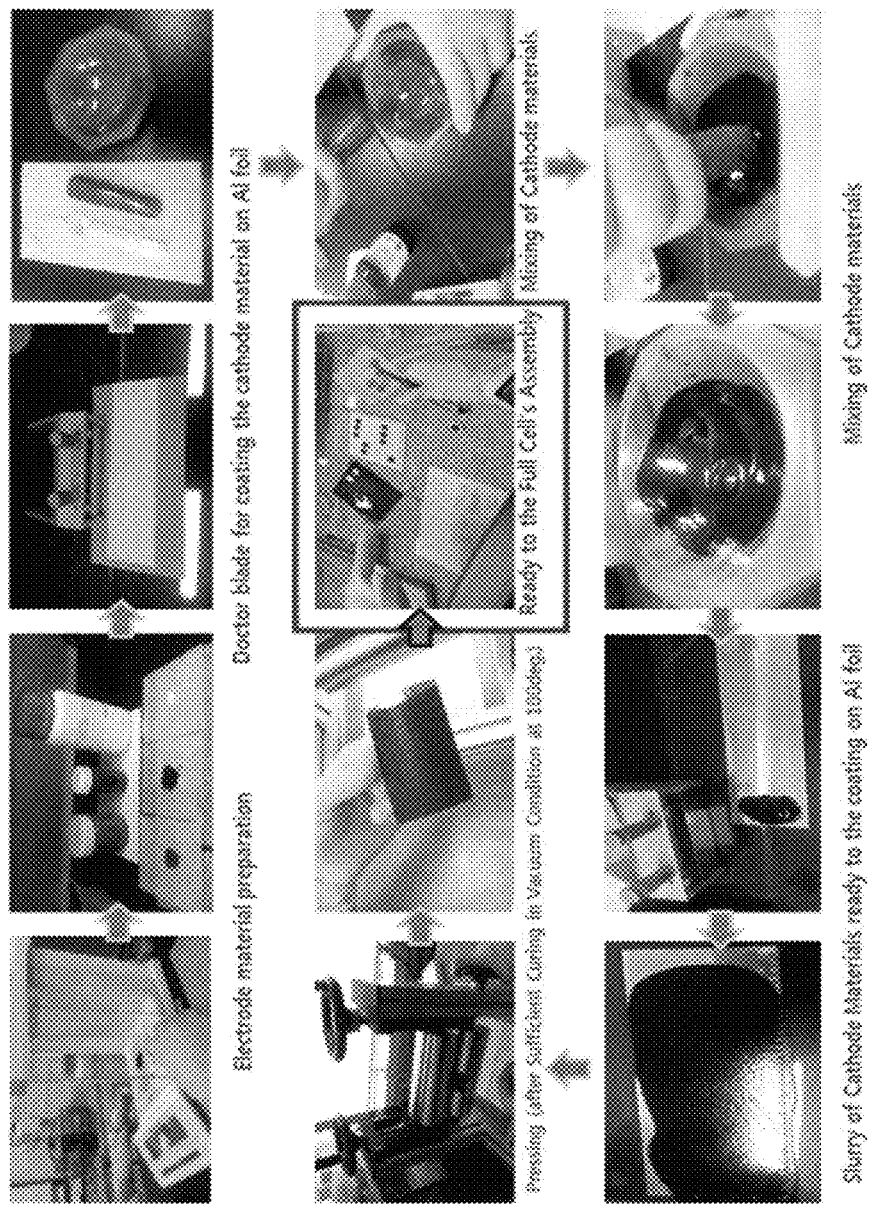

[Fig. 47]

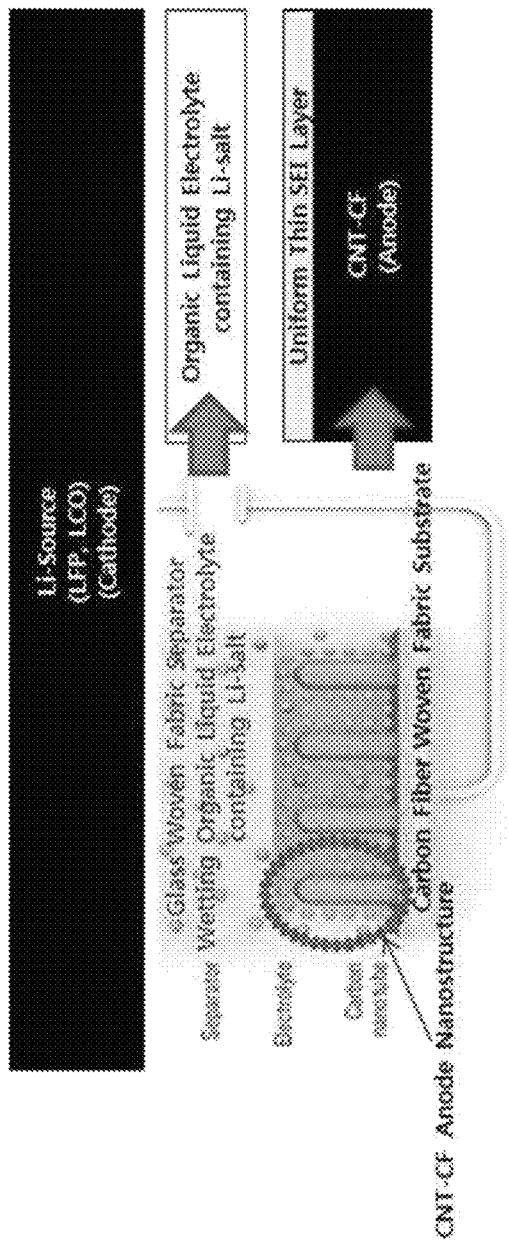
[Fig. 48]

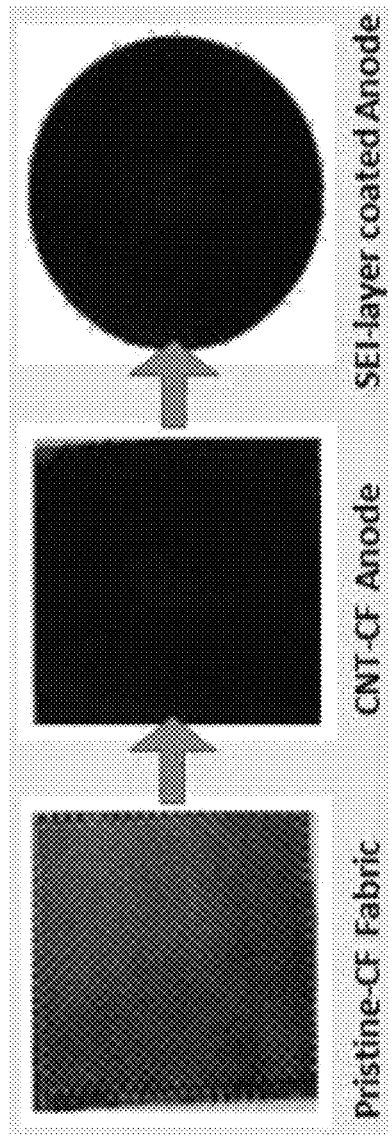
[Fig. 49]

[Fig. 50]

| | Half Cell Fabrication | Half Cell Component's Lay-up Sequence |
|---|---|---|
| 1 | Major Cell Components | WE/Electrolyte/Separator/CE |
| 2 | Cell Fabrication (① and ②) | ① LFP(LiFePO$_4$)/LiPF$_6$+DC+DEC/GF1581/Li-metal<br>② LCO(LiCoO$_2$)/LiPF$_6$+DC+DEC/GF1581/Li-metal |
| 3 | Coin Cell Component's Fabrication Order | WE Cap/WE/Electrolyte Wetting/GWF Separator/Electrolyte Wetting/Gasket/CE/Spacer/Spring/CE Cap |

[Fig. 51]

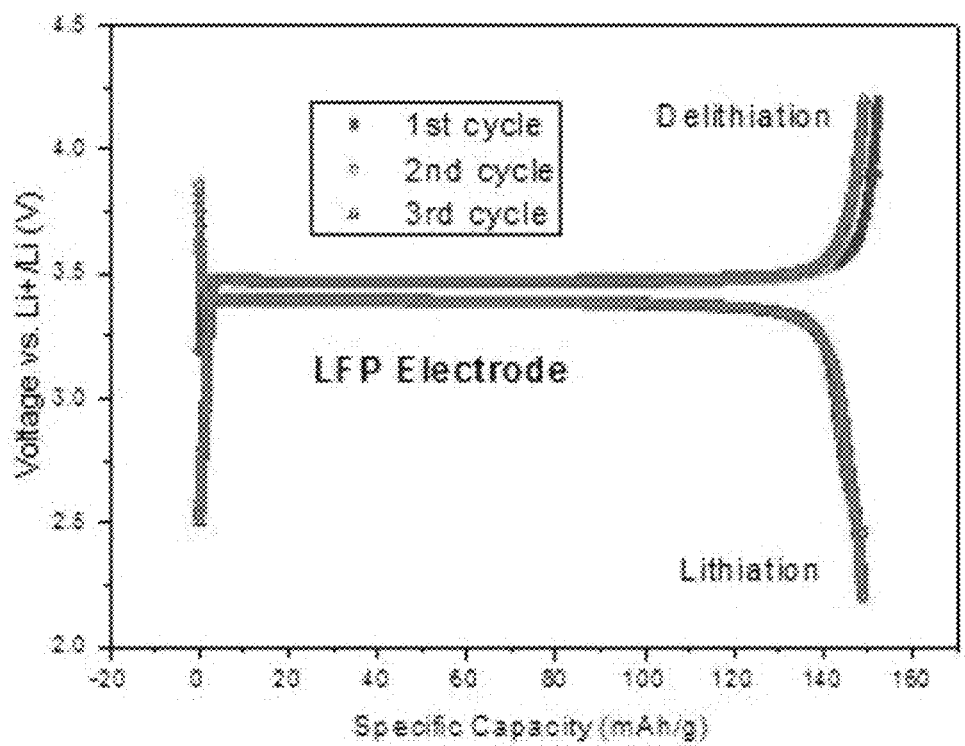

[Fig. 52]

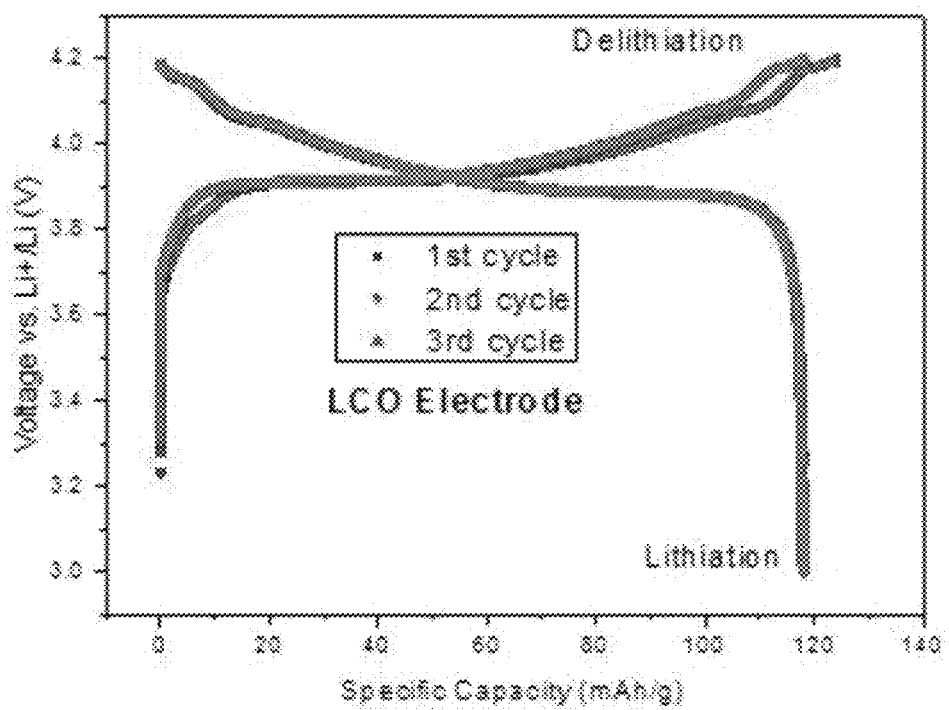

[Fig. 53]

| | Full Cell Fabrication | Full Cell Component's Lay-up Sequence |
|---|---|---|
| 1 | Major Cell Components | Anode/Electrolyte/Separator/Cathode |
| 2 | Cell Fabrication (① and ②) | ① CNT-CF/LiPF6+DC+DEC/GF1581/LFP(LiFePO4)<br>② CNT-CF/LiPF6+DC+DEC/GF1581/LCO(LiCoO2) |
| 3 | Coin Cell Component's Fabrication Order | Anode Cap/Anode/Electrolyte Wetting/GWF Separator/Electrolyte Wetting/Gasket/ Cathode/Spacer/Spring/Cathode Cap |

[Fig. 54]

| No. | Experimental Condition | Unit Cell for Structural Batteries | |
|---|---|---|---|
| | | CNT-CF/LFP | CNT-CF/LCO |
| 1 | Anode | CNT-CF | CNT-CF |
| 2 | Cathode | LFP(LiFePO$_4$) | LCO(LiCoO$_2$) |
| 3 | Electrolyte | 1M LiPF$_6$ Organic Electrolyte in DC/DEC=1:1 vol. | |
| 4 | Separator | Glass Fiber Woven Fabric (Ø18mm x Thick0.26mm) | |
| 5 | Test Cell Standard | CR2032 Coin Cell | |
| 6 | Charge/Discharge Condition | CC-CV in 2.2~3.9V, 1~30 cycles at 0.05C-rate, RT | CC-CV in 3.0~4.2V, 1~30 cycles at 0.05C-rate, RT |

[Fig. 55]

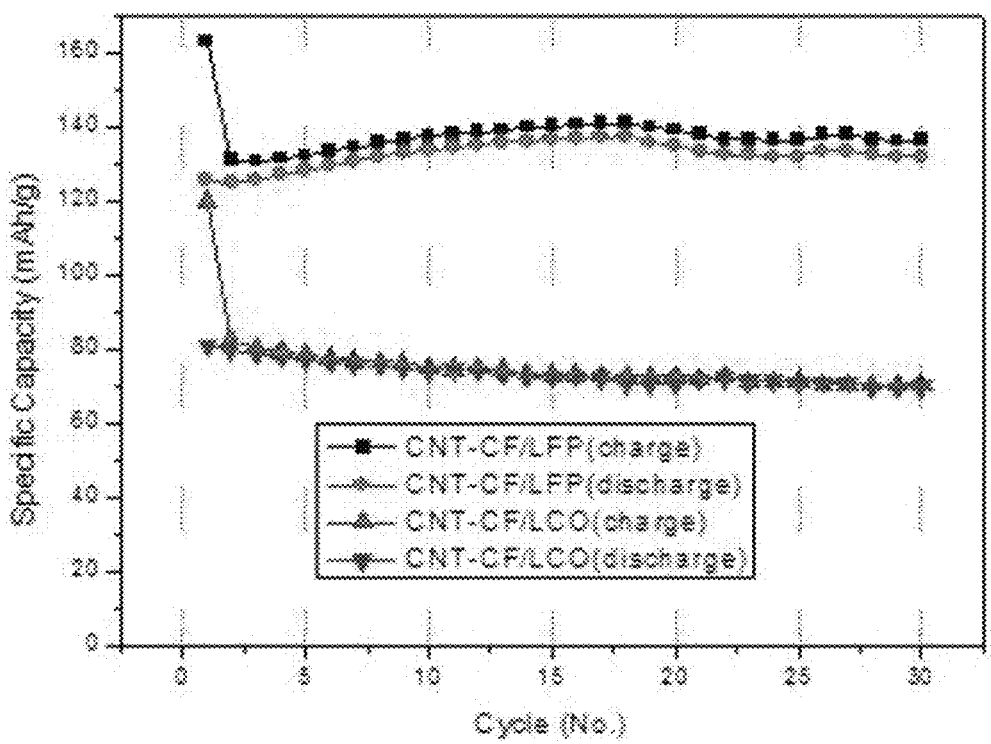

[Fig. 56]
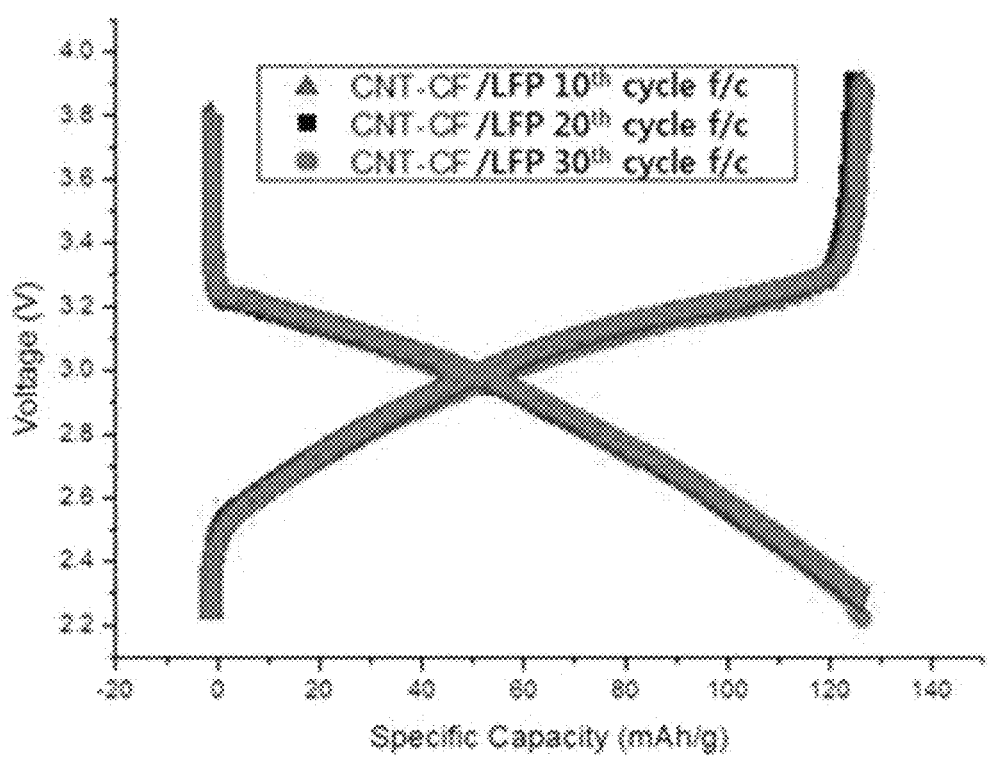

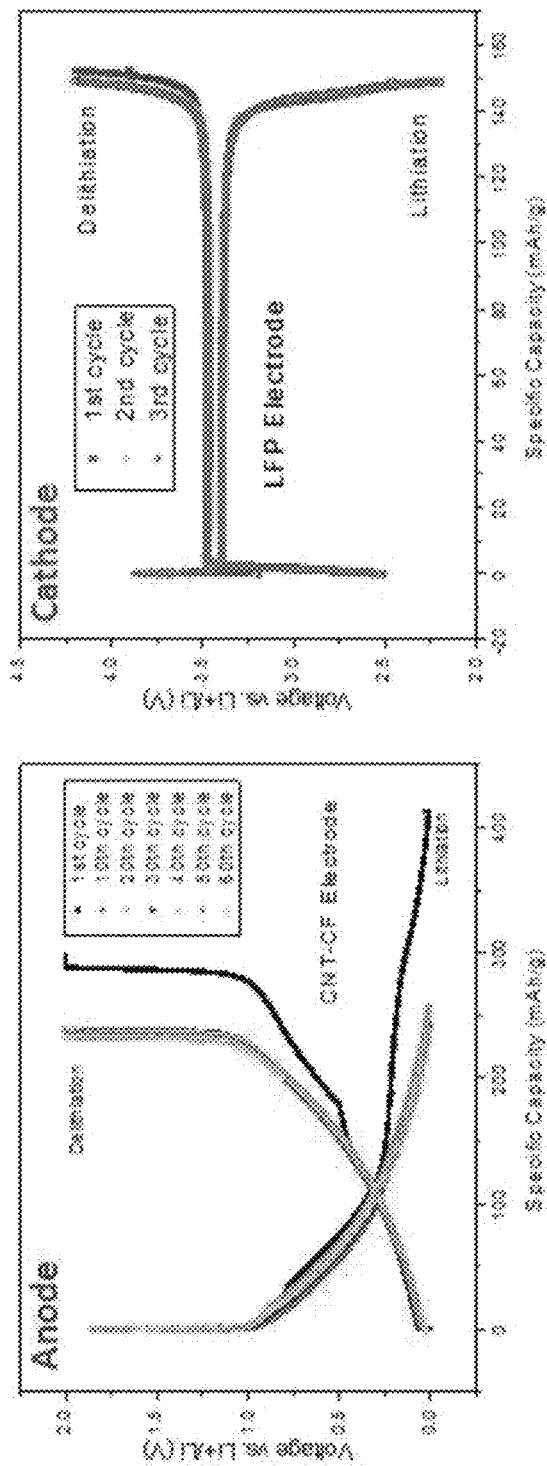
[Fig. 57]

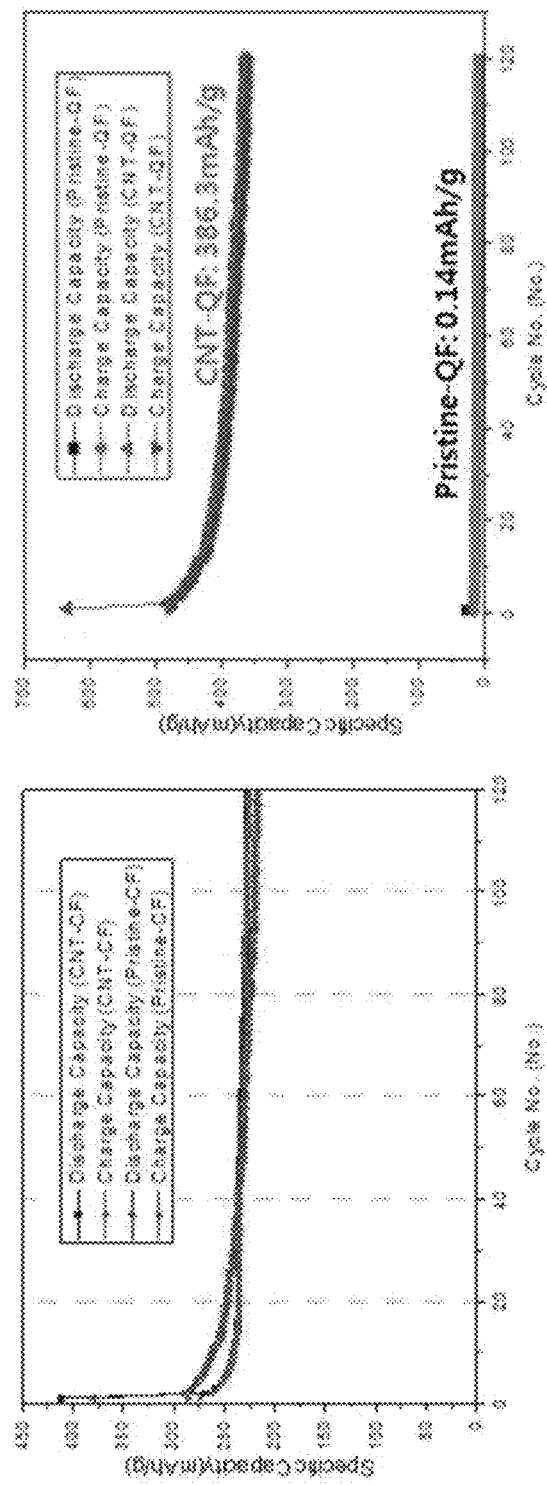
[Fig. 58]

[Fig. 59]
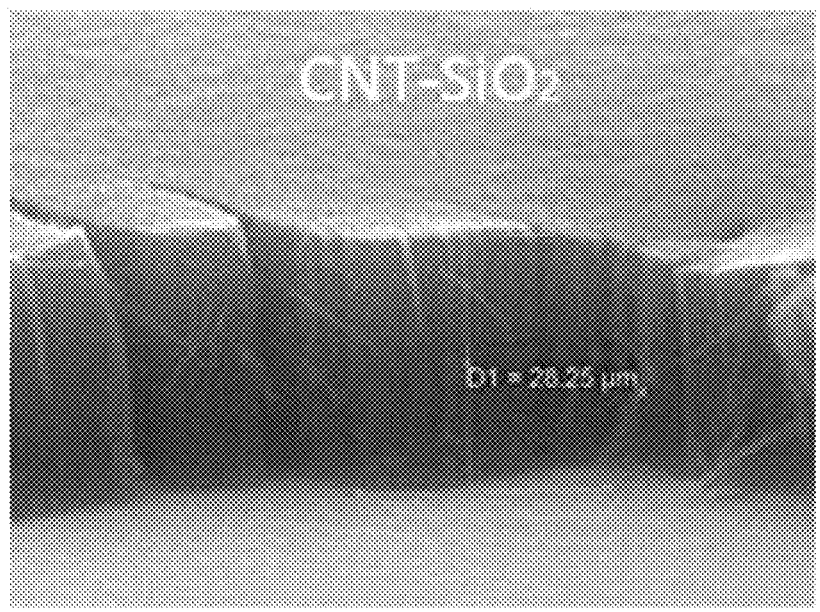
[Fig. 60]
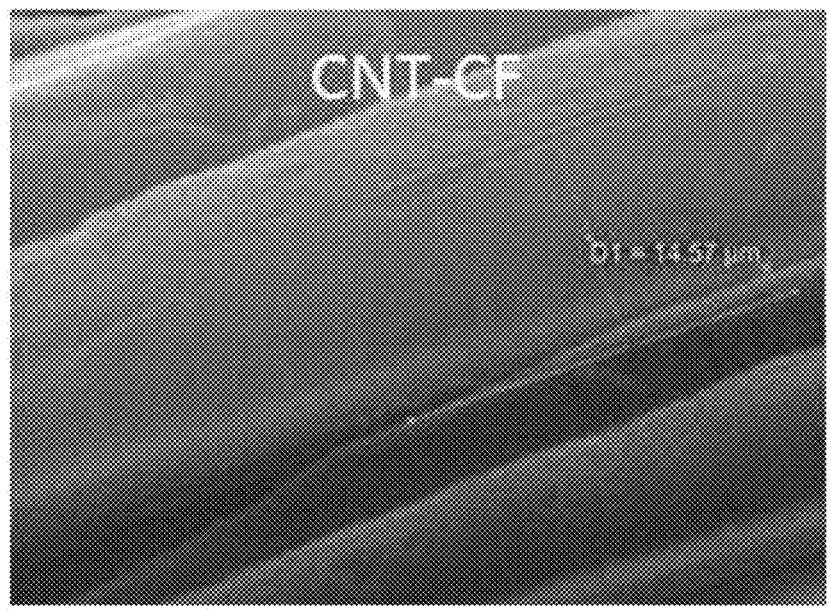

[Fig. 61]
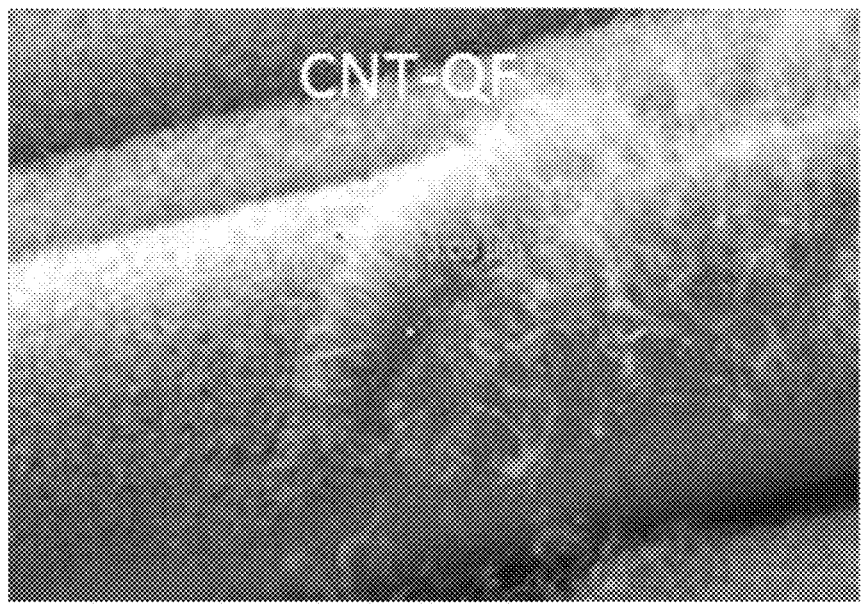
[Fig. 62]
| No. | Experimental Condition | | Glass Fiber Woven Fabric | Silica Fiber Woven Fabric |
|---|---|---|---|---|
| 1 | Separator | Material | GP 1581 style | Astroquartz 581 |
| | | Size | Ø18mm x Thick0.260mm | Ø18mm x Thick0.272mm |
| 2 | Working Electrode | | LFP(LiFePO₄) | |
| 3 | Counter Electrode | | Li Metal | |
| 4 | Electrolyte | | 1M LiPF6 Organic Electrolyte in DC/DEC=1:1 vol. | |
| 5 | Test Cell Standard | | CR2032 Coin Cell | |
| 6 | Charge/Discharge | | 175μA CC-CV, 30 cycles at 0.5C-rate, RT | |

[Fig. 63]
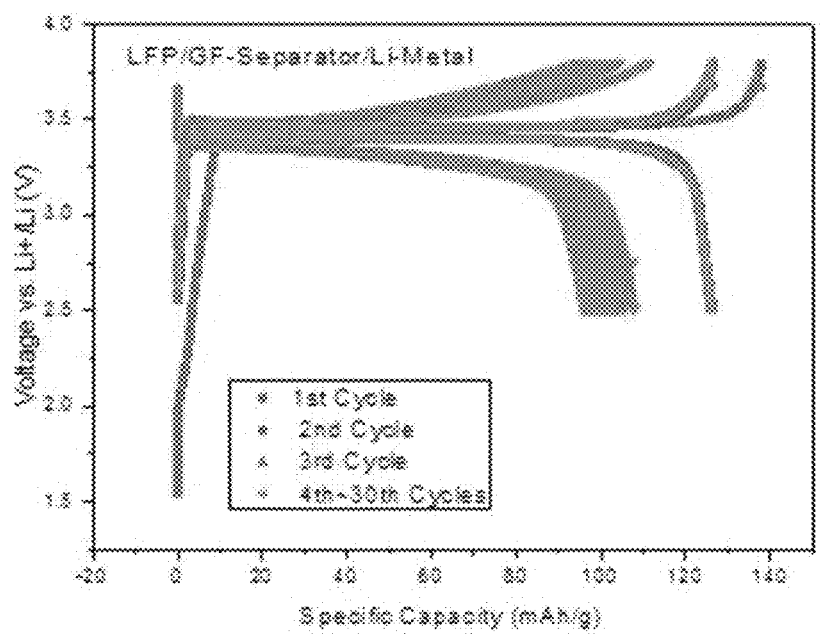
[Fig. 64]
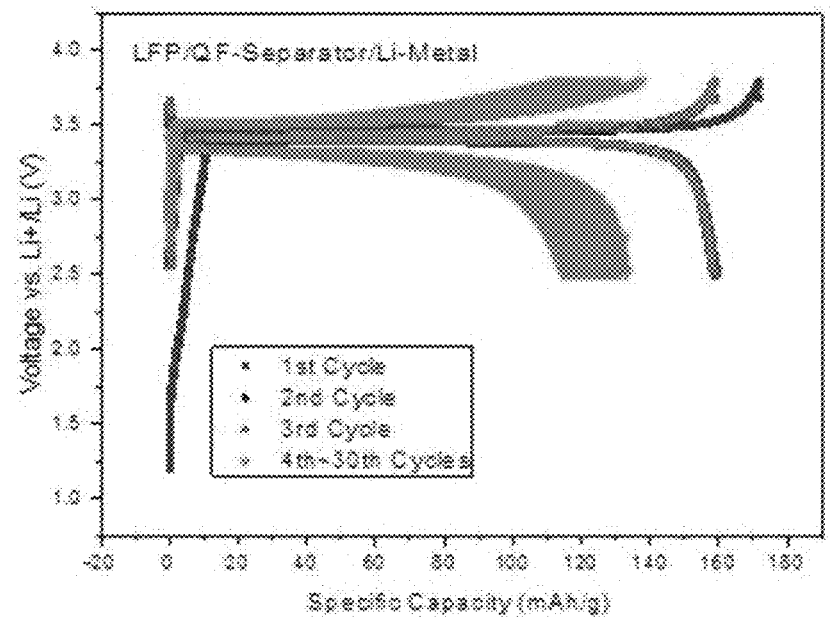

STRUCTURAL BATTERY ELECTRODE, METHOD FOR MANUFACTURING SAME, AND STRUCTURAL BATTERY USING SAME STRUCTURAL BATTERY ELECTRODE

BACKGROUND OF THE INVENTION

1. Field of the Invention

The present invention relates to an electrode for a structural battery, a manufacturing method of the electrode, and a structural battery using the electrode, and more particularly, to a structural battery electrode including carbon nanotubes provided on a fiber fabric substrate, a manufacturing method of the electrode, and a structural battery using the electrode.

2. Description of the Prior Art

Studies have been conducted to use a carbon-based fiber fabric as an electrode for a battery, due to excellent electrical conductivity and specific strength of a carbon material. For example, international patent publication WO2017188650A1 discloses a separator-integrated fibrous electrode structure including a conductive fiber including a carbon component, an active material layer covering an outer surface of the conductive fiber, and a separator formed on the active material layer.

When a carbon fiber fabric is used as an electrode of a battery, and a matrix is laminated on the carbon fiber fabric to strengthen a shear stress, it is mechanically complementary but electrically incompatible.

When the matrix is laminated on the carbon fiber fabric and used as a material for an electrode of a battery, the material has excellent mechanical properties and electrical conductivity, but a matrix electrolyte is required to provide a continuous load moving path to allow the laminated matrix to have reinforced shear stress, and endure a load such as a tensile stress and a compressive stress.

In the state of art, the electrolyte that satisfies properties of the matrix electrolyte as described above has to form a continuous ion transport path of a micro scale inside a solid matrix such that the outside of the matrix may support a load in a solid state, and the inside thereof may function to transfer ions through the electrolyte of a liquid state. For example, an ion transfer structure, which can effectively transfer ions to both laminated electrodes having the matrix as an interface, may be provided by connecting a pore structure having a microcapsule shape in the form of a channel to an internal structure of the matrix having the insulation properties like epoxy and maintaining a strength in the shear direction of laminated fibers.

However, as described above, when the carbon fiber fabric is used as a battery electrode, the electrical problem, which occurs when the matrix is laminated on the carbon fiber fabric to strengthen the shear stress, remains as a problem to be solved.

Accordingly, there are needs for development of an electrode of a fabric-based battery having improved electrical performance and mechanical performance, and a battery using the same.

SUMMARY OF THE INVENTION

The present invention provides a manufacturing method of a structural battery electrode including carbon nanotubes provided on a fiber fabric substrate.

The present invention further provides a structural battery including a fiber fabric-based separator.

The present invention still further provides a structural battery including a fiber fabric-based electrode and a fiber fabric-based separator.

The present invention still further provides a structural battery having a high capacity.

The present invention still further provides a structural battery having a long lifetime.

The present invention still further provides a lightweight structural battery.

The present invention still further provides a structural battery having a high stability.

The present invention still further provides a structural battery having improved mechanical properties.

The technical problems to be solved by the present invention are not limited to the above description.

To solve the above technical problems, the present invention provides a manufacturing method of a structural battery electrode.

According to one embodiment, the manufacturing method of a structural battery electrode includes: preparing a fiber fabric substrate; forming a metal nanoparticle layer by providing metal nanoparticles on the fiber fabric substrate; and forming a carbon nanotube layer by providing a carbon source on the metal nanoparticle layer.

According to one embodiment, the fiber fabric substrate may include at least one of a silica fiber fabric or a carbon fiber fabric.

According to one embodiment, the forming the metal nanoparticle layer may include: forming a first metal nanoparticle layer by providing first metal nanoparticles on the fiber fabric substrate; and forming a second metal nanoparticle layer, by providing second metal nanoparticles, on the first metal nanoparticle layer.

According to one embodiment, a thickness of the second metal nanoparticle layer may be greater than a thickness of the first metal nanoparticle layer.

According to one embodiment, after the forming of the carbon nanotube layer, a protective layer may be formed on the carbon nanotube layer.

According to one embodiment, the protective layer may include a solid electrolyte membrane. To solve the above-mentioned technical problems, the present invention provides a structural battery electrode.

According to one embodiment, the structural battery electrode includes: a fiber fabric substrate; a first metal nanoparticle layer provided on the fiber fabric substrate; a second metal nanoparticle layer provided on the first metal nanoparticle layer; a carbon nanotube layer provided on the second metal nanoparticle layer; and a protective layer provided on the carbon nanotube layer.

According to one embodiment, the fiber fabric substrate may include at least one of a silica fiber fabric or a carbon fiber fabric.

According to one embodiment, a thickness of the second metal nanoparticle layer may be greater than a thickness of the first metal nanoparticle layer.

To solve the above-mentioned technical problems, the present invention provides a structural battery.

According to one embodiment, the structural battery includes: a fiber fabric-based first electrode; a second electrode spaced apart from the first electrode; a fiber fabric-based separator provided between the first electrode and the second electrode; and an electrolyte provided to a fabric structure of the separator, wherein the first electrode may include a plurality of metal nanoparticle layers provided on the fiber fabric substrate, and a carbon nanotube layer provided on the metal nanoparticle layers.

According to one embodiment, the fiber fabric substrate of the first electrode may include at least one of a silica fiber fabric or a carbon fiber fabric.

According to one embodiment, the separator may include at least one of a silica fiber fabric or a glass fiber fabric.

According to an embodiment of the present invention, there may be provided a manufacturing method of a structural battery electrode, which includes: preparing a fiber fabric substrate; forming a metal nanoparticle layer by providing metal nanoparticles on the fiber fabric substrate; and forming a carbon nanotube layer by providing a carbon source on the metal nanoparticle layer.

Accordingly, the present invention provides a structural battery electrode including: a fiber fabric substrate; a first metal nanoparticle layer provided on the fiber fabric substrate; a second metal nanoparticle layer provided on the first metal nanoparticle layer; a carbon nanotube layer provided on the second metal nanoparticle layer; and a protective layer provided on the carbon nanotube layer.

In addition, the present invention provides the structural battery including: a fiber fabric-based first electrode; a second electrode spaced apart from the first electrode; a fiber fabric-based separator provided between the first electrode and the second electrode; and an electrolyte provided to a fabric structure of the separator, wherein the first electrode includes a plurality of metal nanoparticle layers provided on the fiber fabric substrate, and a carbon nanotube layer provided on the metal nanoparticle layers.

Accordingly, having improved electrode capacity through increased areal capacity in an aspect of a cell active area, that is, an electrode active area. A structural battery can be provided, having an increased battery use time by using the structural battery electrode having high energy density the structural battery can be provided. When the structural battery is applied to an unmanned moving object or a robot for which a mission capability in an unmanned system is required, the use time of the unmanned moving object or the robot can be increased, and when the structural battery is applied to an intelligent structure or system, high synergy can be implemented.

In addition, the structural battery can be provided to include system performance as a multifunctional efficiency index. Accordingly, when the structural battery is applied to an integrated system interworking with a structure, a material, electrical and electronic equipment, and mounted equipment, the energy efficiency can be improved.

BRIEF DESCRIPTION OF THE DRAWINGS

The above and other objects, features, and advantages of the present invention will be more apparent from the following detailed description taken in conjunction with the accompanying drawings, in which:

FIG. 1 is a flowchart for describing a manufacturing method of a structural battery electrode according to an embodiment of the present invention.

FIG. 2 is a view for describing a manufacturing method of a structural battery electrode according to an embodiment of the present invention.

FIG. 3 is a view for describing a metal layer of a structural battery electrode according to an embodiment of the present invention.

FIG. 4 is a view for describing a structural battery electrode according to an embodiment of the present invention.

FIG. 5 is a view for describing a structural battery electrode according to another embodiment of the present invention.

FIG. 6 is a view for describing a fiber fabric substrate of a structural battery electrode and a separator of a structural battery according to an embodiment of the present invention.

FIG. 7 (a) is a view showing a morphology of a carbon fiber fabric a view according to an embodiment of the present invention.

FIG. 7 (b) is a view showing a morphology of a silica fiber fabric and a glass fiber fabric according to an embodiment of the present invention.

FIG. 8 is a view for describing a carbon nanotube growing on a fiber fabric substrate of a structural battery electrode according to an embodiment of the present invention.

FIG. 9 is a conceptual diagram of a 2-electrode test scheme used for evaluating properties of a structural battery electrode according to an embodiment of the present invention.

FIG. 10 is an actual image for describing the structural battery electrode (CNT-CF) according to an embodiment of the present invention, and a structural battery electrode (G-CNT-CF) according to another embodiment of the present invention.

FIG. 11 is a diagram for describing a manufacturing method of the structural battery electrode (CNT-CF) according to an embodiment of the present invention, and a structural battery electrode (G-CNT-CF) according to another embodiment of the present invention.

FIG. 12 shows an SEM photograph and a TEM photograph of a carbon fiber fabric.

FIG. 13 shows an SEM photograph and a TEM photograph of a structural battery electrode (CNT-CF) according to an embodiment of the present invention.

FIG. 14 is a photograph showing a selected area electron diffraction (SEAD) of a carbon fiber fabric (CF) electrode.

FIG. 15 is a photograph showing a selected area electron diffraction (SEAD) of a structural battery electrode (CNT-CF) according to an embodiment of the present invention.

FIGS. 16 (a) to 16 (c) are SEM photographs of a structural battery electrode (CNT-CF) according to an embodiment of the present invention.

FIG. 16 (d) is an SEM photograph of a structural battery electrode (G-CNT-CF) according to another embodiment of the present invention.

FIG. 16 (e) is a 50,000-fold magnified SEM photograph of a structural battery electrode (CNT-CF) a view according to an embodiment of the present invention.

FIG. 16 (f) is an SEM photograph of a carbon fiber fabric.

FIGS. 17 (a) and 17 (b) show an SEM photograph of a structural battery electrode (G-CNT-CF) according to an embodiment of the present invention.

FIGS. 17 (c) to 17 (f) show STEM photographs of a structural battery electrode (G-CNT-CF) according to an embodiment of the present invention.

FIG. 18 shows a configuration of a 2-electrode electrochemical test for a cell including a structural battery electrode (CNT-CF) according to an embodiment of the present invention, a structural battery electrode (G-CNT-CF) according to another embodiment of the present invention, and a carbon fiber fabric electrode as a working electrode, and a lithium source as a counter electrode.

FIG. 19 shows elemental analysis results of a structural battery electrode (CNT-CF) according to an embodiment of the present invention, a structural battery electrode (G-CNT- CF) according to another embodiment of the present invention, and a carbon fib r fabric (pristine-CF).

FIG. 20 shows peaks of C (002) and peaks of Ni (111) in XRD patterns of a structural battery electrode (CNT-CF) according to an embodiment of the present invention, a structural battery electrode (G-CNT-CF) according to another embodiment of the present invention, and a carbon fiber fabric (pristine-CF).

FIG. 21 shows Raman spectra of a structural battery electrode (CNT-CF) according to an embodiment of the present invention, a structural battery electrode (G-CNT-CF) according to another embodiment of the present invention, and a carbon fiber fabric electrode (pristine-CF).

FIG. 22 is a graph showing cyclic performances of a structural battery electrode (CNT-CF) according to an embodiment of the present invention, a structural battery electrode (G-CNT-CF) according to another embodiment of the present invention, and a carbon fiber fabric electrode (pristine-CF).

FIG. 23 is a graph showing electrode rate performances of a structural battery electrode (CNT-CF) according to an embodiment of the present invention, a structural battery electrode (G-CNT-CF) according to another embodiment of the present invention, and a carbon fiber fabric electrode (pristine-CF).

FIG. 24 shows galvanostatic curves of a structural battery electrode (CNT-CF) according to an embodiment of the present invention, a structural battery electrode (G-CNT-CF) according to another embodiment of the present invention, and a carbon fiber fabric electrode (pristine-CF).

FIG. 25 shows EIS curves of a structural battery electrode (CNT-CF) according to an embodiment of the present invention, a structural battery electrode (G-CNT-CF) according to another embodiment of the present invention, and a carbon fiber fabric electrode (pristine-CF).

FIG. 26 shows constant current property curves of a carbon fiber fabric electrode (pristine-CF) at 0.05C-rate.

FIG. 27 shows constant current property curves of a structural battery electrode (CNT-CF) at 0.05C-rate according to an embodiment of the present invention.

FIG. 28 shows electrode properties of the carbon fiber fabric electrode (pristine-CF) with respect to the electrode rate performance between 0.05C-rate to 10 C-rate.

FIG. 29 shows electrode properties of the structural battery electrode (CNT-CF) according to the embodiment of the present invention with respect to the electrode rate performance between 0.05 C-rate and 10 C-rate.

FIG. 30 is a graph showing a cycle relationship between a structural battery electrode (CNT-CF) and a carbon fiber fabric electrode (pristine-CF) according to an embodiment of the present invention.

FIG. 31 is a photograph showing a structural battery electrode (CNT-QF) according to an embodiment of the present invention.

FIG. 32 is a table showing physical properties of a structural battery electrode (CNT-QF) according to an embodiment of the present invention.

FIG. 33 is a table for describing a manufacturing method of a structural battery electrode (CNT-QF) according to an embodiment of the present invention.

FIG. 34 shows SEM photographs of the silica fiber fabric electrode (pristine-QF).

FIG. 35 shows SEM photographs of a structural battery electrode (CNT-QF) according to an embodiment of the present invention.

FIG. 36 (*a*) is a TEM photograph of the silica fiber fabric electrode (pristine-QF).

FIGS. 36 (*b*) and 36 (*c*) are TEM photographs of the structural battery electrode (CNT-QF) according to an embodiment of the present invention.

FIGS. 37 and 38 are selected area electron diffraction (SAED) photographs of the structural battery electrode (CNT-QF) according to the embodiment of the present invention.

FIG. 39 is a table showing experimental conditions on the structural battery electrode according to the embodiment of the present invention.

FIG. 40 shows XRD patterns of the silica fiber fabric electrode (CNT-QF) and the silica fiber fabric electrode (pristine-QF) according to the embodiment of the present invention.

FIG. 41 shows Raman spectra of the silica fiber fabric electrode (CNT-QF) and the silica fiber fabric electrode (pristine-QF) according to the embodiment of the present invention.

FIG. 42 shows results of elemental analysis of the silica fiber fabric electrode (CNT-QF) and the silica fiber fabric electrode (pristine-QF) according to the embodiment of the present invention.

FIG. 43 is a table for describing a half cell of the silica fiber fabric electrode (CNT-QF) and the silica fiber fabric electrode (pristine-QF) according to the embodiment of the present invention.

FIG. 44 is a graph showing cyclic performances of the silica fiber fabric electrode (CNT-QF) and the silica fiber fabric electrode (pristine-QF) according to the embodiment of the present invention.

FIG. 45 is a table for describing a lithium oxide-based cathode electrode according to the embodiment of the present invention.

FIG. 46 shows views for describing a manufacturing method of the lithium oxide-based cathode electrode according to the experimental example of the present invention.

FIG. 47 shows actual images of the lithium oxide-based cathode electrode according to the experimental example of the present invention.

FIG. 48 is a diagram for describing the manufacturing method of the anode electrode according to the experimental example of the present invention.

FIG. 49 shows actual images of the anode electrode according to the embodiment of the present invention.

FIG. 50 is a table for describing a manufacturing method of a half cell using a lithium iron phosphate (LFP) as a cathode electrode, and a half cell using lithium cobalt oxide (LCO) as a cathode electrode.

FIG. 51 shows galvanostatic curves of the half cell using lithium iron phosphate as the cathode electrode.

FIG. 52 shows galvanostatic curves of the half cell using lithium cobalt oxide as the cathode electrode.

FIG. 53 is a table for describing configurations of a full cell (CNT-CF/LFP full cell) using the CNT-CF as an anode electrode and using the lithium iron phosphate (LFP) as a cathode electrode, and a full cell (CNT-CF/LCO full cell) using the CNT-CF as an anode electrode and using the lithium cobalt oxide (LCO) as a cathode electrode.

FIG. 54 is a table for describing conditions given for evaluating an electrochemical capacity and cycle characteristics of the CNT-CF/LFP full cell and the CNT-CF/LCO full cell.

FIG. 55 is a graph showing cyclic performances of the CNT-CF/LFP full cell and the CNT-CF/LCO full cell.

FIG. 56 shows galvanostatic curves of the CNT-CF/LFP full cell.

FIG. 57 shows galvanostatic curves of a CNT-CF half cell (anode) and an LFP half cell (cathode).

FIG. 58 shows graphs indicating electrochemical capacities and cyclic performances of the CNT-CF and the CNT-QF.

FIG. 59 is a photograph showing carbon nanotubes (CNT) grown on an oxide-coated silicon (SiO2) wafer.

FIG. 60 is a photograph showing carbon nanotubes (CNT) grown on the carbon fiber fabric substrate.

FIG. 61 is a photograph showing carbon nanotubes (CNT) grown on the silica fiber fabric substrate.

FIG. 62 is a table for describing a unit cell (LFP/GF-separator/Li-metal) including a silica fiber fabric (QF) based separator, and a unit cell (LFP/QF-separator/Li-metal) including a glass fiber fabric (GF) based separator.

FIG. 63 is a graph showing capacity properties of LFP/GF-separator/Li-metal.

FIG. 64 is a graph showing capacity properties of LFP/QF-separator/Li-metal.

DETAILED DESCRIPTION OF THE EXEMPLARY EMBODIMENTS

Hereinafter, preferred embodiments of the present invention will be described in detail with reference to the accompanying drawings. However, the technical spirit of the present invention is not limited to the embodiments, but may be realized in different forms. The embodiments introduced here are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the membrane and areas are exaggerated for efficient description of the technical contents.

Further, in the various embodiments of the present invention, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combination thereof described in the specification are present, and may be understood that one or more other features, numbers, step, elements, or combinations thereof may be added.

Further, in the specification, the term "connection" is used herein to include both indirectly connecting a plurality of components and directly connecting the components.

Further, in the following description of the present invention, a detailed description of known functions and configurations incorporated herein will be omitted when it may make the subject matter of the present invention unnecessarily unclear.

Hereinafter, a manufacturing method of a structural battery electrode according to an embodiment of the present invention will be described.

FIG. 1 is a flowchart for describing a manufacturing method of a structural battery electrode according to an embodiment of the present invention. FIG. 2 is a view for describing a manufacturing method of a structural battery electrode according to an embodiment of the present invention. FIG. 3 is a view for describing a metal layer of a structural battery electrode according to an embodiment of the present invention. FIG. 4 is a view for describing a structural battery electrode according to an embodiment of the present invention. FIG. 5 is a view for describing a structural battery electrode according to another embodiment of the present invention.

Referring to FIGS. 1 and 2, a fiber fabric substrate 100 may be provided (S110). According to an embodiment of the present invention, the fiber fabric substrate 100 may include at least one of a silica fiber fabric or a carbon fiber fabric.

According to one embodiment, when the fiber fabric substrate 100 includes the silica fiber fabric, the fiber fabric substrate 100 may have the mechanical advantages of a fabric material, and have an effect similar to an effect of allowing the carbon nanotubes to be grown well on a silicon wafer containing silicon oxide. Accordingly, it may be easy to provide a carbon source on the silica fiber fabric to form a carbon nanotube layer, in the process described below.

In addition, since the silica fiber fabric does not react with an electrode active material, the structural battery electrode including a silica fiber fabric substrate does not react with the electrode active material. Thus, when the structural battery electrode is used for the structural battery, a mechanical performance loss of the structural battery due to the electrode reaction may be minimized.

According to one embodiment, when the fiber fabric substrate 100 includes the carbon fiber fabric, the structural battery electrode including the carbon fiber fabric substrate can improve a lifetime and a cycle property of the structural battery through excellent mechanical properties and thermal stability when the structural battery electrode is used for the structural battery.

According to one embodiment, when the fiber fabric substrate 100 is used for the structural battery electrode, the substrate can serve as a load support and an electrode support through a multifunctional electrode.

Referring to FIG. 3, the metal nanoparticle layer 200 may be formed by providing metal nanoparticles on the fiber fabric substrate 100 (S120). According to one embodiment, the metal nanoparticles may be provided on the fiber fabric substrate 100 by using an electron beam (E-beam) evaporator.

According to an embodiment of the present invention, the forming the metal nanoparticle layer 200 may include forming a first metal nanoparticle layer 210 by providing a first metal nanoparticles on the fiber fabric substrate 100; and forming a second metal nanoparticle layer 220 by providing second metal nanoparticles on the first metal nanoparticle layer. Accordingly, when a carbon nanotube layer 300 is formed in the process described below, the metal nanoparticle layer 200 on the fiber fabric substrate 100, and the carbon nanotube layer 300 on the metal nanoparticle layer 200 are organically bonded to each other, so that the structural battery electrode improved in electrical performance as well as mechanical performance may be provided.

For example, the first metal nanoparticles may be iron (Fe) nanoparticles, so that an iron nanoparticle layer may be formed by providing the iron nanoparticles on the fiber fabric substrate 100. In addition, the second metal nanoparticles may be aluminum (Al) nanoparticles, so that an aluminum nanoparticle layer may be formed by providing the aluminum nanoparticles on the iron nanoparticle layer.

According to one embodiment, a thickness of the second metal nanoparticle layer 220 may be greater than a thickness of the first metal nanoparticle layer 210. For example, when the iron nanoparticle layer has a thickness of 1 nm to 2 nm, the aluminum nanoparticle layer may have a thickness of be 8 nm to 10 nm. Accordingly, when a carbon source is provided on the metal nanoparticle layer 200 including the first and second metal nanoparticle layers 210 and 220, carbon nanotubes may be easily grown on the metal nanoparticle layer 200.

Specifically, the iron nanoparticle layer may serve as a catalyst for the growth of the carbon nanotubes. In addition, the aluminum nanoparticle layer may promote a length growth and a vertical growth of the carbon nanotubes, and may serve as a buffer that assists to improve an overall growth yield of the carbon nanotubes. In other words, according to an embodiment of the present invention, when the aluminum nanoparticle layer and the iron nanoparticle layer have different thicknesses, that is, when the aluminum nanoparticle layer is thicker than the iron nanoparticle layer, the carbon nanotubes may be efficiently grown on the metal nanoparticle layer 200.

The carbon nanotube layer 300 may be formed by providing a carbon source on the metal nanoparticle layer 200 (S130). According to one embodiment, the carbon source may be provided on the metal nanoparticle layer 200 by using a chemical vapor deposition (PECVD) using plasma. For example, the carbon source may be methane (CH4). Accordingly, the carbon nanotube layer 300 may be formed by providing the methane on the metal nanoparticle layer 200.

Referring to FIG. 4, after the forming of the carbon nanotube layer 300, the structural battery electrode according to the embodiments of the present invention may be manufactured by forming a protective layer 400 on the carbon nanotube layer 300.

According to an embodiment of the present invention, when the protective layer 400 is formed on the carbon nanotube layer 300 and when the structural battery electrode is used for the structural battery, an initial irreversible capacity can be reduced, and thus the performance of the structural battery can be maximized.

According to an embodiment of the present invention, the protective layer 400 may include a solid electrolyte membrane. Accordingly, when the structural battery electrode is used as a first electrode of the structural battery, the solid electrolyte membrane serves as an insoluble passivating agent, so that a surface of the first electrode can be stably maintained while a cycle of the structural battery being repeated.

In other words, the structure battery electrode according to the embodiments of the present invention may include: a fiber fabric substrate 100; a first metal nanoparticle layer 210 provided on the fiber fabric substrate 100; a second metal nanoparticle layer 220 provided on the first metal nanoparticle layer 210; a carbon nanotube layer 300 provided on the second metal nanoparticle layer 220; and a protective layer 400 provided on the carbon nanotube layer 300.

With reference to FIG. 5, according to another embodiment of the present invention, the structural battery electrode may include a third metal nanoparticle layer 230 provided between the fiber fabric substrate 100 and the first metal nanoparticle layer 210, and a graphene layer 310 provided on the third metal nanoparticle layer. In other words, the structural battery electrode may include a fiber fabric substrate 100; a third metal nanoparticle layer 230 provided on the fiber fabric substrate 100; a graphene layer 310 provided on the third metal nanoparticle layer 230; a first metal nanoparticle layer 210 provided on the graphene layer 310; a second metal nanoparticle layer 220 provided on the first metal nanoparticle layer 210; a carbon nanotube layer 300 provided on the second metal nanoparticle layer 220; and a protective layer 400 provided on the carbon nanotube layer 300.

According to an embodiment of the present invention, when the structural battery electrode includes the third metal nanoparticle layer 230, the third metal nanoparticle layer 230 may be a nickel (Ni) nanoparticle layer. According to one embodiment, the third metal nanoparticle layer 230 may be thicker than the first metal nanoparticle layer 210 and the second metal nanoparticle layer 220. For example, when the thickness of the first metal nanoparticle layer 210 is 1 nm to 2 nm, and the thickness of the second metal nanoparticle layer 220 is 8 nm to 10 nm, the thickness of the third metal nanoparticle layer 230 may be 600 nm.

According to one embodiment, the third metal nanoparticle layer 230 may be prepared using an E-beam evaporator or sputtering.

According to an embodiment of the present invention, when the structural battery electrode includes the third metal nanoparticle layer 230, the graphene layer 310 may be easily formed. Specifically, when the structural battery electrode includes the third metal nanoparticle layer 230, the thin graphene layer 310 may be easily formed on the fiber fabric 100 having a bulk surface. Accordingly, when graphene of the graphene layer 310 forming a 2D structure is grown in the vertical direction on the fiber surface of the fiber fabric substrate 100, in-plane conductivity characteristics can be improved.

According to one embodiment, the graphene layer 310 may be formed of a plurality of layers.

The structural battery electrode and the manufacturing method thereof according to the embodiments of the present invention have been described in detail.

The structure battery electrode according to the embodiments of the present invention may include: a fiber fabric substrate; a first metal nanoparticle layer provided on the fiber fabric substrate; a second metal nanoparticle layer provided on the first metal nanoparticle layer; a carbon nanotube layer provided on the second metal nanoparticle layer; and a protective layer provided on the carbon nanotube layer.

The structural battery electrode includes the fiber fabric substrate, so that mechanical loads can be supported and the load moving path can be effectively formed. In particular, when the fiber fabric substrate includes the silica fiber fabric, the structural battery electrode including a silica fiber fabric substrate can minimize a mechanical performance loss of the structural battery due to the electrode reaction, through non-reactivity with the electrode active material when the structural battery electrode is used for the structural battery. Meanwhile, when the fiber fabric substrate includes a carbon fiber fabric, the structural battery electrode including the carbon fiber fabric substrate can improve a lifetime and a cycle property of the structural battery through excellent mechanical properties and thermal stability when the structural battery electrode is used for the structural battery.

Hereinafter, the structural battery according to the embodiments of the present invention will be described.

According to an embodiment of the present invention, the structural battery may include: a fiber fabric-based first electrode; a second electrode spaced apart from the first electrode; a fiber fabric-based separator provided between the first electrode and the second electrode; and an electrolyte provided to a fabric structure of the separator.

According to an embodiment of the present invention, the first electrode may be manufactured using the above-described manufacturing method of the structural battery electrode. In other words, the first electrode may include a plurality of metal nanoparticle layers provided on the fiber fabric substrate, and a carbon nanotube layer provided on the metal nanoparticle layers. In addition, the first electrode may include a protective layer provided on the carbon nanotube layer.

According to one embodiment, the fiber fabric substrate of the first electrode may include at least one of a silica fiber fabric or a carbon fiber fabric. The metal nanoparticle layers may include a first metal nanoparticle layer, and a second metal nanoparticle layer provided on the first metal nanoparticle layer, or may include a third metal nanoparticle layer provided below the first metal nanoparticle layer and disposed between the fiber fabric substrate and the carbon nanotube layer. When the third metal nanoparticle layer is provided, a graphene layer may be provided on the third metal nanoparticle layer. The protective layer may include a solid electrolyte membrane.

According to one embodiment, the first electrode may include a carbon nanotube provided on the fiber fabric substrate, and the second electrode may include lithium iron phosphate (LFP) provided on a fiber fabric substrate.

For example, the first electrode may include a carbon nanotube (CNT) provided on a glass fiber fabric substrate (GF), and the second electrode may include lithium iron phosphate (LFP) provided on a glass fiber fabric substrate (GF).

For another example, the first electrode may include a carbon nanotube (CNT) provided on a carbon fiber fabric substrate (CF), and the second electrode may include lithium iron phosphate (LFP) provided on a carbon fiber fabric substrate (GF).

For still another example, the first electrode may include a carbon nanotube (CNT) provided on a silica fiber fabric substrate (QF), and the second electrode may include lithium iron phosphate (LFP) provided on a silica fiber fabric substrate (QF).

For still another example, the first electrode may include a carbon fiber fabric substrate (CF), and the second electrode may include lithium iron phosphate (LFP) provided on a carbon fiber fabric substrate (CF).

According to an embodiment of the present invention, the separator may include at least one of a silica fiber fabric or a glass fiber fabric. When the first electrode includes the silica fiber fabric as described above, the first electrode can minimize a mechanical performance loss of the structural battery due to the electrode reaction, through non-reactivity with the electrode active material.

Meanwhile, when the separator includes the silica fiber, and when a mechanical load is applied to the structural battery including the separator, the load may be easily distributed. Accordingly, an electrical breakdown can be prevented in a loaded environment.

Meanwhile, according to a modification of the invention, the structural battery may include a fiber fabric-based separator provided between a fiber fabric-based first electrode and a fiber fabric-based second electrode, and an electrolyte provided to a fabric structure of the separator.

In other words, the structural battery may include the first electrode, the second electrode, and the separator that are based on a fiber fabric. For example, according to a modification of the invention, when the first electrode is an anode and the second electrode is a cathode, the anode may include a carbon nanotube (CNT) provided on a carbon fiber fabric substrate (CF) (CNT-CF), and the cathode may include a carbon nanotube (CNT) provided on a silica fiber fabric (QF) (CNT-QF).

The structural battery manufactured according to the modification of the present invention includes the fiber fabric-based anode and the fiber fabric-based cathode. Accordingly, the anode serves as a Li ion storage, and the cathode serves as a Li ion source, so that a capacity of the structural battery can be remarkably improved.

According to one modified example, when a method capable of functionalizing a silica fiber fabric is used to improve secondary battery characteristics, the functionalization of the silica fiber fabric may prevent SiOx side reactions subject to lithium substitution reactions on the fabric electrode surface for a long time.

For example, in order to coat with an oxide film, a sufficient amount of the aluminum buffer layer used in the present invention may be coated on the silica fabric before evaporating an iron catalyst, and an appropriate level of oxidation atmosphere may be generated, so as to maintain a SiO2 layer having an excellent heat resistance.

In addition, according to one modified example, a pretreatment that can be performed on the silica fiber fabric may be performed, before a layer of iron and aluminum nanoparticles is formed on the silica fiber fabric. For example, a pretreatment (annealing) may be performed several times (3 times or less) in nitrogen or argon atmosphere so as to remove trace element impurities remaining on the silica fabric surface, gap pores, and the like, and accordingly, a stable retention of cycle life rather than energy capacity may be expected with respect to a battery performance improvement.

In addition, according to one modified example, interfaces of the nanoparticles are required to be controlled to prevent the dispersibility of nanoparticles and the agglomeration in the form of an alloy, and aluminum may be used as a buffer layer so as to serve as a seed layer of iron that acts as a direct catalyst for CNT growth. Therefore, as an effective pretreatment method for preventing alloying or local agglomeration of the aluminum-iron nanoparticle layer, a gas atmosphere (argon atmosphere) may be generated in the chamber so as to enable an ideal pretreatment (annealing) before the CNT growth, and a process pressure may be gradually increased from an intermediate vacuum level to a high vacuum level during the CNT growth.

In addition, according to one modified example, as a way of controlling the orientation of fibers to improve battery performance, a pitch-based carbon fiber may be used as an electrode, and an ion-conducting layer having a two-dimensional array form in which lithium ions are confined in a gel form may become a liquid crystal electrolyte so as to be implemented with a concept of integrating a solid electrode structure.

In addition, when CNTs having a short length are densified in the CNT-grown structure, the battery performance may be expected to be increase. For example, the CNTs having a short length is the same as or similar to that of the present invention, and the volume densification of CNTs has a linear function relationship with an increase of the battery capacity.

In addition, according to one modified example, it is advantageous for an internal reaction of the electrodes as a distance between electrode plates of a cathode and an anode becomes closer, and it is important to ultimately reduce the weight of a battery cell by using an electrode plate and a separator that are thin and formed of a stable material so as to implement the battery cell to have a high capacity or high energy density. In this respect, in the electrode plates, the cathode serves as a carbon nanostructure electrode having an appropriate thickness for lithium's receiver and storage, so a relatively dense morphology is required for a structurization compared to the anode, in which the structurization is required at each of Micro/Nano scales. It may signify that, in the micro-scale structurization, the direction and the orientation of fibers of a fabric electrode used as a cathode substrate are required to be three-dimensional (3D), and in the nano-scale structurization, CNTs aligned on a fabric substrate needs to have uniform length and direction.

In addition, when a fabric separator is used, the orientation of the fibers becomes a three-dimensional structure with an X-Y plane and a Z-axis, and becomes relatively thick compared to the anode and cathode substrates. However, since a three-dimensional network (web-shape) structure is uniformly formed so as to have the structurally stable ion mobility between electrodes and the insulating properties, as a result, the asymmetric structural cell may have an advantage of versatility over the other cases.

In addition, according to one modified example, the fabric material is used to serve as a substrate in the present invention. When the CNT is nano-structured on a carbon fiber fabric substrate, the carbon fiber may serve as a conductive substrate, and may function as a current collector without the electrode reaction. However, for a more effective function of the current collector, it is preferable to form a uniform conductive coating layer on an outer layer of the battery cell in which electrochemical reactions occur. For example, when the coating layer is absent, problems such as current leakage and shortage may occur. In addition, the coating layer may be formed by various thin film coating schemes. Even when an insulating substrate, such as the silica fabric, is used as an electrode support substrate, a desired path of the current collector may be designed, and it can be designed such that the current collector can be modified through a continuous process in the manufacturing process.

The structural battery according to the embodiments of the present invention has been described in detail.

The structural battery according to the embodiments of the present invention may include: a fiber fabric-based first electrode; a second electrode spaced apart from the first electrode; a fiber fabric-based separator provided between the first electrode and the second electrode; and an electrolyte provided to a fabric structure of the separator.

The separator of the structural battery may include at least one of a silica fiber fabric or a glass fiber fabric, so that the carbon nanotube layer can be easily formed on the silica fiber fabric, and a mechanical performance loss of the structural battery due to the electrode reaction can be minimized through non-reactivity with the electrode active material. In addition, the structural battery can be provided, in which the separator includes the silica fiber fabric, so that an electrical breakdown can be prevented in a loaded environment.

Hereinafter, specific experimental examples of the structural battery electrode and the structural battery using the same according to embodiments of the present invention will be described.

FIG. 6 is a view for describing a fiber fabric substrate of a structural battery electrode and a separator of a structural battery according to an embodiment of the present invention.

Referring to FIG. 6, the fiber fabric substrate of the structural battery electrode according to the embodiments of the present invention may include at least one of a silica fiber fabric QF or a carbon fiber fabric CF. In addition, the separator of the structural battery according to the embodiments of the present invention may include at least one of a silica fiber fabric QF or a glass fiber fabric GF.

According to an embodiment of the present invention, the silica fiber fabric QF may be used for both of the fiber fabric substrate and the separator.

Manufacturing Method of Structural Battery Electrode

According to one embodiment, the efficiency of the structural battery electrode may be variable according to distribution uniformity of carbon nanotubes of the carbon nanotube layer provided on the fiber fabric substrate, intersectionality, and height uniformity.

According to the conventional method of growing carbon nanotubes on a fabric substrate, the carbon source may be provided in a state where a step exists due to non-uniformity of a surface of the fabric substrate, upon the method of forming a carbon nanotube layer by providing a carbon source on the fabric substrate. Accordingly, the carbon nanotubes of the carbon nanotube layer provided on the fabric substrate are formed to have a non-uniform height, and thus the carbon nanotubes may be intersected or entangled with each other. In addition, the carbon nanotubes may be bent during or after growth, thereby forming the carbon nanotube layer having a network structure entangled by the carbon nanotubes or having a complex shape. The above morphology of the carbon nanotube layer may be a major factor that exerts an effect on a discharging and charging performance of the structural battery, when the carbon nanotube layer is used as the electrode of the structural battery.

FIG. 7 (a) is a view showing a morphology of a carbon fiber fabric a view according to an embodiment of the present invention. FIG. 7(b) is a view showing a morphology of a silica fiber fabric and a glass fiber fabric according to an embodiment of the present invention. FIG. 8 is a view for describing a carbon nanotube growing on a fiber fabric substrate of a structural battery electrode according to an embodiment of the present invention.

Referring to FIGS. 7(a), 7(b), and 8, according to the manufacturing method of the structural battery electrode according to the embodiments of the present invention, unlike the conventional method, carbon nanotubes having high density may be uniformly grown on the fiber fabric substrate by using the chemical vapor deposition (PECVD) using plasma, upon forming the carbon nanotube layer on the fiber fabric substrate. In addition, the manufacturing method of the structural battery electrode according to the embodiments of the present invention includes forming a metal nanoparticle layer on the fiber fabric substrate before forming the carbon nanotube layer on the fiber fabric substrate, so that the structural battery electrode may be provided in which the fiber fabric substrate, the metal nanoparticle layer, and the carbon nanotube layer are sequentially laminated.

Accordingly, the fiber fabric substrate, the metal nanoparticle layer, and the carbon nanotube layer of the structural battery electrode may be organically bonded to each other, so that the mechanical performance and the electrical performance of the structural battery electrode can be improved.

Method of Evaluating Properties of Structural Battery Electrode

FIG. 9 is a conceptual diagram of a 2-electrode test scheme used for evaluating properties of a structural battery electrode according to the embodiment of the present invention.

Referring to FIG. 9, the properties of the structural battery electrode according to the embodiments of the present invention were evaluated by calculating the capacity after observing the electrochemical reaction between the working electrode and the counter electrode by using the 2-electrode electrochemical test scheme. Specifically, after a cell including the structural battery electrode is manufactured, the lithium capacity was evaluated through the reaction capacity between a half cell using the cell as a working electrode and the pure lithium metal as a counter electrode. In addition, the electrochemical capacity was calculated through combination of the structural battery electrode and the cathode electrode, subject to a scale of a unit cell having an electrochemical full-cell structure using a lithium oxide-base cathode electrode as a counter electrode.

Manufacturing Conditions of Structural Battery Electrode

FIG. 10 is an actual image for describing the structural battery electrode (CNT-CF) according to an embodiment of the present invention, and a structural battery electrode (G-CNT-CF) according to another embodiment of the present invention. FIG. 11 is a diagram for describing a manufacturing method of the structural battery electrode (CNT-CF) according to an embodiment of the present invention, and a structural battery electrode (G-CNT-CF) according to another embodiment of the present invention.

Referring to FIGS. 10 and 11, the structural battery electrode CNT-CF according to the embodiments of the present invention may include: a carbon fiber fabric substrate CF, a first metal nanoparticle layer Fe provided on the carbon fiber fabric substrate, a second metal nanoparticle layer Al provided on the first metal nanoparticle layer, a carbon nanotube layer CNT provided on the second metal nanoparticle layer, and a protective layer provided on the carbon nanotube layer.

According to one embodiment, the first and second metal nanoparticle layers on the carbon fiber fabric substrate may be formed by using the E-beam evaporator. A thickness of the second metal nanoparticle layer may be greater than a thickness of the first metal nanoparticle layer. When the first metal nanoparticle layer has the thickness of 1 nm to 2 nm, the second metal nanoparticle layer may have the thickness of 8 nm to 10 nm. Accordingly, when the carbon source is provided on the metal nanoparticle layer including the first and second metal nanoparticle layers, carbon nanotubes may be easily grown on the metal nanoparticle layer.

Specifically, the iron nanoparticle layer may serve as a catalyst for the growth of the carbon nanotubes. In addition, the aluminum nanoparticle layer may promote a length growth and a vertical growth of the carbon nanotubes, and may serve as a buffer that assists to improve an overall growth yield of the carbon nanotubes. In other words, According to an embodiment of the present invention, the carbon nanotubes may be efficiently grown on the metal nanoparticle layer due to the difference in thickness between the aluminum nanoparticle layer and the iron nanoparticle layer, that is, since the aluminum nanoparticle layer is thicker than the iron nanoparticle layer, the carbon nanotubes can be efficiently grown on the metal nanoparticle layer.

The structural battery electrode G-CNT-CF according to another embodiment of the present invention may include: a carbon fiber fabric substrate CF, a third metal nanoparticle layer Ni provided on the fiber fabric substrate, a graphene layer (G) provided on the third metal nanoparticle layer, a first metal nanoparticle layer Fe provided on the graphene layer, a second metal nanoparticle layer Ni provided on the first metal nanoparticle layer Fe, a carbon nanotube layer CNT provided on the second metal nanoparticle layer, and a protective layer provided on the carbon nanotube layer.

According to one embodiment, the first to third metal nanoparticle layers on the carbon fiber fabric substrate may be formed by using the E-beam evaporator. A thickness of the second metal nanoparticle layer may be greater than a thickness of the first metal nanoparticle layer. When the first metal nanoparticle layer has the thickness of 1 nm to 2 nm, the second metal nanoparticle layer may have the thickness of 8 nm to 10 nm. In addition, the third metal nanoparticle layer may be thicker than the second metal nanoparticle layer. When the second metal nanoparticle layer has the thickness of 8 nm to 10 nm, the third metal nanoparticle layer may have the thickness of 600 nm. The structural battery electrode (CNT-CF) according to an embodiment of the present invention, and the carbon nanotube layer CNT of the structural battery electrode G-CNT-CF according to another embodiment, may be formed by providing the carbon source (CH4) using the chemical vapor deposition (PECVD) using plasma.

Observation of Structure of Structural Battery Electrode

FIG. 12 shows an SEM photograph and a TEM photograph of a carbon fiber fabric (CF). FIG. 13 shows an SEM photograph and a TEM photograph of a structural battery electrode (CNT-CF) according to an embodiment of the present invention.

Referring to FIGS. 12 and 13, unlike the above carbon fiber fabric, an aggregated shape of metal nanoparticles (Fe nanoparticles), which are used in the growth of carbon nanotubes of the carbon nanotube layer, may be observed in the structural battery electrode. The aggregated shape of the metal nanoparticles may be observed more clearly in an intersection region in which carbon nanotube fiber bundles perpendicularly meet each other on the carbon nanotube layer of the structural battery electrode.

The carbon nanotube fiber bundle may include 1000 fibers. An aggregated structure observed in a region excluding a boundary region of Tow may be caused by damage or deformation of a single fiber structure due to plasma discharge, upon deposition by CVD chamber plasma vapor chemistry. In addition, it can be seen that iron nanoparticles are observed while aluminum nanoparticles are not observed, in the carbon nanotube structure of the structural battery electrode. The reason why the aluminum nanoparticles are not observed may be assumed that the aluminum nanoparticles are oxidized after the carbon nanotubes are grown. Alternatively, some of the aluminum nanoparticles are oxidized and another some of the aluminum nanoparticles may react with the iron nanoparticles to produce an alloy.

FIG. 14 is a photograph showing a selected area electron diffraction (SEAD) of a carbon fiber fabric (CF) electrode. FIG. 15 is a photograph showing a selected area electron diffraction (SEAD) of the structural battery electrode CNT-CF according to the embodiment of the present invention.

Referring to FIGS. 14 and 15, faint ring patterns and clear ring patterns can be seen, respectively, in central portions of the SAED photographs of the carbon fiber fabric electrode and the structural battery electrode. Carbon materials corresponding to a C (002) peak of an XRD pattern can be seen in both of the carbon fiber fabric electrode and the structural battery electrode.

Meanwhile, in the structural battery electrode, the SAED can be clearly observed due to high crystallinity of the metal nanoparticles of the metal nanoparticle layer formed on the carbon fiber fabric substrate, but it may be difficult to match the peak accurately. This may because the metal nanoparticles are reacted with each other to produce an alloy (that is, produce an alloy of aluminum and iron).

FIGS. 16(a) to 16(c) are SEM photographs of the structural battery electrode (CNT-CF) according to the embodiment of the present invention. FIG. 16(d) is an SEM photograph of a structural battery electrode (G-CNT-CF) according to another embodiment of the present invention. FIG. 16(e) is a 50,000-fold magnified SEM photograph of the structural battery electrode (CNT-CF) according to the embodiment of the present invention. FIG. 16(f) is an SEM photograph of the carbon fiber fabric.

Referring to FIGS. 16(a) to 16(e), it can be seen that all of the structural battery electrode (CNT-CF) according to an embodiment of the present invention, and the structural battery electrode (G-CNT-CF) according to another embodiment of the present invention may include the carbon nanotubes having a length within 15 μm to 17 μm, and the carbon nanotubes having an overall uniform shape are vertically grown.

FIGS. 17(a) and 17(b) are SEM photographs of the structural battery electrode (G-CNT-CF) according to the embodiment of the present invention. FIGS. 17(c), 17(d), 17(e), and 17(f) are STEM photographs of the structural battery electrode (G-CNT-CF) according to the embodiment of the present invention.

Referring to FIGS. 17(a) to 17(f), in the structural battery electrode (G-CNT-CF) according to the embodiment of the present invention, nickel nanoparticles on the carbon fiber fabric substrate can be seen. In addition, carbon nanotubes and graphene around the nickel nanoparticles may be observed.

The structural battery electrode may include an iron nanoparticle layer of 1 nm to 2 nm, an aluminum nanoparticle layer of 8 nm to 10 nm, and a nickel nanoparticle layer of 600 nm. Accordingly, the carbon nanotubes and the graphene may be observed around the nickel nanoparticles of the nickel nanoparticle layer thicker than the iron nanoparticle layer and the aluminum nanoparticle layer.

FIG. 18 shows a configuration of a 2-electrode electrochemical test for a cell including a structural battery electrode (CNT-CF) according to an embodiment of the present invention, a structural battery electrode (G-CNT-CF) according to another embodiment of the present invention, and a carbon fiber fabric electrode as a working electrode, and a lithium source as a counter electrode.

Referring to FIG. 18, an electrode experiment by a galvanostatic measurement was performed using a battery cycler (WBCS3000, WonATech) at a potential range of 0.01 V to 2 V for Li/Li+ electrodes. For a rate capability test of the electrode, variations of a charge-discharge rate were performed at room temperature and in a range of 0.05 C-rate to 10 C-rate (14 mA/g to 3000 mA/g).

FIG. 19 shows elemental analysis results of a structural battery electrode (CNT-CF) according to an embodiment of the present invention, a structural battery electrode (G-CNT-CF) according to another embodiment of the present invention, and a carbon fiber fabric (pristine-CF).

Referring to FIG. 19, it can be seen that more carbon components are contained in a sequence of the CNT-CF, the pristine-CF, and the G-CNT-CF. Accordingly, it can be seen that carbon nanotubes were stably grown on the carbon fiber fabric substrate of the CNT-CF.

In contrast, in the case of G-CNT-CF, it can be seen that the content of the carbon component is the lowest because a heat treatment is performed two times to grow graphene, and at least one of the heat treatments is performed at a high temperature around 1000° C. Upon growth of the carbon nanotubes of the G-CNT-CF, defects may occur in a structure of carbon atoms through the abrasion on a surface of the carbon fiber fabric substrate by plasma and the high-temperature heat treatment.

Meanwhile, in the case of G-CNT-CF, it can be seen that the content of the detected nickel nanoparticles is high due to the thick nickel nanoparticle layer (600 nm) formed to grow the graphene.

With regard to the content of aluminum nanoparticles, it can be seen that there is a difference of about 5 times between the CNT-CF and the G-CNT-CF. It may be because, in the case of CNT-CF, the heat treatment for the growth of carbon nanotubes is performed at a temperature of 650° C. to 700° C., but in the case of G-CNT-CF, a pre-heat treatment for the growth of graphene is performed at a temperature of 800° C. to 1000° C. before the same process as the heat treatment for the growth of carbon nanotubes is performed.

The carbon fiber fabric substrate (G-CF) having the graphene grown through the pre-heat treatment may be heat treated in a temperature range from 650° C. to 700° C. for up to 20 minutes so as to be manufactured as an electrode of the G-CNT-CF structure. Although the temperature range of the heat treatment corresponds to a temperature range lower, by about 100° C., than a growth temperature for general carbon nanotubes grown by the chemical vapor deposition, the nickel nanoparticle layer and the graphene layer are already formed, and a growth environment of the carbon nanotubes on the surface having improved conductivity is in a condition that the carbon nanotubes can adhere to the carbon fiber fabric substrate, and an atmosphere for accelerating oxidation of the aluminum nanoparticles also may be provided.

In other words, the iron nanoparticle layer is formed by providing the iron nanoparticles on multi-layered graphene having improved conductivity, the aluminum nanoparticle layer is formed by providing the aluminum nanoparticles, and thus the environment for enabling the carbon nanotubes to grow better. However, the growth environment for carbon nanotubes inside a chamber may cause the oxidation of a large amount of aluminum nanoparticles together with high yield of the carbon nanotube growth.

The iron nanoparticle layer is formed to have a thickness of 1 nm to 2 nm, and the aluminum nanoparticle layer is formed to have a thickness of 8 nm to 10 nm. Thus, in the case of CNT-CF, it can be seen that the content of iron nanoparticles is almost similar to the content of aluminum nanoparticles although the aluminum nanoparticle layer is thicker than the iron nanoparticle layer. Accordingly, oxidation of the aluminum nanoparticles can be estimated. In addition, in the case of G-CNT-CF, it can be seen that the content of aluminum nanoparticles is reduced than the content of iron nanoparticles. This may be because the greater amount of aluminum nanoparticles are oxidized in the process of forming the carbon nanotube layer after the graphene layer is formed.

FIG. 20 shows peaks of C (002) and peaks of Ni (111) in XRD patterns of a structural battery electrode (CNT-CF) according to an embodiment of the present invention, a structural battery electrode (G-CNT-CF) according to another embodiment of the present invention, and a carbon fiber fabric (pristine-CF). FIG. 21 shows Raman spectra of a structural battery electrode (CNT-CF) according to an embodiment of the present invention, a structural battery electrode (G-CNT-CF) according to another embodiment of the present invention, and a carbon fiber fabric electrode (pristine-CF).

Referring to FIG. 20, it can be seen that the C (002) peaks of the CNT-CF and the G-CNT-CF are shifted to the right rather than the C (002) peak of the pristine-CF. This signifies that carbon-based materials show more graphitic properties when a temperature of the heat treatment is higher and a time of the heat treatment is longer.

Ni peaks are observed but Fe and Al peaks are not observed in the G-CNT-CF. This may be because the nickel nanoparticle layer is thicker than the iron nanoparticle layer and the aluminum nanoparticle layer in order to form the graphene layer. Alternatively, it may be because the iron nanoparticles of the iron nanoparticle layer and the aluminum nanoparticles of the aluminum nanoparticle layer react and form an alloy. Alternatively, it may be because some of or lots of the aluminum nanoparticles are oxidized.

With reference to FIG. 21, it can be seen, through the D/G band ratio in a range from 1400 $cm^{-1}$ to 1600 $cm^{-1}$, that a behavior of the carbon-based material remarkably changes when a temperature of the heat treatment is higher and a time of the heat treatment is longer. Accordingly, unlike the manufacturing method of the CNT-CF and like the manufacturing method of the G-CNT-CF, it can be seen that characteristics of the manufactured structural battery electrode may be changed only by performing the heat treatment two times or performing the heat treatment at a higher temperature. In addition, it can be seen that the D/G band ratio increases when a temperature of the heat treatment is higher and a time of the heat treatment is longer.

Accordingly, an electrical capacity of the structural battery electrode upon increase of a disordered carbon structure may be different from an electrical capacity of the structural battery electrode formed of a graphitic carbon structure.

Evaluation on Electrochemical Characterization of Structural Battery

FIG. 22 is a graph showing cyclic performances of a structural battery electrode (CNT-CF) according to the embodiment of the present invention, a structural battery electrode (G-CNT-CF) according to another embodiment of the present invention, and a carbon fiber fabric electrode (pristine-CF). FIG. 23 is a graph showing electrode rate performances of a structural battery electrode (CNT-CF) according to an embodiment of the present invention, a structural battery electrode (G-CNT-CF) according to another embodiment of the present invention, and a carbon fiber fabric electrode (pristine-CF). FIG. 24 shows galvanostatic curves of a structural battery electrode (CNT-CF) according to an embodiment of the present invention, a structural battery electrode (G-CNT-CF) according to another embodiment of the present invention, and a carbon fiber fabric electrode (pristine-CF). FIG. 25 shows EIS curves of a structural battery electrode (CNT-CF) according to an embodiment of the present invention, a structural battery electrode (G-CNT-CF) according to another embodiment of the present invention, and a carbon fiber fabric electrode (pristine-CF).

Referring to FIG. 22, capacity retentions and changes in repeated cycles can be seen, through cyclic performances on three electrodes.

FIG. 23 shows the electrode rate performance between 0.05 C-rate and 10 C-rate, in which changes of capacity of the electrode were observed by maintaining every 5 cycles while increasing the applying rate of a current by about 2 times step by step from low current of 0.05 C-rate to 10 C-rate.

FIG. 24 shows a curve indicating characteristics of a current of the electrode by a galvanostatic test, in which an insertion and a deinsertion of lithium caused by a substitution reaction of lithium appear as behaviors of lithiation and dilithiation as charging and discharging are performed between lithium sources and interest electrodes. An applied current is at a condition of 0.05 C-rate, in which the most stable cycle characteristics and high capacity were indicated during the above rate.

Referring to FIG. 25, resistance measurement curves of the electrode by an electrochemical impedance spectroscopy method (EIS method) performed before the cycling of the electrode cells can be observed so as to understand the rate property for electrode cells driven in FIGS. 22 to 24. A region in which semi-circles overlap each other represents a high frequency region indicating a charge transfer resistance (Rct). A sloping line in a low frequency region indicates a Li-ion diffusion and a relevant Warburg impedance (Zw) in a bulk region of the electrode. It can be seen that the resistance of the G-CNT-CF among diameters of the semi-circles has the largest value, the resistance of the CNT-CF has an intermediate value, and the resistance of the pristine-CF has the smallest value. It can be seen that the resistance of the CNT-CF is slightly higher than the resistance of the pristine-CF, but the resistance of the G-CNT-CF indicates a relatively high value compared to the resistances of the CNT-CF and the pristine-CF.

The resistance of the CNT-CF is greater than that of the pristine-CF may be caused by an interface problem and a contact resistance between the substrate and the electrode material. A surface roughness of the carbon fiber fabric substrate, a gap or stepped area between a point where fiber tows or bundles intersect with each other and a single fiber or strand, or the like may increase the resistance of the CNT-CF. The charge transfer resistance of the G-CNT-CF higher than those of the pristine-CF and the CNT-CF, the difference of semi-circular shape, and the difference of the sloping line may be due to a Warburg impedance associated with the Li-ion diffusion in the bulk region of the electrode.

FIG. 26 shows constant current property curves of a carbon fiber fabric electrode (pristine-CF) at 0.05C-rate. FIG. 27 shows constant current property curves of a structural battery electrode (CNT-CF) at 0.05C-rate. FIG. 28 shows electrode properties of the carbon fiber fabric electrode (pristine-CF) with respect to the electrode rate performance between 0.05C-rate to 10 C-rate. FIG. 29 shows electrode properties of the structural battery electrode (CNT-CF) according to the embodiment of the present invention with respect to the electrode rate performance between 0.05 C-rate and 10 C-rate.

Referring to FIGS. 26 to 29, it can be seen that reversible specific capacities of the pristine-CF and the CNT-CF were similar to about 250 mAh/g at 0.05 C-rate, and an initial capacity was 420 mAh/g for the CNT-CF and 380 mAh/g for the Pristine-CF, in which the CNT-CF is greater by 10%. It can be seen that, after 10th cycle, a capacity fading of the CNT-CF is less than that of the pristine-CF, and a cyclic stability is also superior. The CNT-CF exhibits a constant capacity cyclic retention after 1st to 3rd cycles in which the initial irreversible capacity is indicated. However, it can be seen that the pristine-CF gradually exhibits the capacity fading until about the 40th cycle and exhibits the capacity cyclic retention after the 40th cycle.

With regard to the electrode properties when a current is applied at a rate higher than 0.05 C-rate, it can be seen that the CNT-CF and the pristine-CF exhibit similar capacity decrease rates in terms of the capacity fading, but the capacity of the CNT-CF is slightly higher than that of the pristine-CF. In addition, it can be seen that both of the CNT-CF and the pristine-CF exhibit improved rate properties in a range from 0.05 C-rate to 0.2 C-rate.

It can be seen that average capacities of the pristine-CF and the CNT-CF are similar until the 70th cycle, but a substantial capacity retention properties of the CNT-CF is consistently superior from the initial cycle. Accordingly, it can be inferred that the carbon nanotubes grown on the carbon fiber fabric substrate are uniformly distributed, and the carbon nanotubes are smoothly driven as a lithium storage structure on the carbon fiber fabric substrate.

In contrast, the lithium capacity property in the carbon fiber fabric that seems as an electrode rarely exhibits the capacity difference compared to an electrode having a carbon nanotube structure, even though it is a bulk structure having no nano structure, and it can be seen that the capacity fading property is not significantly deteriorated. According to the properties of the two electrodes based on carbon materials, since the carbon nanotubes may serve as a lithium storage structure that is more effective on the carbon fiber fabric substrate, the CNT-CF is advantageous in terms of the cyclic stability for the electrode, so that the CNT-CF can be used to organize the electrode for the structural battery. In contrast, the pristine-CF may directly utilize the direct lithiation properties of the carbon material instead of adopting a nano structure as the lithium storage structure.

When utilizing the above lithiation properties in a single fiber or carbon nanofiber (CNF) scale, a reaction control is required through a very precise technique physically or chemically. However, when at least a thousand single fibers are gathered and woven into wefts and warps to form a three-dimensional shape that intersects each other like the carbon fiber fabric, or when an entrance/exit structure of lithium ions is formed like the carbon nanotube, a lithium capacity can be ensured in a relatively simple way, so that the utilization as a structural electrode may be facilitated. Accordingly, both of the pristine-CF and the CNT-CF may enable the carbon fiber fabric, which is an electrode support, to be utilized as a current collector while being utilized as a substrate, and may enable the lithium substitution reaction (lithiation) properties of the carbon fiber to be utilized for an internal reaction of a lithium structural battery electrode, so that the meanings of the pristine-CF and the CNT-CF as a structural battery electrode may be independent as well as complementary in a design of the structural battery.

Review on Results

The properties of the graphene-grown G-CNT-CF exhibited the uneven cyclic stability after about the 10th cycle compared to the CNT-CF in which only carbon nanotubes are grown, but exhibited overall electrode behaviors similar to those of the CNT-CF. The G-CNT-CF exhibited the initial capacity similar to that of the CNT-CF and the capacity until the 10th cycle slightly lower than that of the CNT-CF, but exhibited the properties significantly similar to those of the CNT-CF in terms of the cyclic retention and the cyclic behavior. This can be interpreted that the intrinsic properties of carbon nanotube affect more, on the carbon fiber fabric substrate, compared to the properties of graphene. The G-CNT-CF in which carbon nanotubes are grown after growth of the graphene has similar conductivity and has no oxidation and corrosion on a surface of the carbon fiber, and thus nickel nanoparticles capable of structurally stable bonding with the carbon fiber were selected. In addition, nickel nanoparticles were deposited thickly on the carbon fiber having a bulky surface other than a thin film form so as to effectively grow a thin graphene layer. As a result, a region was observed in which the thick nickel nanoparticle layer, the graphene and the carbon nanotubes exist together, and a region was observed locally in which a bonding of the nickel nanoparticle layer was broken away from the carbon fiber surface. Accordingly, the graphene-grown G-CNT-CF, even when the carbon nanotubes having excellent yield compared to the CNT-CF is distributable, may cause a local contact problem with the graphene surface on the carbon fiber fabric substrate. Therefore, ultimately, the local contact problem may cause a higher surface resistance.

Although the G-CNT-CF basically shows the cycle performance similar to that of the CNT-CF, It can be estimated that the uneven capacity retention properties after the 10th cycle are related to the electrode resistance. The pristine-CF and the CNT-CF have a similar charge transfer resistance (Rct). The above similar Rct shows that the carbon nanotubes grown on the carbon fiber fabric are uniformly distributed and the carbon nanotubes are well driven as the lithium storage structure on the carbon fiber fabric substrate. However, since the carbon fiber fabric can also be directly lithiated, the charge transfer resistance may be higher in the CNT-CF. The G-CNT-CF may have the charge transfer resistance higher than that of the CNT-CF. The large resistance difference of the G-CNT-CF with respect to the pristine-CF and the CNT-CF describes that the bonding between the nickel nanoparticles and the graphene layer on the carbon fiber fabric substrate is ineffective.

Meanwhile, the G-CNT-CF exhibited the capacity lower than that of the CNT-CF. This may be because the carbon content of the graphene-grown electrode, through the heat treatment at higher temperature and for a longer time, significantly decreases by more than 25% compared to the electrode containing only carbon nanotubes, and the high crystallinity of nickel is noticeably exhibited. Through XRD analysis results, it can be seen that the carbon peak of the G-CNT-CF heat-treated at a higher temperature and time is shifted to the right. Through RAMAN analysis results, it can be seen that the shape of the peak appearing in the D/G bands of the G-CNT-CF shows high crystallinity, which is clearly different from that of the CNT-CF. The crystallinity is generally exhibited into a graphitic behavior. However, in the case of the crystallinity of G-CNT-CF, it may be because an abrasion in the carbon fiber fabric is generated by plasma during heat treatment at the high temperature under the condition that the graphene is grown. In the above process, the nickel nanoparticles that assisted the growth of graphene remained at remarkably high amounts, and the crystallinity was also high, and the mass of the electrode after the growth of graphene remarkably increased. This may result in crystallization and aggregation of large amounts of metal nanoparticles other than an increase in capacity due to crystallization of carbon materials. Accordingly, changes of an internal energy state of the materials may be related to the lithium storage capacity.

Although graphitic characteristics of the carbon materials observed through the RAMAN analysis may be factor that contributes to the increase of lithium storage capacity, the nature of the surface of the carbon fiber fabric substrate may be changed due to the aggregation of nickel nanoparticles during growth of the graphene or the aggregation in the form of an alloy between aluminum nanoparticles and iron nanoparticles serving as catalyst particles during growth of the carbon nanotubes.

About 20% of aluminum nanoparticles and about 40% of iron nanoparticles may be observed in the G-CNT-CF compared to the contents of aluminum nanoparticles and iron nanoparticles present in the CNT-CF. This may be because metal nanoparticles for growth of carbon nanotubes on the carbon surface after growth of the graphene are bonded into an alloy while serving as a catalyst, and some aluminum nanoparticles are oxidized. Accordingly, in order to improve the lithium capacity properties of the G-CNT-CF, the alteration of the nature of nanocatalyst is required to be controlled, or a factor raising the charge transfer resistance is required to be removed, by minimizing the aggregation of metal nanoparticles into an atomic chunk shape.

The CNT-CF in which the carbon nanotubes are directly grown exhibited a CNT-dominant pattern in which the overall electrode properties depend on the properties of carbon nanotubes. In contrast, a nickel-graphene layer present in an interface between the carbon nanotubes and the carbon fiber fabric substrate in the G-CNT-CF, exhibited a CNT-dominant trend for the properties of the G-CNT-CF only until the 10th cycle generally indicating the initial electrode characteristics. Afterwards, the properties of the G-CNT-CF may exhibit a predominant effect due to the nickel-graphene multilayer. On the carbon fiber fabric substrate, the inherent properties of carbon nanotubes exhibit a behavior that cycles of the G-CNT-CF are maintained as well as repeated. However, a surface with graphene changed while being grown on the carbon fiber fabric substrate may exert an effect on the lithium storage and transfer properties, in terms of diffusivity and mobility of lithium ions at nano scale.

FIG. 30 is a graph showing a cycle relationship between a structural battery electrode (CNT-CF) and a carbon fiber fabric electrode (pristine-CF) according to the embodiment of the present invention.

Referring to FIG. 30, it can be seen that the capacity of CNT-CF tends to a consistent retention after driven for about 10 cycles at 0.05 C-rate, but the capacity of pristine-CF continuously and gradually decreases (capacity fading). As a result of observation for the capacity in the 70th to 120th cycles, it can be seen that average reversible capacities of the CNT-CF and the pristine-CF are similar to each other.

In addition, it can be observed that the pristine-CF gradually exhibits a cyclic degradation behavior due to the capacity fading from the initial cycle, and the CNT-CF exhibits the good cyclic retention after the initial cycle in which the irreversible capacity appears. Accordingly, when the carbon nanotubes grow on the carbon fiber fabric, good cycle properties and cyclic retention can be ensured.

Manufacturing Conditions of Structural Battery Electrode

FIG. 31 is a photograph showing a structural battery electrode (CNT-QF) according to an embodiment of the present invention. FIG. 32 is a table showing physical properties of a structural battery electrode (CNT-QF) according to an embodiment of the present invention. FIG. 33 is a table for describing a manufacturing method of a structural battery electrode (CNT-QF) according to an embodiment of the present invention.

Referring to FIGS. 31 to 33, the structural battery electrode (CNT-QF) according to the embodiments of the present invention may include: a silica fiber fabric substrate (QF), a first metal nanoparticle layer (Fe) on the silica fiber fabric substrate (QF), a second metal nanoparticle layer Al provided on the first metal nanoparticle layer, a carbon nanotube layer CNT provided on the second metal nanoparticle layer, and a protective layer provided on the carbon nanotube layer.

According to one embodiment, the first and second metal nanoparticle layers on the silica fiber fabric substrate may be formed by using the E-beam evaporator. A thickness of the second metal nanoparticle layer may be greater than a thickness of the first metal nanoparticle layer. When the first metal nanoparticle layer has the thickness of 1 nm to 2 nm, the second metal nanoparticle layer may have the thickness of 8 nm to 10 nm. The carbon nanotube layer (CNT) may be formed by providing the carbon source ($CH_4$) using the chemical vapor deposition (PECVD) using plasma.

According to an embodiment of the present invention, the forming the carbon nanotube layer (CNT) on the silica fiber fabric substrate (QF) may take at most two times longer than the above-described step of forming the carbon nanotube layer (CNT) on the carbon fiber fabric substrate (CF).

Structure of Structural Battery Electrode

FIG. 34 shows SEM photographs of the silica fiber fabric electrode (pristine-QF). FIG. 35 shows SEM photographs of a structural battery electrode (CNT-QF) according to an embodiment of the present invention. FIG. 36($a$) is a TEM photograph of the silica fiber fabric electrode (pristine-QF). FIGS. 36($b$) and 36($c$) are TEM photographs of the structural battery electrode (CNT-QF) according to an embodiment of the present invention. FIGS. 37 and 38 are selected area electron diffraction (SAED) photographs of the structural battery electrode (CNT-QF) according to the embodiment of the present invention.

Referring to FIGS. 34 and 35, unlike the pristine-QF, it can be observed that the carbon nanotubes are grown on the silica fiber fabric substrate in the case of CNT-QF.

Referring to FIGS. 36($a$) to 36($c$), carbon nanotubes and iron nanoparticles grown by bottom-up are observed, and it can be seen that a length of the carbon nanotube is within 3 μm to 4 μm. The above length corresponds to a scale of about 20% of the length of the carbon nanotubes grown in the CNT-CF described above.

Referring to FIGS. 37 and 38, the crystallinity of the CNT-QF may be observed. With regard to the SAED pattern, properties of amorphous silica can be seen in the CNT-QF and the metal nanoparticles distributed on the silica fiber fabric substrate can be seen through a ring pattern having a faint diffractive structure. Accordingly, it can be seen that the aluminum nanoparticles and the iron nanoparticles exist together in a polycrystalline state.

Experimental Conditions on Structural Battery Electrode

FIG. 39 is a table showing experimental conditions on the structural battery electrode according to the embodiment of the present invention.

Referring to FIG. 39, the 2-electrode test were performed to evaluate electrical capacities of the carbon nanotube-grown silica fiber fabric electrode (CNT-QF) and the silica fiber fabric electrode (pristine-QF). The electrode experiment by galvanostatic measurements was performed using a battery cycler (WBCS3000, WonATech) at a potential range of 0.01 V to 2 V for Li/Li+ electrodes.

Evaluation on Chemical Properties

FIG. 40 shows XRD patterns of the silica fiber fabric electrode (CNT-QF) and the silica fiber fabric electrode (pristine-QF) according to the embodiment of the present invention. FIG. 41 shows Raman spectra of the silica fiber fabric electrode (CNT-QF) and the silica fiber fabric electrode (pristine-QF) according to the embodiment of the present invention.

Referring to FIGS. 40 and 41, it is confirmed that SiO2 peaks were observed in the XRD pattern of the CNT-QF, but any SiO2 peak is not observed in the Raman spectrum. This may be because the amorphous silica (amorphous SiO2) is partially crystallized into crystalline silica (crystalline SiO2) by the heat treatment as the carbon nanotube is grown, in the initial stage.

Whereas the SiO2 can be observed through the Raman spectrum peak of the pristine-QF, the energy bands appearing in the carbon nanotubes can be seen through the D/G band peaks in a range from 1400 $cm^{-1}$ to 1600 $cm^{-1}$ and the right peak of the CNT-QF.

FIG. 42 shows results of elemental analysis of the silica fiber fabric electrode (CNT-QF) and the silica fiber fabric electrode (pristine-QF) according to the embodiment of the present invention.

Referring to FIG. 42, it can be observed that the CNT-QF shows the carbon content about 1.5 times higher than that of the pristine-QF in which the carbon nanotubes are not grown. Accordingly, the low carbon content shown in an ultrapure silica glass fiber fabric may simply show a composition between silica having high purity and carbon materials having low yield.

It can be seen that a composition of aluminum nanoparticles and iron nanoparticles of the CNT-QF is similar to a composition of aluminum nanoparticles and iron nanoparticles of the CNT-CF described above. This may signify that a large amount of aluminum nanoparticles assisting the growth of carbon nanotubes were oxidized, also in the CNT-QF like the CNT-CF.

However, when the compositional difference of the metal nanoparticles is compared between the CNT-CF and CNT-QF, it can be observed that there is a difference of a composition of aluminum nanoparticles and iron nanoparticles. Each of compositions of the aluminum nanoparticles and the iron nanoparticles was detected in the CNT-QF about 18 times lower than in the CNT-CF. In other words, when the chemical vapor deposition is carried out on the fiber fabric substrate by providing the same amount of metal nanoparticles in a PECVD chamber, a large difference may occur between the contents of the metal nanoparticles of the CNT-CF and the CNT-QF. In other words, it can be seen that very small amounts of aluminum nanoparticles and iron nanoparticles remain in the CNT-QF, and among them, most of the aluminum nanoparticles provided with an amount higher than an amount of the iron nanoparticles are oxidized, and thus an amount similar to that of the iron nanoparticles remains.

Evaluation on Electrochemical Properties

FIG. 43 is a table for describing a half cell of the silica fiber fabric electrode (CNT-QF) and the silica fiber fabric electrode (pristine-QF) according to the embodiment of the present invention.

FIG. 43 shows configurations of the half cell for evaluating an electrochemical behavior and a capacity by lithiation of the carbon nanotube-grown silica fiber fabric electrode. As a major configuration of the structural battery electrode, a separator and an electrolyte impregnated into the separator were provided between a working electrode WE and a counter electrode CE to have a sandwich shape. With regard to the impregnation of electrolyte, an internal electrode reaction may be facilitated when an impregnated area (wetting area) is wide. The half cell was fabricated by using the CNT-QF as the working electrode and using lithium metal as the counter electrode. A metal cap, which serves as a current collector while sealing the half cell from the outside, was assembled.

FIG. 44 is a graph showing cyclic performances of the silica fiber fabric electrode (CNT-QF) and the silica fiber fabric electrode (pristine-QF) according to the embodiment of the present invention.

FIG. 44 shows the capacity properties appearing as the cycle is repeated for the CNT-QF and the pristine-QF. Although the CNT-QF has the low content of carbon in terms of elemental composition, the yield of carbon nanotubes identified by carbon nanotube morphology on the silica fiber fabric substrate was good. Capacity properties were superior to the CNT-CF described above although a growth length is short.

The capacity of the CNT-QF was about 386 mAh/g in specific capacity relative to the mass of the carbon nanotubes. The above capacity is beyond 372 mAh/g that is a theoretical capacity of graphitized carbon material (graphite) having high crystallinity, and may signify that carbon nanotubes operate as an effective lithium storage structure.

However, the capacity fading gradually occurs as the cycle repeats. This may be because the morphology of the carbon nanotubes having the volume ratio relatively lower than an area of the silica fiber fabric substrate is present as a locally non-uniform region.

Review on Results

The experimental examples of the structural battery electrode according to the experimental examples of the present invention have been described in detail.

According to the experimental examples of the present invention, average reversible capacities of the pristine-CF and the CNT-CF are similar to each other. In addition, the pristine-CF gradually exhibits a cyclic degradation behavior due to the capacity fading from the initial cycle, and the CNT-CF exhibits the good cyclic retention after the initial cycle in which the irreversible capacity appears.

Accordingly, when the carbon nanotubes grow on the carbon fiber fabric, both of the good cycle properties and the cyclic retention can be ensured.

When the carbon fiber fabric substrate used for the CNT-CF is a conductive substrate, it is advantageous for the length growth of the carbon nanotubes compared to the non-conductive substrate. However, a melting point may be relatively low since the carbon fiber fabric substrate is a material heat-treated at a relatively lower temperature range of 1000° C. compared to the carbon fiber graphitized at a high temperature of 2500° C. to 3000° C.

Since the carbon nanotubes on the carbon fiber fabric substrate strongly have the properties of carbon nanotubes, the properties of a CNT-dominant woven fabric electrode are exhibited. In addition, a constant capacity retention is exhibited, while the cycle repeats.

However, the capacity of carbon nanotubes does not appear sufficiently highly on the carbon fiber fabric substrate. Since the capacity of the carbon fiber fabric itself due to the direct lithiation is similar to the capacity of the carbon nanotubes, the carbon nanotubes can sufficiently and independently function as an electrode when the carbon nanotubes are provided to a fabric substrate that can be operated as an effective lithium storage structure. In addition, the fiber fabric substrate that is a support of the carbon nanotube and structurally stable can prevent the capacity fading while improving cyclic retention of the carbon nanotube electrode.

Design of High Energy Density Electrode for Composite Structural Battery

The verification on a performance of a unit cell is required to implement a composite structural battery. Accordingly, after the carbon nanotubes are grown by using the fiber fabric as a substrate, the possibility for utilizing the carbon nanotube electrodes as an effective lithium storage structure was examined. Electrochemical properties were observed by assembling a structural battery unit cell using a fiber fabric-based electrode as a first electrode (anode) and a conventional lithium oxide-based electrode as a second electrode (cathode).

Fabrication of Lithium Oxide-Based Cathode Electrode

FIG. 45 is a table for describing a lithium oxide-based cathode electrode according to the embodiment of the present invention. FIG. 46 shows views for describing a manufacturing method of the lithium oxide-based cathode electrode according to the experimental example of the present invention. FIG. 47 shows actual images of the lithium oxide-based cathode electrode according to the experimental example of the present invention.

Referring to FIG. 45, in repeated lithium ion battery cycles, a lithium iron phosphate (LiFePO4) electrode having a structural stability, and a lithium cobalt oxide (LiCoO2) electrode having a relatively high theoretical capacity were selected as a cathode. The CNT-CF was used as an anode.

Although the Lithium cobalt oxide electrode has a theoretical capacity of 274 mAh/g, the Lithium cobalt oxide exhibits an actual capacity about 140 m Ah/g that is an approximately half the theoretical capacity because structural changes occur through an electrode reaction. According to the experiment of the present invention, the properties of the cathode electrode that overcomes a low anode capacity can be seen by selecting two lithium oxide-based electrodes that are most commonly used in lithium ion batteries.

The lithium cobalt oxide electrode was used after purchased from commercially produced electrodes, and the lithium iron phosphate electrode was used after prepared during the experiment of the present invention.

When the lithium iron phosphate electrode is prepared, the ratio of an active material may be relatively lowered in consideration of the properties of the structural battery electrode, and the ratio of conductive additives and binder materials for bonding properties of the cathode electrode substrate may be considered to obtain the optimum composition.

Accordingly, for the electrode material used to manufacture the lithium iron phosphate (LiFePO4) electrode, lithium iron phosphate as an electrode active material may be mixed with Super P (Timcal) as carbon black and PVDF (Sigma Aldrich) as a binder material at a weight ratio of 75:17:8.

FIGS. 46 and 47 show manufacturing processes of the cathode electrode according to the experimental example of the present invention. The prepared electrode material may be manually mixed and coated in a slurry form on a substrate in the form of a metal foil. After milling the electrode material on the substrate using a doctor blade so that the electrode material has a uniform thickness when coated on an aluminum substrate, the electrode material may be dried and cured in an oven at a temperature of 100° C. to 120° C. for 24 to 48 hours. Through the drying step, an organic solvent used during mixing the material for the structural battery electrode may be completely evaporated. After the binder material is cured, a pressurization may be performed using a pressing machine, so that the electrode material may be firmly attached to the aluminum substrate. The cathode electrode may be assembled, as a unit cell having a full cell structure, in a globe box at an argon atmosphere.

Fabrication of Fiber Fabric-Based Carbon Nanotube Anode Electrode

FIG. 48 is a diagram for describing the manufacturing method of the anode electrode according to the experimental example of the present invention. FIG. 49 shows actual images of the anode electrode according to the embodiment of the present invention.

FIGS. 48 and 49 show the carbon nanotube anode morphology inside the electrode, when the anode and the lithium oxide-based cathode coated with a solid electrolyte membrane are combined with an organic solvent electrolyte dissolved with lithium salt therein. It can be seen that the cathode electrode corresponding to the carbon nanotube anode operates as a lithium source.

The structural battery according to the experimental example of the present invention was assembled as the unit cell combined with the lithium oxide cathode electrode by using the CNT-CF as anode electrode. Since the anode electrode uses a carbon fiber fabric substrate, a total electrode weight including the carbon fiber fabric substrate as well as the carbon nanotube electrode may be used for the anode electrode. Accordingly, it is necessary to adjust the electrode weight ratio or the mass ratio of the anode and the cathode so as to implement the correct unit cell capacity upon combination with the cathode electrode. In addition, the performance in the unit cell can be maximized during assembling the unit cell, by lowering an initial irreversible capacity of the anode or increasing a reversible capacity.

According to an embodiment of the present invention, the loss of the initial irreversible capacity can be reduced by forming a protective layer such as a very thin film layer on a surface of the CNT-CF anode electrode. According to the embodiment of the present invention, the protective layer may include a solid electrolyte layer (SEI). The solid electrolyte layer may be attached to a surface of a carbon-based negative electrode material, exist as insoluble passivating agents such as Li2CO3, and maintain a structurally stable anode surface even when the cycle is repeated.

Li-Half Cell Assembly and Electrochemical Performance Evaluation for Verifying Cathode Performance FIG. 50 is a table for describing a manufacturing method of a half cell using a lithium iron phosphate (LFP) as a cathode electrode, and a half cell using lithium cobalt oxide (LCO) as a cathode electrode. FIG. 51 shows galvanostatic curves of the half cell using lithium iron phosphate as the cathode electrode. FIG. 52 shows galvanostatic curves of the half cell using lithium cobalt oxide as the cathode electrode.

Referring to FIGS. 50 to 52, a half cell experiment was performed using the 2-electrode scheme to check electrochemical properties of the two types of cathode electrodes (LFP and LCO) to be assembled with the CNT-CF anode electrode so as to evaluate a performance of the unit cell according to the experimental example of the present invention.

Referring to FIG. 51, it can be seen that the performance of the cathode electrode shows that the LFP electrode has a capacity superior to the LCO electrode in initial cycles from the 1st cycle to the 3rd cycle, and the excellent capacity retention is exhibited afterward. A theoretical capacity of the LFP electrode is 171 mAh/g, and an initial capacity was 162 mAh/g at a potential window of 2.2 V to 3.9 V. Although the LCO electrode has a greater theoretical capacity of 274 mAh/g, a practical capacity was about 140 m mAh/g that is an approximately half the theoretical capacity because structural changes occur through an electrode reaction. However, the initial capacity exhibited through the half cell experiment was much lower, in which the initial capacity was 120 mAh/g at the potential window of 3.0 V to 4.2 V.

Assembly and Electrochemical Performance Evaluation on Unit Cell Composed of Electrochemical Full Cell FIG. 53 is a table for describing configurations of a full cell (CNT-CF/LFP full cell) using the CNT-CF as an anode electrode and using the lithium iron phosphate (LFP) as a cathode electrode, and a full cell (CNT-CF/LCO full cell) using the CNT-CF as an anode electrode and using the lithium cobalt oxide (LCO) as a cathode electrode. FIG. 54 is a table for describing conditions given for evaluating an electrochemical capacity and cycle characteristics of the CNT-CF/LFP full cell and the CNT-CF/LCO full cell.

Referring to FIGS. 53 and 54, the unit cell composed of the electrochemical full cell was assembled to check the electrochemical capacity and the cycle characteristics exhibited as a unit cell when the anode is assembled with the lithium oxide-based cathode. The cathode electrode assembled with the anode was analyzed in a full cell structure with respect to a reactivity, capacity properties, and cycle characteristics with the CNT-CF anode by using the lithium iron phosphate (LFP) electrode, and the cobalt oxide (LCO) electrode.

The charge and discharge of the electrochemical full cell may depend on an amount of applied current and a range of applied voltage according to the cathode electrode material.

Electrochemical Characterization of Unit Cell

FIG. 55 is a graph showing cyclic performances of the CNT-CF/LFP full cell and the CNT-CF/LCO full cell. FIG. 56 shows galvanostatic curves of the CNT-CF/LFP full cell. FIG. 57 shows galvanostatic curves of a CNT-CF half cell (anode) and an LFP half cell (cathode).

Referring to FIG. 55, a unit cell obtained by assembling the LFP cathode electrode with the CNT-CF anode electrode, and characteristics of a unit cell obtained by assembling the LCO cathode electrode with the CNT-CF anode electrode can be observed.

The capacity retention of the CNT-CF/LCO full cell is good in the 1st to 30th cycles, but a gradual decrease in capacity may occur as the cycle repeats. It can be seen that the CNT-CF/LFP full cell has a section of ascending and descending while the cycle is repeated, and there is a gradient in cycle properties. However, an average specific capacity (135 mAh/g) of the CNT-CF/LFP full cell is 1.8 times higher than an average specific capacity (75 mAh/g) of the CNT-CF/LCO full cell.

Meanwhile, FIG. 56 shows excellent galvanostatic curves of the CNT-CF/LFP full cell. It can be seen that the curved shape appears as shown in FIG. 56 when the current properties of the CNT-CF electrode, which is a carbon material used as an anode, and the LFP material used as a cathode is combined.

FIG. 57 shows the electrode characteristics due to a constant current indicated in each electrode during the lithium half cell experiment, before the CNT-CF anode and the LFP cathode are assembled into the unit cell. For the LFP cathode, the potential window in which the electrode reaction occurs is within a range from 2.2 V to 3.9 V, and a reaction section within 2 V is present, in which the reaction time with the anode may elongate when a wide potential region is ensured in charge and discharge reactions. In other words, the LFP cathode may be used as a cathode to complement a narrow potential window of the CNT-CF anode, through the stable reaction properties and the long cell reaction. High Energy Density Composite Structural Battery Through Combination of Fiber Fabric-based Cathode and Anode, Having Lithium Storage Structure by Carbon Nanotubes FIG. 58 shows graphs indicating electrochemical capacities and cyclic performances of the CNT-CF and the CNT-QF.

Referring to FIG. 58, it can be seen that carbon nanotubes grown on a silica fiber fabric substrate or carbon fiber fabric substrate at the same heat treatment temperature and atmosphere exhibit different capacities and lifetime performances.

In the experimental example of the present invention, a non-aqueous liquid electrolyte using an organic solvent was used to manufacture the structural battery. The liquid electrolyte has excellent ion conductivity due to a small ohmic drop, and the non-aqueous liquid electrolyte has a potential window higher than the aqueous electrolyte by about 2 V because the organic solvent is used. Accordingly, the non-aqueous liquid electrolyte used in the experimental example of the present invention may serve to assist a transfer of lithium ions while maintaining a low resistance in the potential region within about 2 V, and thus the performance of the electrode can be improved.

According to the experimental examples of the present invention, when the carbon nanotube electrodes grown on the silica fiber fabric substrate is manufactured, an electrode having high energy density can be manufactured even by using a small amount of nanostructured electrodes. This is based on a specific capacity of the electrode that is obtained by dividing a product of current amounts and the time by amounts of electrode materials. In other words, the energy density of the electrode becomes higher when the amounts of the electrode materials is small, subject to constant current amounts and time applied to the electrode.

In the case of carbon nanotube electrode grown on the carbon fiber fabric substrate, the carbon nanotube tends to have no contribution to an increase of the electrode capacity, but may have good cycle properties.

FIG. 59 is a photograph showing carbon nanotubes (CNT) grown on an oxide-coated silicon (SiO2) wafer. FIG. 60 is a photograph showing carbon nanotubes (CNT) grown on the carbon fiber fabric substrate. FIG. 61 is a photograph showing carbon nanotubes (CNT) grown on the silica fiber fabric substrate.

Referring to FIGS. 59 to 61, it can be seen that a length of the carbon nanotube grown on the oxide-coated silicon (SiO2) wafer is about 30 μm, a length of the carbon nanotube grown on the carbon fiber fabric substrate is about 15 μm, and a length of the carbon nanotube grown on the silica fiber fabric substrate is about 3 μm. It can be seen that all of the carbon nanotube (CNT) grown on the oxide coated silicon (SiO2) wafer, the carbon nanotube (CNT) grown on the carbon fiber fabric substrate, and the carbon nanotube (CNT) grown on the silica fiber fabric substrate have the form of vertically aligned multiwalled carbon nanotubes.

According to the experimental examples of the present invention, an excellent electrode specific capacity was exhibited in the silica fiber fabric substrate on which the shortest carbon nanotube was grown. In addition, the carbon nanotube electrode grown on the silicon (SiO2) wafer exhibits properties of an electrochemical capacitor or a semiconductor application device, but the carbon nanotube electrode grown on the fabric substrate such as the carbon fiber or the silica fiber exhibits properties of an electrode applicable to a battery.

Accordingly, a nano structure may be designed to allow the carbon nano structure to increase areas for a lithium storage and an electrolyte wetting, and thus a structural performance of the structural battery system using a liquid electrolyte can be improved. As an effective impregnation scheme of the liquid electrolyte, a small amount of liquid electrolyte may be impregnated in the electrode of the structural battery.

Conventionally, the electrode of a battery has been manufactured by growing the CNT on an alumina (Al2O3) or silica (SiO2) wafer as an insulating substrate. However, the CNT growth yield in the insulating substrate has a limit, there is a trend that requires a high output energy storage device by ensuring a wide specific surface area, and the importance on the high CNT yield and the increased CNT length has increased.

When single-walled carbon nanotubes have a networked structure by n-bonding to PPBT that is an electrode material known as poly[3-(potassium-4-butanoate)thiophene], a lithium ion battery lifetime can be extended. However, in the lithium ion battery, an expansion of the electrode material upon being charged and a shrinkage of the electrode material upon being discharged may occur repeatedly. Accordingly, the substrate material of the electrode that is a chemically inactive layer may be affected by inherent internal reaction of the electrode, and thus, a battery performance may be degraded.

When the carbon nanotube is used, the above problem may be effectively overcome so that the organization and the thermal properties of the battery may be improved.

Fabric-Based Structural Battery Using Liquid Electrolyte and Fabric-Based Separator FIG. 62 is a table for describing a unit cell (LFP/GF-separator/Li-metal) including a silica fiber fabric (QF) based separator, and a unit cell (LFP/QF-separator/Li-metal) including a glass fiber fabric (GF) based separator. FIG. 63 is a graph showing capacity properties of LFP/GF-separator/Li-metal. FIG. 64 is a graph showing capacity properties of LFP/QF-separator/Li-metal.

Referring to FIG. 62, properties were compared and evaluated by preparing a separator including a glass fiber fabric instead of a porous glass fiber nonwoven fabric separator having a large pore area and used in a coin cell test for the conventional electrochemical full cell structure (2032 coin cell test), so as to implement the structural battery system using the liquid electrolyte. Specifically, properties were compared by preparing a separator (GF) containing a 1581 style fiber glass fabric having excellent mechanical properties and used for a general purpose as electrical insulation, and by preparing a separator (QF) containing a silica fiber fabric used as a fiber fabric substrate of carbon nanotubes according to the experimental example of the present invention.

In the unit cell experiment of the electrochemical full cell structure, the Li-half cell experiment was performed by assembling the LFP electrodes, which exhibit excellent performance after assembled with the CNT-CF electrode, with the GF and the QF, respectively. The experiment according to the present invention does not consider an environment in which mechanical loads are applied.

Referring to FIGS. 63 and 64, it can be seen that, until the initial 3rd cycle, the specific capacity of LFP/GF-separator/Li-metal is 130 mAh/g, and the specific capacity of LFP/QF-separator/Li-metal is 162 mAh/g. It can be seen that, until the 30th cycle afterward, the specific capacity of LFP/GF-separator/Li-metal is 100 mAh/g to 110 mAh/g, and the specific capacity of LFP/QF-separator/Li-metal is 118 mAh/g to 138 mAh/g.

Through the above results, it can be seen that the LFP cathode electrode capacity of the LFP/GF-separator/Li-metal structure is 80-85% compared to that of the LFP/QF-separator/Li-metal structure.

When the glass fiber woven fabric as a separator material is used together with the carbon nanotube-grown silica nanofiber-based electrode (CNT-QF electrode), a GF separator (1581 Style fiber glass fabric) or QF separator (Astroquartz 581 silica fiber fabric) may be used, so that both of the substrate and the separator of the structural battery electrode can be formed of the same glass fiber fabric-based material.

In addition, the LFP and the QF are also applied to a substrate of an electrode coated with the cathode material as the counter electrode, so that the structural battery electrode including the silica fiber fabric substrate in the same form as the LFP-QF electrode may be prepared. When the above type of structural battery is manufactured, the glass fiber-based silica fabric as a support of the electrode may serve as a battery component for an electrode substrate and support mechanical loads, and may form a load moving path more effective than use of the carbon fiber fabric substrate. In addition, since the silica fiber fabric electrode substrate does not react with the electrode active material, a loss of a mechanical performance due to electrode reaction can be minimized. In addition, as a material that can sufficiently perform the reaction inside the electrode in terms of electrical properties, the mechanical performance and the electrical performance can be maximized. When manufacturing a structural battery using the glass fiber fabric separator or silica fiber fabric separator, and the silica fiber fabric substrate and the carbon nanotubes as anode and cathode electrodes, the mechanical properties and the thermal stability of the structural battery are improved, so that the lifetime and the cycle properties of the structural battery are also improved, and thus design and application suitable for the composite structural battery can be implemented.

A high energy density structural electrode is required for structural batteries. To this end, first of all, it is required to satisfy the requirements of strongness, stiffness and lightness in terms of material properties. Accordingly, fiber fabric materials, which have excellent specific strength and specific rigidity like the carbon fibers or silica fibers, and are utilized as a lightweight structural material, may be suitable. The above fiber fabric material is required to be electrochemically inert and serve as an electrode support both inside and outside the electrode. In addition, the fiber fabric material includes the inherent properties of a material having lightness and high energy density. Accordingly, when the fiber fabric material is applied to the lithium secondary battery, a structural battery may be provided to easily store lithium of a lithium secondary battery.

The present invention may have a configuration in which an electrode structure is robust as an energy storage structure and an electrode structure is not affected during energy conversion and transfer reaction so as to continue reaction inside the battery through the lithiation using lithium ions, facilitate a load bearing and have a structural stability inside and outside the battery structure while the cycle repeats. The research has been conducted through the present invention to use carbon nanotubes, as a suitable material for the above configuration, as an effective electrode structure on a fiber fabric substrate. The structure inside the electrode forms a nanostructure suitable for the transfer and storage of lithium ions, and the carbon nanotube electrode was grown on the fiber fabric substrate so as to be organized. As a result, electrode properties of organized carbon nanotubes on the silica fiber fabric substrate have a high specific capacity, and the carbon nanotube electrode organized on the carbon fiber fabric substrate exhibits substantially stable good cyclic retention even by repeated cycles. Through the above results, the carbon nanotube electrode may have the structural stability on the fiber fabric substrate, and electrochemically inactive properties may be effective to use the carbon nanotube electrode as the structural battery electrode.

In addition, according to the present invention, an inter-electrode separator can be prepared using the fiber fabric structure. Therefore, according to the present invention, both of the electrode support and the separator for the structural battery can be manufactured on the fiber fabric basis.

The structural battery system using the fiber fabric substrate used in the present invention and including the carbon nanotube electrode, the fabric separator, and the liquid electrolyte has the structural stability and exhibits electrochemical battery properties. Thus, the structural battery system can be applied as an energy storage structure. According to the present invention, unlike the ideas or studies presented by previous research groups, the problems unsolved by the related studies in an aspect of the energy storage capacity of structural battery may be solved by the idea using the silica fiber fabric substrate and the carbon nanotubes. In addition, the embodiments of the present invention has shown that the carbon nanotubes on the silica fiber fabric substrate can be utilized as an effective lithium storage structure. Therefore, it is expected to develop the structural design concept applied to the structural battery and improve the design for both of the organization and functionalization of the electrode and separator as major components of the structural battery, by using the idea disclosed in the present invention.

Although the present invention has been described in detail with reference to the exemplary embodiments, the present invention is not limited to the specific embodiments and shall be interpreted by the following claims. In addition, it will be apparent that a person having ordinary skill in the art may carry out various deformations and modifications for the embodiments described as above within the scope without departing from the present invention.

What is claimed is:

1. A method of manufacturing a structural battery electrode, the method comprising:
    preparing a fiber fabric substrate;
    forming a third metal nanoparticle layer by providing third metal nanoparticles on the fiber fabric substrate;
    forming a graphene layer on the third metal nanoparticle layer using a first plasma-enhanced chemical vapor deposition (PECVD) process, wherein the first PECVD process has a first process temperature that is sequentially reduced from 960° C. to 840° C. to 800° C., and wherein the first PECVD process has a first process power of 50 W;
    forming a first metal nanoparticle layer by providing first metal nanoparticles on the graphene layer, wherein the first metal nanoparticle layer has a first thickness;
    forming a second metal nanoparticle layer by providing second metal nanoparticles on the first metal nanoparticle layer, wherein the second metal nanoparticle layer has a second thickness that is greater than the first thickness; and
    forming a carbon nanotube layer by providing a carbon source on the second metal nanoparticle layer, wherein the carbon nanotube layer is in contact with the second metal nanoparticle layer, wherein the carbon nanotube layer is formed using a second PECVD process having a second process temperature that ranges from 600° C. to 700° C., and that is less than a minimum process temperature for the first PECVD process, and wherein the second PECVD process has a second process power of 320 W,
    wherein the structural battery electrode has a C(002) peak observed in a 2θ range of 25.63° in XRD, and
    wherein the structural battery electrode has a D/G band ratio of 1.01 in a Raman shift range of 1400 $cm^{-1}$ to 1600 $cm^{-1}$.

2. The method of claim 1, wherein the fiber fabric substrate includes at least one of a silica fiber fabric or a carbon fiber fabric.

3. The method of claim 1, further comprising forming a protective layer on the carbon nanotube layer after forming the carbon nanotube layer, wherein the protective layer includes a solid electrolyte membrane.

4. The method of claim 1, wherein:
    the first metal nanoparticles include iron nanoparticles; and
    the first metal nanoparticle layer includes iron.

5. The method of claim 1, wherein:
    the first metal nanoparticle layer includes iron;
    the second metal nanoparticle layer includes aluminum; and
    the first and second metal nanoparticle layers are formed using an electron beam evaporator.

6. The method of claim 1, wherein:
    the first thickness of the first metal nanoparticle layer is 1 nm to 2 nm; and
    the second thickness of the second metal nanoparticle layer is 8 nm to 10 nm.

7. The method of claim 1, wherein the first thickness of the first metal nanoparticle layer is 1 nm to 2 nm.

8. The method of claim 1, wherein the first and second metal nanoparticle layers are formed using an electron beam evaporator.

* * * * *